US006255419B1

(12) United States Patent
Imuta et al.

(10) Patent No.: US 6,255,419 B1
(45) Date of Patent: Jul. 3, 2001

(54) OLEFIN POLYMERIZATION CATALYST AND PROCESS FOR PRODUCING OLEFIN POLYMERS

(75) Inventors: Junichi Imuta; Junji Saito; Kenji Sugimura; Terunori Fujita, all of Kuga-gun (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/169,930

(22) Filed: Oct. 7, 1998

Related U.S. Application Data

(63) Continuation-in-part of application No. PCT/JP98/00515, filed on Feb. 6, 1998.

(30) Foreign Application Priority Data

| Feb. 7, 1997 | (JP) | 9-25612 |
| Apr. 23, 1997 | (JP) | 9-106267 |
| Apr. 25, 1997 | (JP) | 9-109917 |
| Apr. 25, 1997 | (JP) | 9-109918 |
| Apr. 25, 1997 | (JP) | 9-109919 |
| Apr. 25, 1997 | (JP) | 9-109920 |
| Apr. 28, 1997 | (JP) | 9-111428 |

(51) Int. Cl.[7] .................................... C08F 4/44

(52) U.S. Cl. .................. 526/172; 526/348.6; 556/51; 502/104; 502/162

(58) Field of Search ..................... 526/172, 161, 526/348.6; 556/51; 502/104, 162

(56) References Cited

U.S. PATENT DOCUMENTS 6,031,057 * 2/2000 Lippert et al. ............... 526/171

OTHER PUBLICATIONS

Scollard, John D; McConville, David H., J. AM. CHEM. SOC. 1996, 118, 10008–10009.
Scollard, John D; McConville, David H.; Payne, Nicholas C.; Vittal, Jagadese J., MACROMOLECULES 1996, 29, 5241–5243.
Scollard, John D.; McConville, David H.; Rettig, Steven J., ORGANOMETALLICS 1997, 16, 1810–1812.
Scollard, John D.; McConville, David H.; Vittal, Jagadese J., ORGANOMETALLICS 1997, 16, 4415–4420.

* cited by examiner

Primary Examiner—David W. Wu
Assistant Examiner—R. Harlan
(74) Attorney, Agent, or Firm—Birch, Stewart, Kolasch & Birch, LLP.

(57) ABSTRACT

The present invention provides olefin polymerization catalysts which can produce olefin polymers with excellent polymerization activity and an olefin polymerization method using the catalyst, wherein the catalyst comprises a transition metal amide compound represented by general formula (I) below:

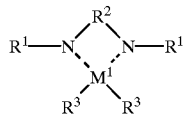

(I)

where $M^1$ is Ti, etc.; $R^1$ is alkyl, (substituted) phenyl, etc.; $R^2$ is $C(R^5)_2C(R^6)_mC(R^5)_2$— or —$C(R^5)_2$—$X^1$—$C(R^5)_2$— ($X^1$ representing a silicon-containing group, etc., and $R^5$ and $R^6$ representing hydrocarbon groups, etc.); and $R^3$ is a hydrocarbon group or halogen, etc.; and at least one compound selected from among organoaluminum oxy-compounds, ionizing ionic compounds and organometallic compounds.

10 Claims, 4 Drawing Sheets

Fig. 1
(A) Transition metal component
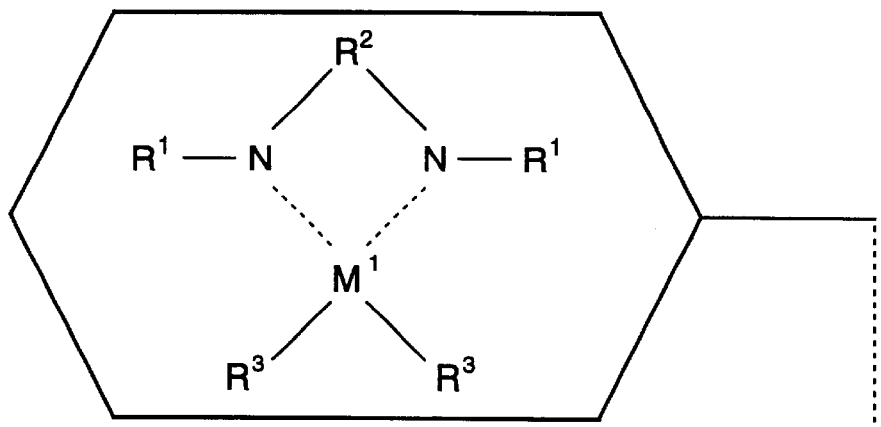
M : Transition metal of Groups 4 or Groups 8 to 10
$R^1$: Hydrocarbon of $C_1$ to $C_{15}$
$R^2$: $-C(R^5)_2-C(R^6)_2-C(R^5)_2-$
$-C(R^5)_2-Si(R^6)_2-C(R^5)_2-$ ,etc.
$R^3, R^4$: Hydrocarbon of $C_1$ to $C_{15}$, hydrogen, halogen
(B) Organometallic component
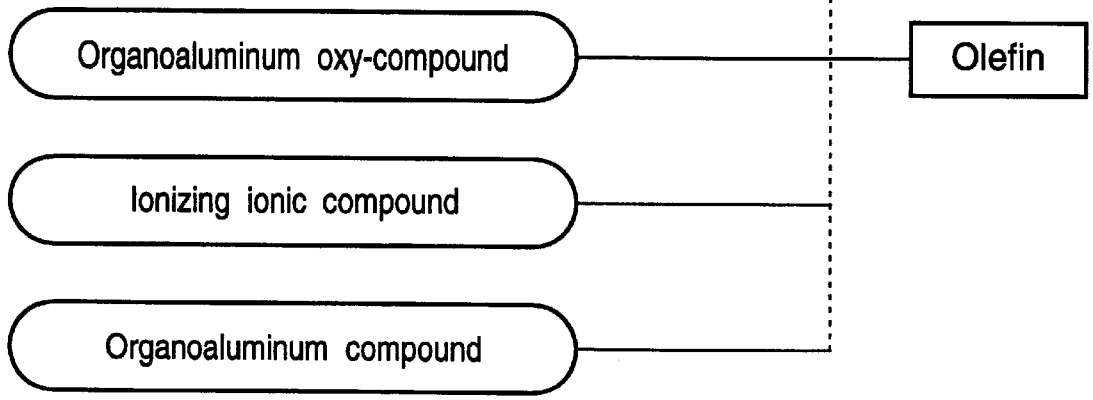

(A) Transition metal component

$M^2$: Transition metal atom of Groups 3 to 6

$R^{11} \sim R^{20}$: Halogen, hydrocarbon, etc.

$((E_m)A^1)_n$: Hydrocarbon, etc.

$n$: 1 or 2

$X^2$: Halogen, etc.

(B) Organometallic component

- Organometallic compound
- Organoaluminum oxy-compound
- Compound which reacts with transition metal compound to form ion pair

(C) 3rd component

(Fine particle carrier)

→ Olefin

Fig.3

(A) Transition metal component

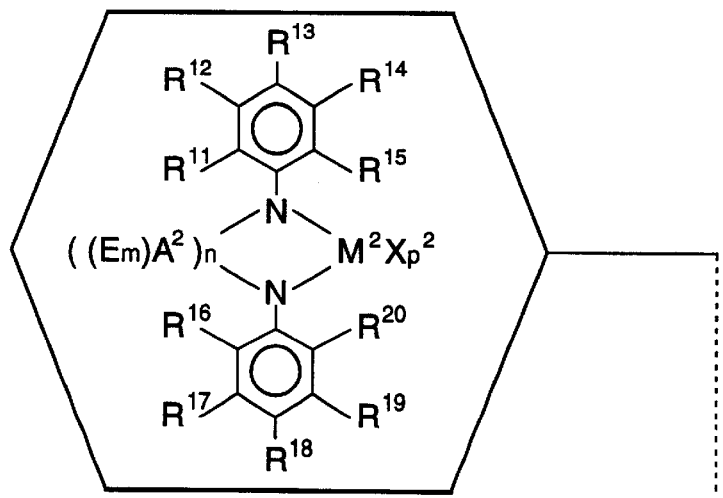

$M^2$: Transition metal atom of Groups 3 to 6

$R^{11} \sim R^{20}$: Halogen, hydrocarbon, etc.

$((E_m)A^2)_n$ : Hydrocarbon, etc.

n : 3 to 5

$X^2$ : Halogen, etc.

(B) Organometallic component

- Organometallic compound
- Organoaluminum oxy-compound
- Compound which reacts with transition metal compound to form ion pair (C) 3rd component ( Fine particle carrier )

Aromatic vinyl compound
α-olefin
Cyclic olefin

Fig.4
(A) Transition metal component
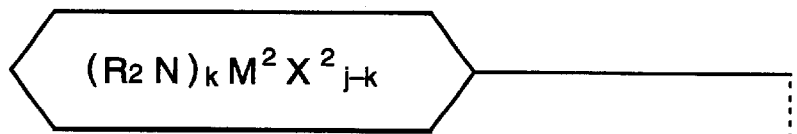
$M^2$: Transition metal atom of Groups 3 to 6
R : Hydrocarbon, etc.
$X^2$: Halogen, etc.
j : Valency of M atom
k : 1 to j
(B) Organometallic component
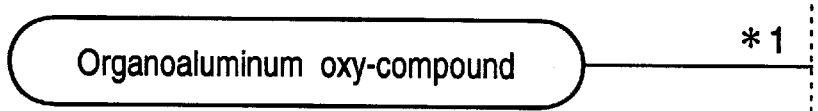
*1
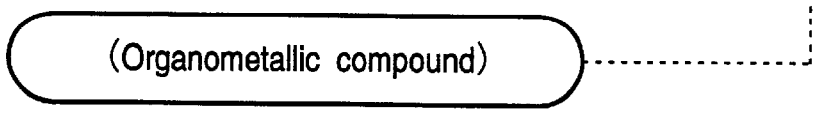
Olefin
*1 : Added to polymerization system in a form of an aliphatic hydrocarbon or alicyclic hydrocarbon slurry

OLEFIN POLYMERIZATION CATALYST AND PROCESS FOR PRODUCING OLEFIN POLYMERS

This application is a Continuation-In-Part of PCT application No. PCT/JP98/00515 filed on Feb. 6, 1998, which designated the United States and on which priority is claimed under 35 U.S.C. §120, the entire contents of which are hereby incorporated by reference.

TECHNICAL FIELD OF THE ART

The present invention relates to an olefin polymerization catalyst and a process for producing olefin polymers, and more specifically, it relates to an olefin polymerization catalyst which can produce olefin polymers with superior polymerization activity, and to an olefin polymerization process employing the catalyst.

BACKGROUND ART

Olefin(-based) polymers, which include ethylene polymers, ethylene/α-olefin copolymers, ethylene/styrene copolymers, ethylene/cyclic clef in copolymers, propylene polymers and propylene/α-olefin copolymers, are used in various fields because of their excellent rigidity, mechanical strength, chemical resistance, moldability and heat resistance.

As catalysts used to produce these clef in polymers there are known titanium-based catalysts comprising solid titanium catalyst components and organoaluminum compounds, vanadium-based catalysts comprising soluble vanadium compounds and organoaluminum compounds, metallocene-based catalysts comprising metallocene compounds of transitional metals selected from Group 4 of the Periodic Table and organoaluminum oxy-compounds and/or ionizing ionic compounds, etc. In addition, as new olefin polymerization catalyst components there have been proposed metal amide compounds comprising titanium and diamine-based ligands, as represented by the following formulas (Macromolecules 1996, 29, 5241–5243; J. Am. Chem. Soc. 1996, 118. 10008–10009).

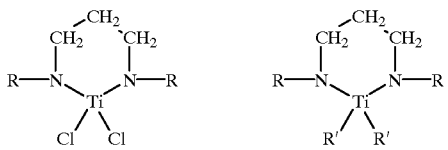

wherein R represents 2,6-(iso-Pr)$_2$-C$_6$H$_3$— or 2,6-Me$_2$-C$_6$H$_3$—, and R' represents —Me or —CH$_2$Ph.

These metal amide compounds are used in combination with aluminoxanes or B(C$_6$F$_5$)$_3$, but their polymerization activity is inadequate.

Recently there have also been proposed new olefin polymerization catalysts, for example the olefin polymerization catalysts described in Japanese Laid-open Patent Publication No. 245713/96 comprising a titanium amide compound with a titanium-nitrogen bond and an aluminoxane.

Also, in Organometallics 1996, 15, 562–569 there are described organometallic complexes of Group 4 of the Periodic Table, having bis(borylamide) ligands represented by [Mes$_2$BNCH$_2$CH$_2$NBMes$_2$]$^{-2}$, and it is stated that the complexes exhibit slight ethylene polymerization activity.

Incidentally, since olefin polymers generally have excellent mechanical properties, etc., they are used in various fields as different types of molds, but with the diversifying demands for properties of olefin polymers in recent years, olefin polymers with different characteristics have been desired. Improved productivity has also been a goal.

Because of these circumstances, there has been a demand for development of olefin polymerization catalysts with excellent olefin polymerization activity which can give olefin polymers with excellent properties, as well as a process for producing such olefin polymers.

In addition, organoaluminum oxy-compounds (aluminoxanes) used with transition metal compounds for polymerization of olefins are usually produced by contacting an organoaluminum compound such as trialkylaluminum with a metal salt hydrate in a hydrocarbon solvent. The hydrocarbon used here is an aromatic hydrocarbon, especially toluene, which has excellent ability to dissolve the resulting organoaluminum oxy-compound, and such organoaluminum oxy-compounds are usually sold as solutions in toluene, so that they are added to polymerization systems as solutions in toluene when they are used for polymerization. However, addition of an aromatic hydrocarbon such as toluene to a polymerization system raises the problem of residual odor in the polymer, and sometimes problems also arise with respect to working environment conditions. Although there have been methods for distilling toluene out from organoaluminum oxy-compounds for use of the organoaluminum oxy-compounds in solid form, these methods are not industrially convenient.

As a result of diligent research in light of the prior art, the present inventors have completed the present invention upon the finding that when (copolymerization of an olefin is carried out in the presence of a transition metal amide compound and an organoaluminum oxy-compound, addition of the organoaluminum oxy-compound to the polymerization system as an aliphatic or alicyclic hydrocarbon slurry can avoid causing the problems mentioned above and can give better polymerization activity than when the organoaluminum oxy-compound is added to the polymerization system as an aromatic hydrocarbon solution.

DISCLOSURE OF THE INVENTION

One embodiment of the olefin polymerization catalyst of the present invention is a catalyst (olefin polymerization catalyst (1)) comprising (A) a transition metal amide compound represented by general formula (I) below and at least one compound selected from among (B)
  (B-1) organoaluminum oxy-compounds,
  (B-2) compounds which react with the above-mentioned transition metal amide compound (A) to form ion pairs,
  and
  (B-3) organometallic compounds.

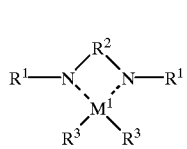

(I)

where M$^1$ represents a transition metal of Group 4 or Groups 8 to 10 of the Periodic Table, R$^1$ represents a hydrocarbon group of 1 to 15 carbon atoms, the multiple (two) $R^1$ groups being the same or different; and $R^2$ represents a divalent bonding group represented by general formula (a) or (b) below:

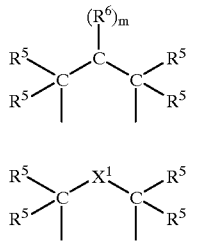

(a)

(b)

(where $X^1$ represents a silicon-containing divalent group, a germanium-containing divalent group, a tin-containing divalent group, —O—, —CO—, —S—, —SO—, —$SO_2$—, —$C(R^{31})_p$-S-$C(R^{32})_q$— (where $R^{31}$ and $R^{32}$ are each hydrogen atom, the same or different alkyl groups or are linked together to form a ring of 3 to 30 carbon atoms, and p and q are 1 or 2), —$N(R^5)$—; —$C(R^{33})_r$-N-$C(R^{34})_s$— (where $R^{33}$ and $R^{34}$ are hydrogen atoms, the same or different alkyl groups or are linked together to form a ring of 3 to 30 carbon atoms, and r and s are 1 or 2), —$P(R^5)$—, —$P(O)(R^5)$—, —$B(R^5)$— or —Al$(R^5)$—; $R^5$ and $R^6$ may be the same or different and each represents a hydrocarbon group of 1 to 20 carbon atoms, a halogenated hydrocarbon group of 1 to 20 carbon atoms, a hydrogen atom or a halogen atom; and when $R^1$ is a (substituted) phenyl group, at least one of the groups represented by $R^5$ or $R^6$ is not a hydrogen atom; m is 1 or 2, the multiple $R^5$ groups and $R^6$ groups each may be the same or different, 2 or more of the groups $R^5$ and $R^6$ may be linked to form a ring; and when m is 1, $R^6$ is linked to its adjacent $R^5$ to form a mononuclear or polynuclear aromatic ring), and each $R^3$ may be the same or different, with each representing a hydrocarbon group of 1 to 15 carbon atoms, a hydrogen atom or a halogen atom, and the multiple $R^3$ groups being the same or different.

The olefin polymerization catalyst (1) according to the present invention preferably comprises (A) a transition metal amide compound represented by the aforementioned general formula (I), (B) (B-1) an organoaluminum oxy-compound and/or (B-2) a compound which reacts with the above-mentioned transition metal amide compound (A) to form an ion pair, and optionally, (B-3') an organoaluminum compound.

Preferred as the aforementioned transition metal amide compound (A) is one in which $R^1$ of the general formula (I) above is a hydrocarbon group with an aromatic ring.

The process for producing the olefin-based polymer of the invention may include embodiments each of which comprises homopolymerizing an olefin, or copolymerizing 2 or more olefins, in the presence of the olefin polymerization catalyst (1).

Use of the olefin polymerization catalyst (1) allows production of olefin polymers by excellent polymerization activity.

Another embodiment of the olefin polymerization catalyst of the present invention is a catalyst (olefin polymerization catalyst (2)) comprising (A') a transition metal amide compound represented by general formula (II) below and at least one compound selected from among (B)

(B-1) organoaluminum oxy-compounds, (B-2) compounds which react with the above-mentioned transition metal amide compound (A') to form ion pairs, and (B-3) organometallic compounds.

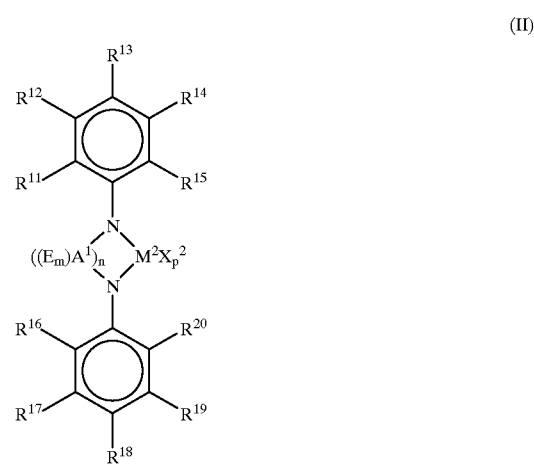

(II)

where $M^2$ represents a transition metal atom of groups 3 to 6 of the Periodic Table;

$R^{11}$ to $R^{20}$ may be the same or different, and each represents a hydrogen or halogen atom, a hydrocarbon group, halogenated hydrocarbon group, organosilyl group, alkoxy group or aryloxy group, —$COOR^{21}$, —$N(R^{22})C(O)R^{23}$, —$OC(O)R^{24}$, —CN, —$NR^{25}_2$ or —$N(R^{26})S(O_2)R^{27}$ (where $R^{21}$ to $R^{27}$ represent alkyl groups of 1 to 5 carbon atoms), at least one of $R^{11}$ to $R^{15}$ is a group other than a hydrogen atom, at least one of $R^{16}$ to $R^{20}$ is a group other than a hydrogen atom, any 2 or more the groups represented by $R^{11}$ to $R^{15}$ may be linked together to form a ring, and any 2 or more the groups represented by $R^{16}$ to $R^{20}$ may be linked together to form a ring;

m is 1 or 2;

n is 1 or 2, $A^1$ represents an atom of group 14 of the Periodic Table, and when n is 2, the two groups represented by $A^1$ may be the same or different;

E may represent the same or different groups and represents at least one atom selected from among carbon, hydrogen, oxygen, halogens, nitrogen, sulfur, phosphorus, boron and silicon or substituents containing these atoms, and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group or silicon-containing group, and when p is 2 or greater the groups represented by $X^2$ may be the same or different.

The process for producing the olefin polymer of the invention may include embodiments each of which comprises homopolymerizing an olefin, or copolymerizing 2 or more olefins, in the presence of the olefin polymerization catalyst (2).

Use of the olefin polymerization catalyst (2) allows production of olefin polymers of narrow molecular weight distribution, by excellent polymerization activity. It is also possible to obtain olefin copolymers of narrow composition distribution by copolymerization of 2 or more olefins.

Still another embodiment of an olefin polymerization catalyst used for the production process of the present invention is a catalyst (olefin polymerization catalyst (3)) comprising (A") a transition metal amide compound represented by general formula (III) below and at least one compound selected from among (B)
(B-1) organoaluminum oxy-compounds,
(B-2) compounds which react with the transition metal amide compound (A") to form ion pairs, and
(B-3) organometallic compounds.

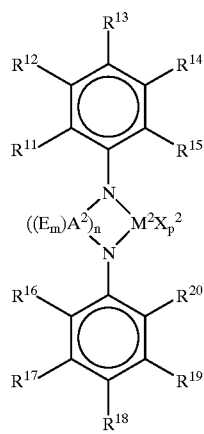

(III)

where $M^2$, $R^1$ to $R^{20}$ and $X^2$ have the same definitions as for $M^2$, $R^{11}$ to $R^{20}$ and $X^2$, respectively, in general formula (II) above;

m in is an integer of 0 to 2;

n is an integer of 3 to 5;

Each $A^2$ may be the same or different, and represents an atom of Groups 13 to 16 of the Periodic Table;

E represents at least one atom selected from among carbon, hydrogen, oxygen, halogens, nitrogen, sulfur, phosphorus, boron and silicon or substituents containing these atoms, and with more than one E group, the E groups may be the same or different and any 2 or more groups represented by E may be linked together to form a ring; and p represents an integer of 0 to 4.

The process for producing the olefin polymer of the invention may include the following embodiments, i) copolymerization of an aromatic vinyl compound with an α-olefin to produce an aromatic vinyl compound/α-olefin copolymer, ii) copolymerization of an α-olefin of 3 or more carbon atoms with ethylene to produce an ethylene/α-olefin copolymer, iii) copolymerization of at least two of α-olefins selected from α-olefins of 3 or more carbon atoms to produce an α-olefin random copolymer or iv) copolymerization of a linear or branched olefin with a cyclic olefin to produce a cyclic olefin copolymer, each of which is conducted in the presence of the olefin polymerization catalyst.

Use of the olefin polymerization catalyst (3) allows production of aromatic vinyl compound/α-olefin copolymers, ethylene/α-olefin copolymers, α-olefin random copolymers and cyclic olefin-based copolymers, by excellent copolymerization activity.

Another process for producing an olefin copolymer of the invention includes polymerization or copolymerization of olefins in the presence of an olefin polymerization catalyst comprising:

(A'") a transition metal amide compound represented by general formula (IV) below $$(R_2N)_k M^2 X^2_{j-k} \qquad (IV)$$

where $M^2$ represents a transition metal atom of Groups 3 to 6 of the Periodic Table, j is the valency of the transition metal atom $M^2$, k is an integer of 1 to j, each R may be the same or different and represents a hydrogen atom, a hydrocarbon group, a halogenated hydrocarbon group, an organosilyl group or a substituent with at least one element selected from among nitrogen, oxygen, phosphorus, sulfur and silicon, the groups represented by R may be linked together to form a ring, when k is 2 or greater, two R groups bonded to different nitrogen atoms may be bonded together to form a bonding group which bonds the 2 nitrogen atoms, $X^2$ represents a hydrogen or halogen atom, a hydrocarbon group of 1 to 20 carbon atoms, a halogenated hydrocarbon group of 1 to 20 carbon atoms or an oxygen-containing group, sulfur-containing group or silicon-containing group, and when j-k is 2 or greater, each $X^2$ may be the same or different; and (B-1) an organoaluminum oxy-compound, wherein the organoaluminum oxy-compound (B-1) is added to the polymerization system in a form of an aliphatic hydrocarbon or alicyclic hydrocarbon slurry.

By the process for producing olefin polymers of the present invention, it is possible to produce olefin polymers with higher polymerization activity than by processes in which organoaluminum oxy-compounds are added to polymerization systems as solutions in aromatic hydrocarbons. In addition, there is no problem of residual odor in the polymer and no problems with respect to working environment conditions.

BRIEF DESCRIPTION OF THE DRAWINGS

FIG. 1 is an explanatory view of an embodiment of an olefin polymerization step using the olefin polymerization catalyst (1).

FIG. 3 is an explanatory view of an embodiment of an olefin polymerization step using the olefin polymerization catalyst (3).

FIG. 4 is an explanatory view of an embodiment of an olefin polymerization step using the olefin polymerization catalyst (4).

Figure 2:
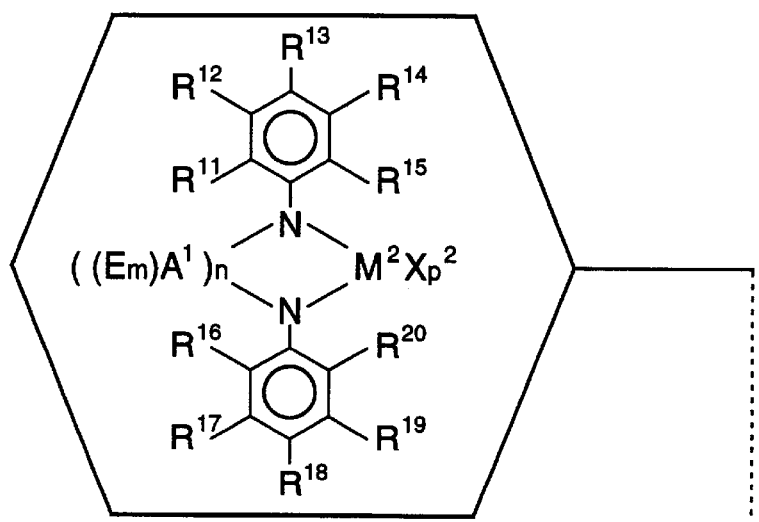
FIG. 2 is an explanatory view of an embodiment of an olefin polymerization step using the olefin polymerization catalyst (2).

BEST MODE FOR CARRYING OUT ilk INVENTION

The olefin polymerization catalyst (1) of the present invention is produced from (A) a transition metal amide compound represented by general formula (I) below and at least one compound selected from among (B)
  (B-1) organoaluminum oxy-compounds,
  (B-2) compounds which react with the above-mentioned transition metal amide compound (A) to form ion pairs, and
  (B-3) organometallic compounds.

Each of the components forming the olefin polymerization catalyst (1) will now be explained.

(A) Transition Metal Amide Compound

The transition metal amide compound (A) forming the olefin polymerization catalyst (1) is a compound represented by the following general formula (I):

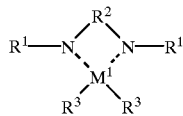

(I)

where $M^1$ represents a transition metal of Group 4 or Groups 8 to 10 of the Periodic Table, specifically titanium, zirconium, hafnium, ruthenium, cobalt, rhodium, nickel and palladium, and preferably titanium, zirconium, cobalt, nickel and palladium.

When $M^1$ is a transition metal of Groups 8 to 10 of the Periodic Table, a transition metal amide compound represented by the following general formula (I') may be used together with a transition metal amide compound represented by general formula (I), or in place of a transition metal amide compound represented by general formula (I) above.

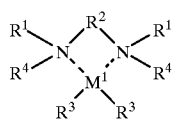

(I')

Also, according to the invention a transition metal amide compound represented by the following general formula (I") may also be used together with a transition metal amide compound represented by general formula (I) and/or a transition metal amide compound represented by general formula (I'), or in place of a transition metal amide compound represented by general formula (I) and a transition metal amide compound represented by general formula (I'). Transition metal amide compounds represented by general formula (I") below have a structure wherein only one of the nitrogen atoms is coordinated with the metal.

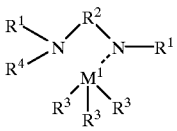

(I")

A transition metal amide compound represented by the following general formula (I''') where the metal corresponds to a trivalent state may also be used together with or in place of the aforementioned transition metal amide compounds.

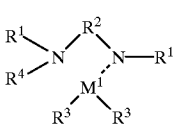

(I''')

In general formulas (I), (I'), (I") and (I''') above, each $R^1$ represents a hydrocarbon group of 1 to 15 carbon atoms, and the $R^1$ groups may be the same or different from each other. The hydrocarbon group of 1 to 15 carbon atoms specifically includes linear or branched alkyl groups such as methyl, ethyl, n-propyl and iso-propyl, cycloalkyl groups such as cyclohexyl, arylalkyl groups such as phenylmethyl, p-methylphenylmethyl, 2-phenylethyl and 1-phenylethyl, aryl groups such as phenyl and naphthyl, and alkylaryls such as 2,6-dimethylphenyl and 2,6-di-iso-propylphenyl. Among these there are preferred groups with aromatic rings, such as arylalkyl groups, aryl groups and alkylaryl groups.

$R^2$ represents a divalent bonding group represented by general formula (a) or (b) below.

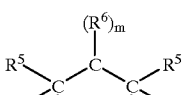

(a)

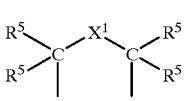

(b)

where $X^1$ represents a silicon-containing divalent group, a germanium-containing divalent group, a tin-containing divalent group, —O—, —CO—, —S—, —SO—, —SO$_2$—, —C($R^{31}$)$_p$-S-C($R^{32}$)$_q$— (where $R^{31}$ and $R^{32}$ are hydrogen atoms, the same or different alkyl groups or are linked together to form a ring of 3 to 30 carbon atoms, and p and q are 1 or 2), —N($R^5$)—, —C($R^{33}$)r-N-C($R^{34}$)$_s$— (where $R^{33}$ and $R^{34}$ are hydrogen atoms, the same or different alkyl groups or are linked together to form a ring of 3 to 30 carbon atoms, and r and s are 1 or 2), —P($R^5$)—, —P(O)($R^5$)—, —B($R^5$)— or —Al($R^5$)—.

$R^5$ and $R^6$ may be the same or different and each represents a hydrocarbon group of 1 to 20 carbon atoms, a halogenated hydrocarbon group of 1 to 20 carbon atoms, a hydrogen atom or a halogen atom, and when $R^1$ is a (substituted) phenyl group, at least one of the groups represented by $R^5$ or $R^6$ is not a hydrogen atom. m is 1 or 2, the multiple $R^5$ groups and $R^6$ groups each may be the same or different from one another, two or more of the groups R⁵ and R⁶ may be linked to form a ring, and when m is 1, R⁶ is linked to its adjacent R⁵ to form a mononuclear or polynuclear aromatic ring. In such cases, the portion of R⁶ and R⁵ preferably is a ring-containing structure having a total of 3 to 30 carbon atoms. Preferred among these are compounds where R⁵ is a hydrogen atom or an alkyl group of 1 to 3 carbon atoms, and R⁶ is a hydrocarbon group having an aromatic ring, especially an arylalkyl group, aryl group or aliylaryl group.

The divalent bonding group represented by general formula (a) above includes:

—CH₂—C(Ph)₂—CH₂—,
—CH₂—C(2,6-dimethyl-Ph)₂—CH₂—,
—CH₂—C(2,6-diiso-propyl-Ph)₂—CH₂—, etc.

The divalent bonding group represented by general formula (a) also includes the following bonding groups:

divalent bonding groups represented by the following general formula (a-1) wherein m is 1 and R⁶ is a hydrogen atom in general formula (a) above;

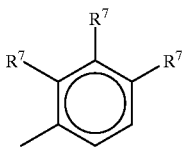
(a-1)

divalent bonding groups represented by the following general formula (a-2) wherein m is 1 and R⁶ is linked with both of its adjacent R⁵ group to form a polynuclear aromatic ring in general formula (a) above; and

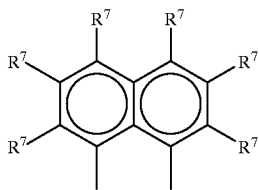
(a-2)

divalent bonding groups represented by the following general formula (a-3) wherein m is 2, R⁶ is a hydrogen atom and both adjacent R⁵ groups are linked to form an aliphatic ring in general formula (a) above.

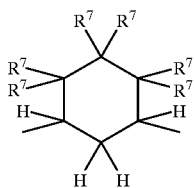
(a-3)

Here, each R⁷ may be the same or different and represents a hydrocarbon group of 1 to 20 carbon atoms, a halogenated hydrocarbon group of 1 to 20 carbon atoms, a hydrogen atom or a halogen atom, and any R⁷ groups may be linked to form an aromatic ring or aliphatic ring.

The specific examples of divalent bonding groups represented by general formula (a-i) above include the following.

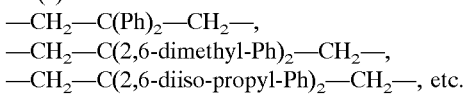

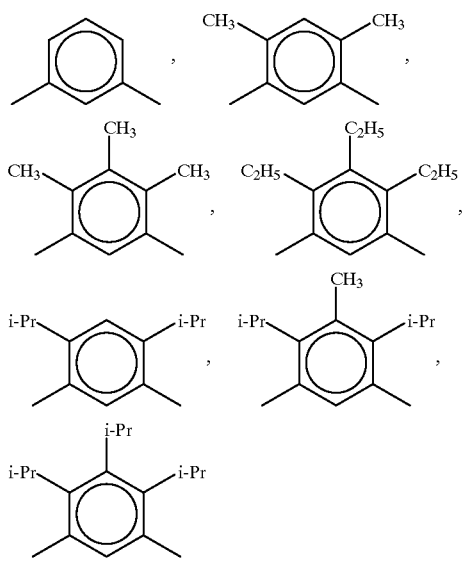

The specific examples of divalent bonding groups represented by general formula (a-2) include the following.

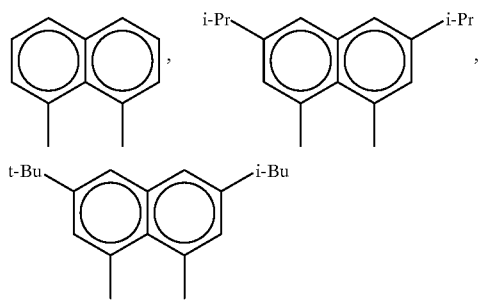

Incidentally, "Ph" in these examples represents phenyl, "i-Pr" represents isopropyl, and "t-Bu" represents tertiary butyl.

When X¹ in general formula (b) above is —O—, —CO—, —S—, —SO—, —SO₂— or —N(R⁵)—, R¹ in the aforementioned general formula (I), (I'), (I") or (I'") is preferably a group having an aromatic ring, such as arylalkyl, aryl or alkylaryl, and preferably aryl or alkylaryl. Examples of aryl groups include phenyl, naphthyl, indenyl and fluorenyl, and examples of alkylaryl groups include 2,6-dimethylphenyl, 2,6-di-iso-propylphenyl and 3,5-dimethylphenyl. Among these there are preferred phenyl groups substituted at the 2,6- position with an alkyl group of 1 to 4 carbon atoms. R¹ may also be appropriately selected from those mentioned above even when X¹ of general formula (b) is a group other than those mentioned above.

Other examples of divalent bonding groups represented by general formula (b) above include the following bonding groups:

(b-1)

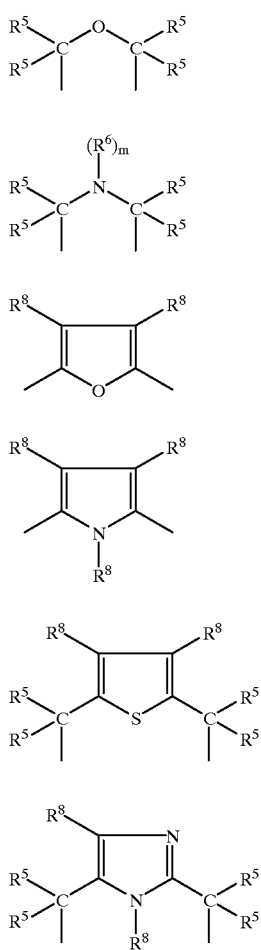

where R⁸ has the same definition as R⁷.

Additional specific examples of divalent bonding groups represented by general formula (b) include:

—CH₂-Si(CH₃)₂—CH₂—,
—CH₂-Si(CH₃) (Ph)—CH₂—,
—CH₂-Si(Ph)₂—CH₂—,
—C(CH₃)₂-Si(Ph)₂-C(CH₃)₂—,
—CH₂-Si(2,6-dimethyl-Ph)₂—CH₂—,
—CH₂-Si(2,6-diiso-propyl-Ph)₂—CH₂—.

Specifically, divalent bonding groups represented by general formula (b-3) above include the following:

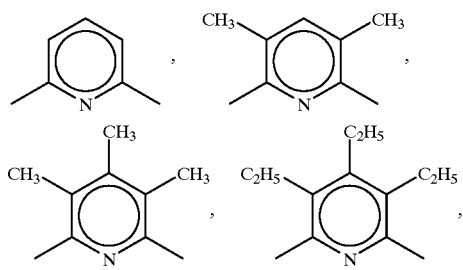

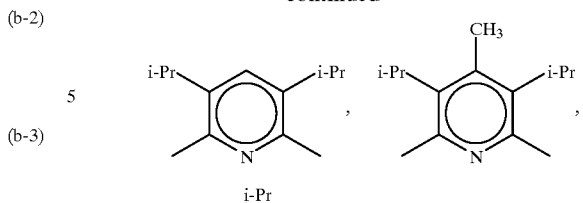

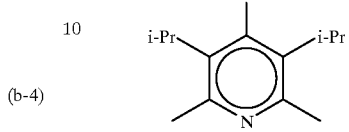

$R^3$ represents a hydrocarbon group of 1 to 15 carbon atoms, a hydrogen atom or a halogen atom, and each of the $R^3$ groups may be the same or different. The hydrocarbon groups of 1 to 15 carbon atoms include the same groups given for $R^1$ above.

$R^4$ represents a hydrocarbon group of 1 to 15 carbon atoms, a hydrogen atom or a halogen atom. The hydrocarbon groups of 1 to 15 carbon atoms include the same groups given for $R^1$ above.

Examples will now be given of transition metal amide compounds represented by the aforementioned general formulas (I), (I') and (I").

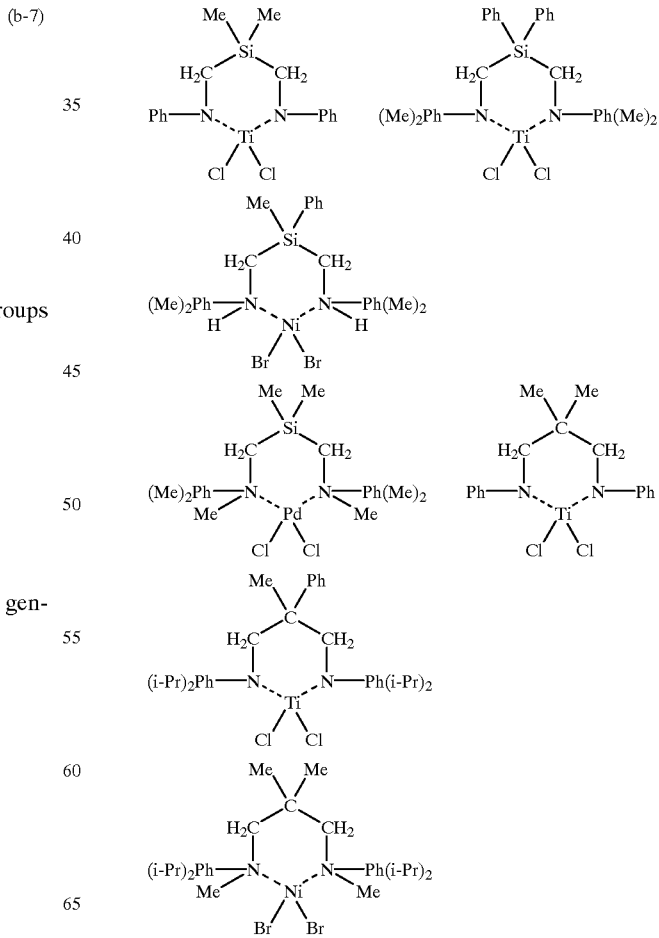

-continued
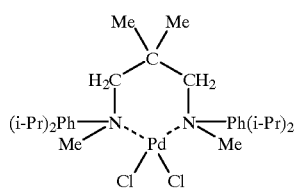
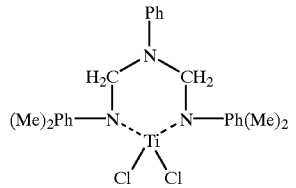
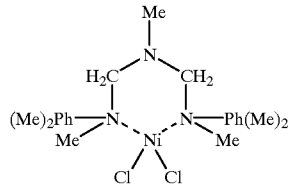
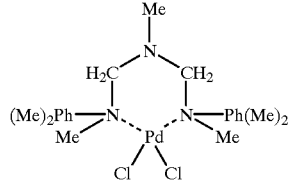
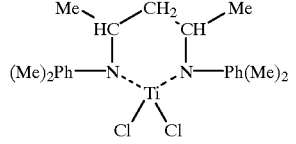
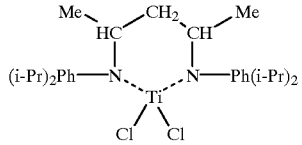
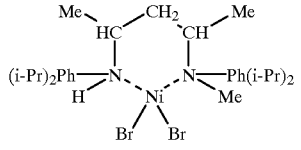
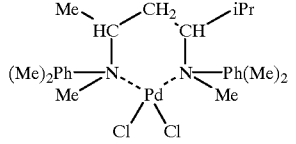
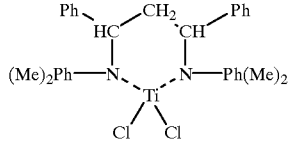
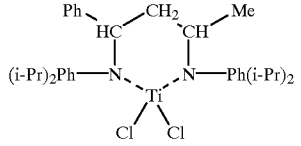
-continued
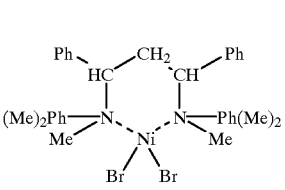
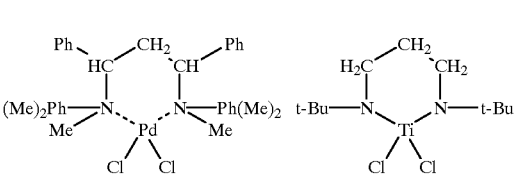
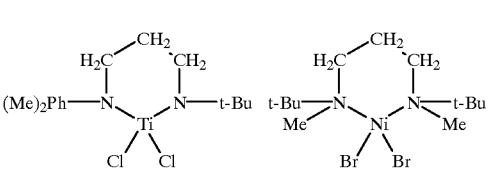
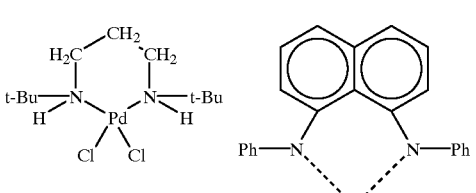
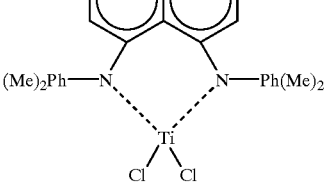
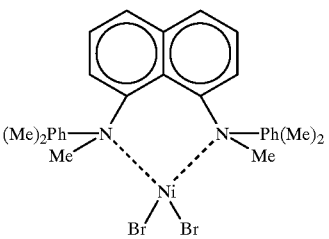
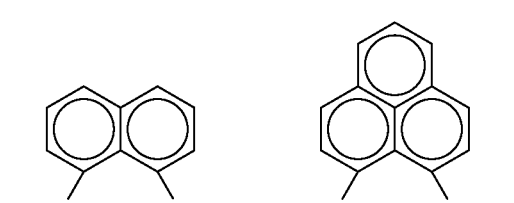
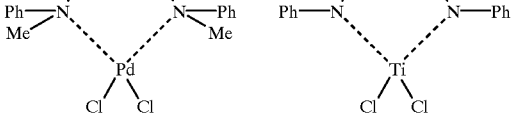

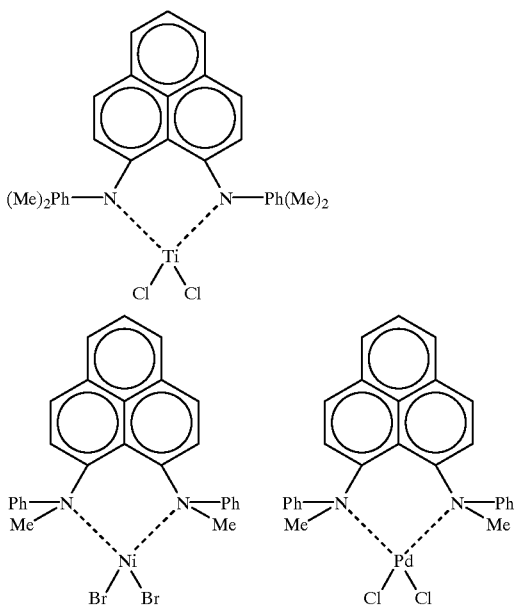

Incidentally, Me in these examples represents nethyl, Ph represents phenyl, Ph(Me)$_2$ represents 2,6-dimethylphenyl, Ph(i-Pr)$_2$ represents 2,6-di-isopropylphenyl and t-Bu represents tertiary butyl, respectively. The positions of alkyl substitution on the phenyl groups are not limited to those given here, and other examples could be mentioned.

These transition metal amide compounds (A) may be obtained in the following manner, by reaction between a trimethylsilylated diamine and titanium tetrachloride as shown, for example, in Macromolecules 1996, 29, 5241–5243.

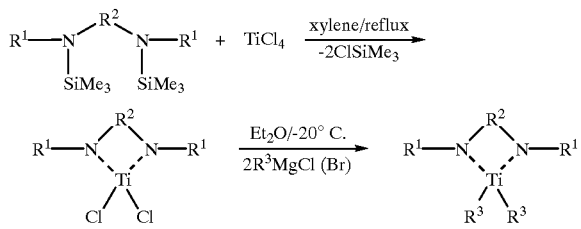

They may also be obtained in the following manner, by treatment of the amino group proton with a base followed by reaction with a metal compound.

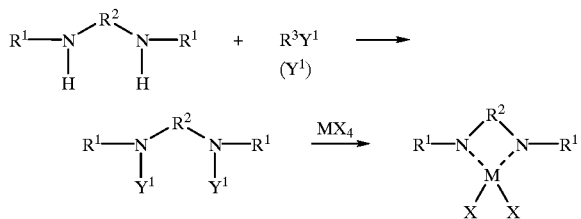

where $Y^1$ represents an alkali metal such as lithium, sodium or potassium, and $R^3$ represents a hydrogen atom or a hydrocarbon group of 1 to 5 carbon atoms.

The reaction solvent includes an ether such as diethyl ether, tetrahydrofuran or dioxane, an aromatic hydrocarbon such as benzene, toluene or mesitylene and an aliphatic hydrocarbon such as pentane, hexane or heptane. Among these, diethyl ether, tetrahydrofuran, toluene and hexane are preferred.

(B-1) Orpanoaluminum oxy-compound

The organoaluminum oxy-compound (B-1) composing the olefin polymerization catalyst (1) may be the conventionally known compound aluminoxane, or it may be an organoaluminum oxy-compound which is insoluble in benzene, such as one of those mentioned in Japanese Laid-open Patent Publication No. 78687/90.

The conventionally known aluminoxane can be produced by one of the following methods, for example, and is normally obtained as a solution in a hydrocarbon solvent:

(1) A method whereby an organoaluminum compound such as trialkylaluminum is added to a hydrocarbon medium suspension of a compound containing absorbed water or a salt containing water of crystallization, such as magnesium chloride hydrate, copper sulfate hydrate, aluminum sulfate hydrate, nickel sulfate hydrate or cerium (I) chloride hydrate, to react the absorbed water or water of crystallization with the organoaluminum compound;

(2) A method whereby water, ice or steam is allowed to act directly on an organoaluminum compound such as trialkylaluminum in a medium such as benzene, toluene, ethyl ether or tetrahydrofuran; and (3) A method whereby an organotin oxide compound such as dimethyltin oxide or dibutyltin oxide is reacted with an organoaluminum compound such as trialkylaluminum in a medium such as decane, benzene or toluene.

The aluminoxane may also contain a small amount of an organometallic component. Also, after distilling off the solvent or the unreacted organoaluminum compound from the recovered aluminoxane solution, it may be redissolved in the solvent.

The specific examples of organoaluminum compounds to be used for preparation of the aluminoxane include the same organoaluminum compounds given as organoaluminum compounds of (B-3a) below.

Among these there are preferred trialkylaluminum and tricycloalkylaluminum, and especially trimethylaluminum.

These organoaluminum compounds may be used either singly or in combinations of 2 or more.

Solvents to be used for preparation of the aluminoxane include, for example, aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and light oil; and other hydrocarbon solvents including the above-mentioned aromatic hydrocarbons, aliphatic hydrocarbons and alicyclic hydrocarbons in halogenated (chlorinated, brominated, etc.) form. Ethers such as ethyl ether and tetrahydrofuran may also be used. Particularly preferred among these solvents are aromatic hydrocarbons and aliphatic hydrocarbons.

The benzene-insoluble organoaluminum oxy-compound used according to the invention has an Al component solubility in 60° C. benzene of 10% or less, preferably 5% or less and more preferably 2% or less, in terms of Al atoms, and is therefore insoluble or barely soluble in benzene.

These organoaluminum oxy-compounds (B-1) are usually commercially available as, or handled as, toluene solutions.

(B-2) Compound which reacts with transition metal amide compound (A) to form ion pair The compound (B-2) which reacts with the transition metal amide compound (A) of the olefin polymerization catalyst (1) to form an ion pair (hereunder sometimes referred to as "ionizing ionic compound") includes the Lewis acids, ionic compounds, borane compounds and carborane compounds described in Japanese Patent Publication Nos. 501950/89 and 502036/89, Japanese Laid-open Patent Publication Nos. 179005/91, 179006/91, 207703/91 and 207704/91, and U.S. Pat. No. 5,321,106.

As specific Lewis acids there may be mentioned compounds represented by $BR_3$ (where R is fluorine or a phenyl group which may have a substituent such as fluorine, methyl or trifluoromethyl), examples of which include trifluoroboron, triphenylboron, tris(4-fluorophenyl)boron, tris(3,5-difluorophenyl),boron, tris(4-fluoromethylphenyl)boron, tris(pentafluorophenyl)boron, tris(p-tolyl)boron, tris(o-tolyl)boron and tris(3,5-dimethylphenyl)boron.

As ionic compounds there may be mentioned the compounds represented by general formula (V) below.

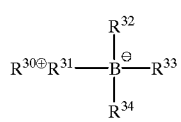

(V)

As $R^{30}$ in the formula there may be mentioned $H^+$, carbonium cation, oxonium cation, ammonium cation, phosphonium cation, cycloheptyltrienyl cation and transition metal-containing ferrocenium cation.

$R^{31}$ to $R^{34}$ may be the same or different, and each is an organic group, preferably an aryl group or substituted aryl group.

As specific examples of carbonium cations there may be mentioned trisubstituted carbonium cations such as triphenylcarbonium cation, tri(methylphenyl)carbonium cation and tri(dimethylphenyl)carbonium cation.

As specific examples of ammonium cations there may be mentioned trialkylammonium cations such as trimethylammonium cation, triethylammonium cation, tripropylamonium cation, tributylammonium cation and tri(n-butyl) ammonium cation; N,N-dialkylanilinium cations such as N,N-dimethylanilinium cation, N,N-diethylanilinium cation and N,N-2,4,6-pentamethylanilinium cation; and dialkylammonium cations such as di(isopropyl)ammonium cation and dicyclohexylammonium cation.

As specific examples of phosphonium cations there may be mentioned triarylphosphonium cations such as triphenylphosphonium cation, tri(methylphenyl)phosphonium cation and tri(dimethylphenyl)phosphonium cation. Preferred as $R^{30}$ are carbonium cations and ammonium cations, and especially triphenylcarbonium cation, N,N-dimethylanilinium cation and N,N-diethylanilinium cation.

As ionic compounds there may be mentioned trialkyl substituted ammonium salts, N,N-dialkylanilinium salts, dialkylammonium salts and triarylphosphonium salts.

As specific examples of trialkyl substituted ammonium salts there may be mentioned triethylammonium tetra (phenyl)boron, tripropylammonium tetra(phenyl)boron, tri (n-butyl)ammonium tetrai(yphenyl)boron, trimethylammonium tetra(p-tolyl)boron, trimethylammonium tetra o-tolyl) boron, tri(n-butyl) ammonium tetra(pentafluorophenyl) boron, tripropylamonium tetra (o,p-dimethylphenyl)boron, tris(n-butyl) ammonium tetra(m,m-dimethylphenyl)boron, tri(n-butyl)ammonium tetra (p-trifluoromethylphenyl) boron, tri(n-butyl)ammonium tetra(3,5-ditrifluoromethylphenyl)boron and tri(n-butyl)ammonium tetra(o-tolyl)boron.

As specific examples of N,N-dialkylanilinium salts there may be mentioned N,N-dimethylanilinium tetra (phenyl) boron, N,N-diethylanilinium tetra(phenyl)boron n and N,N-2,4,6-pentamethylanilinium tetra(phenyl)boron.

As specific examples of dialkylammonium salts there may be mentioned di(1-propyl)ammonium tetra (pentafluorophenyl)boron and dicyclohexylammonium tetra (phenyl)boron.

As additional ionic compounds there may be mentioned triphenylcarbenium tetrakis(pentafluorophenyl) borate, N,N-dimethylanilinium tetrakis(pentafluorophenyl) borate, ferrocenium tetra(pentafluorophenyl) borate, triphenylcarbenium pentaphenylcyclopentadienyl complex, N,N-diethylanilinium pentaphenylcyclopentadienyl complex, and boron compounds represented by the following formulas (VI) and (VII).

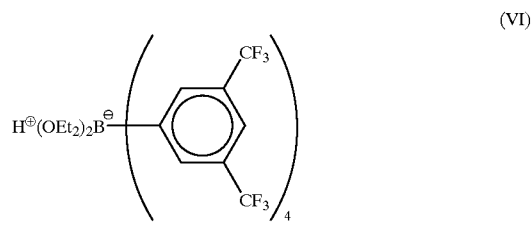

(VI)

where Et represents ethyl.

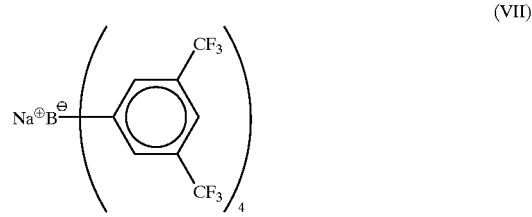

(VII)

As specific examples of borane compounds there may be mentioned decaborane (14);

salts of anions such as bis[tri(n-butyl)ammonium] nonaborate, bis[tri(n-butyl)ammonium] decaborate, bis [tri(n-butyl)ammonium] undecaborate, bis[tri(n-butyl) ammonium] dodecaborate, bis[tri(n-butyl)ammonium] decachlorodecaborate and bis[tri(n-butyl)ammonium] dodecachlorododecaborate; and salts of metal borane anions such as tri(n-butyl) ammonium bis(dodecahydride dodecaborate) cobaltate (III) and bis[tri(n-butyl)ammonium] bis(dodecahydride dodecaborate) nickelate (III).

As specific examples of carborane compounds there may be mentioned salts of anions such as 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate, tri(n-butyl)ammonium 6-carbadecaborate (14), tri( n-butyl) ammonium 6-carbadecaborate (12), tri(n-butyl)ammonium 7-carbaundecaborate (13), tri(n-butyl)ammonium 7,8-dicarbaundecaborate (12), tri(n-butyl)ammonium 2,9-dicarbaundecaborate (12), tri(n-butyl)ammonium dodecahydride-8-methyl-7,9-dicarbundecaborate, tri(n-butyl)ammonium undecahydride-8-ethyl-7,9-dicarbaundecaborate, tri(n-butyl)ammonium undecahydride- 8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate and tri(n-butyl)ammonium undecahydride-4,6-dibromo-7-carbaundecaborate; and salts of metal carborane anions such as tri(n-butyl) ammonium bis(nonahydride-1,3-dicarbanonaborate) cobaltate (III), tri(n-butyl)ammonium bis(undecahydride-7,8-dicarbaundecaborate) ferrate (III), tri(n-butyl)ammonium bis(undecahydride-7,8-dicarbaundecaborate) cobaltate (III), tri(n-butyl)ammonium bis(undecahydride-7,8-dicarbaundecaborate) nickelate (III), tri(n-butyl)ammonium bis(undecahydride-7,8-dicarbaundecaborate) cuprate (III), tri(n-butyl)ammonium bis(undecahydride-7,8-dicarbaundecaborate) aurate (III), tri(n-butyl)ammonium bis (nonahydride-7,8-dimethyl-7,8-dicarbaundecaborate) ferrate (III), tri(n-butyl)ammonium bis(nonahydride-7,8-dimethyl-7,8-dicarbaundecaborate) chromate (III), tri(n-butyl)ammonium bis(tribromooctahydride-7,8-dicarbaundecaborate) cobaltate (III), tris[tri(n-butyl) ammonium] bis(undecahydride-7-carbaundecaborate) chromate (III), bis[tri(n-butyl)ammonium] bis (undecahydride-7-carbaundecaborate) manganate (IV), bis [tri(n-butyl) ammonium] bis(undecahydride-7-carbaundecaborate) cobaltate (III) and bis[tri(n-butyl) ammonium] bis(undecahydride-7-carbaundecaborate) nickelate (IV).

These ionizing ionic compounds may be used singly or in combinations of 2 or more.

(B-3) Organometallic Compound

The organometallic compounds (B-3) in the olefin polymerization catalyst (1) include the following specific organometallic compounds of Groups 1, 2, 12 and 13 of the Periodic Table.

(B-3a) Organoaluminum compounds represented by:

$R^a{}_m Al(OR^b)_n H_p X_q$ where $R^a$ and $R^b$ may be the same or different from each other and each represents a hydrocarbon group of 1 to 15, preferably 1 to 4 carbon atoms, X represents a halogen atom, m is defined by 0<m≦3, n by 0<n≦3, p by 0≦p<3, q by 0≦q<3, and m+n+p+q=3.

(B-3b) Alkylated complexes of a group 1 metal and aluminum, represented by:

$M^4 Al R^a{}_4$ where $M^4$ represents Li, Na or K, and $R^a$ represents a hydrocarbon group of 1 to 15, preferably 1 to 4 carbon atoms.

(B-3c) Dialkylated group 2 or group 12 metal compounds represented by:

$R^a R^b M^5$ where $R^a$ and $R^b$ may be the same or different from each other and each represents a hydrocarbon group of 1 to 15, preferably 1 to 4 carbon atoms, and M5 represents Mg, Zn or Cd.

The following compounds are examples of organoaluminum compounds defined by (B-3a) above:

organoaluminum compounds represented by $R^a{}_m Al(OR^b)_{3-m}$ where $R^a$ and $R^b$ may be the same or different from each other and each represents a hydrocarbon group of 1 to 15, preferably 1 to 4 carbon atoms, and m preferably satisfies 1.5≦m≦3;

organoaluminum compounds represented by $R^a{}_m Al X_{3-m}$ where $R^a$ represents a hydrocarbon group of 1 to 15, preferably 1 to 4 carbon atoms, X represents a halogen atom, m preferably satisfies 0<m<3;

organoaluminum compounds represented by:

$R^a{}_m Al H_{3-m}$ where $R^a$ represents a hydrocarbon group of 1 to 15, preferably 1 to 4 carbon atoms, and m preferably satisfies 2≦m<3;

organic aluminum compounds represented by:

$R^a{}_m Al(OR^b)_n X_q$ where $R^a$ and $R^b$ may be the same or different from each other from each other and each represents a hydrocarbon group of 1 to 15, preferably 1 to 4 carbon atoms, X represents a halogen atom, m is defined by 0<mS<3, n by 0≦n<3, q by 0≦q<3, and m+n+q=3.

The specific examples of organoaluminum compounds defined by (B-3a) include: tri n-alkylaluminums such as trimethylaluminum, triethylaluminum, tri n-butylaluminum, tripropylaluminum, tripentylaluminum, trihexylaluminum, trioctylaluminum and tridecylaluminum;

tri branched alkylaluminums such as truisopropylaluminum, triisobutylaluminum, tri sec-butylaluminum, tri tert-butylaluminum, tri 2-methylbutylalumninum, tri 3-methylbutylaluminum, tri 2-methyfpentylaluminum, tri 3-methylpentylaluminuin, tri 4-methylpentylaluminum, tri 2-methylhexylaluminuin, tri 3-methylhexylaluminum and tri 2-ethylhexylaluminum;

tricycloalkylaluminums such as tricyclohexylaluminum and tricyclooctylaluminum;

triarylaluminums such as triphenylaluminum and tritolylaluminum;

dialkylaluminum hydrides such as diisobutylaluminum hydride;

alkenylaluminums such as isoprenylaluminum represented by $(i\text{-}C_4H_9)_x Al_y(C_5H_{10})_z$ (where x, y and z are positive integers and $z \geq 2x$);

alkylaluminum alkoxides such as isobutylaluminum methoxide, isobutylaluminum ethoxide and isobutylaluminum isopropoxide;

dialkylaluminum alkoxides such as dimethylaluminum methoxide, diethylaluminum ethoxide and dibutylaluminum butoxide;

alkylaluminim sesquialkoxides such as ethylaluminum sesquiethoxide and butylaluminum sesquibutoxide;

partially alkoxylated alkylaluminums with average composition represented by $R^a_{2.5} Al(OR^b)_{0.5}$;

alkylaluminum aryloxides such as diethylaluminum phenoxide, diethylaluminum (2,6-di-t-butyl-4-methylphenoxide), ethylaluminum bis(2,6-di-t-butyl-4-methylphenoxide), diisobutylaluminum (2,6-di-t-butyl-4-methylphenoxide) and isobutylaluminum bis (2,6-di-t-butyl-4-methylphenoxide);

dialkylaluminum halides such as dimethylaluminum chloride, diethylaluminum chloride, dibutylaluminum chloride, diethylaluminum bromide and diisobutylaluminum chloride;

partially halogenated alkylaluminums such as alkylaluminum sesquihalides, e.g., ethylaluminum sesquichloride, butylaluminum sesquichloride, ethylaluminum sesquibromide; and alkylaluminum dihalides, e.g., ethylaluminum dichloride, propylaluminum dichloride, butylaluminum dibromide; and dialkylaluminum hydrides such as diethylaluminum hydride and dibutylaluminum hydride;

other partially hydrogenated alkylaluminums, such as alkylaluminum dihydrides, e.g., ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

Analogues to (B-3a) may also be used, for example organoaluminum compounds wherein 2 or more aluminum compounds are bonded through nitrogen atoms. As a specific example of such a compound there may be mentioned:

$(C_2H_5)_2 AlN(C_2H_5)Al(C_2H_5)_2$.

As compounds defined by (B-3b) above there may be mentioned:

$LiAl(C_2H_5)_4$ $LiAl(C_7H_{15})_4$, etc.

Other compounds which may be used as the organometallic compound (B-3) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Compounds which form the aforementioned organoaluminum compounds in polymerization systems, such as combinations of halogenated aluminum and alkyllithium, or combinations of halogenated aluminum and alkylmagnesium, may also be used. Preferred among these are organoaluminum compounds singly used.

Preferred organoaluminum compounds (B-3') in the olefin polymerization catalyst (1) may be represented, for example, by the following general formula (VIII).

$$R^a_n AlX_{3-n} \qquad (VIII)$$

where $R^a$ represents a hydrocarbon group of 1 to 12 carbon atoms, X represents a halogen atom or hydrogen atom, and n is 1 to 3.

In formula (VIII) above, $R^a$ is a hydrocarbon group of 1 to 12 carbon atoms, such as an alkyl, cycloalkyl or aryl group, and include specific group such as methyl, ethyl, n-propyl, isopropyl, isobutyl, pentyl, hexyl, octyl, cyclopentyl, cyclohexyl, phenyl and tolyl.

The following compounds may be mentioned as specific examples of such organoaluminum compounds:

trialkylaluminums such as trimethylaluminum, triethylaluminum, triisopropylaluminum, triisobutylaluminum, trioctylaluminum and tri 2-ethylhexylaluminum;

alkenylaluminums such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Compounds represented by the following formula (IX) may be used as preferred organoaluminum compounds.

$$R^a_n AlY_{3-n} \qquad (IX)$$

where $R^a$ is as defined previously, Y represents an $-OR^b$ group, $-OSiR^c_3$ group, $-OAlR^d_2$ group, $-NR^e_2$ group, $-Si^f_3$ group or $-N(R^g)AlR^h_2$ group, n is 1 to 2, $R^b$, $R^c$, $R^d$ and $R^h$ represent methyl, ethyl, isopropyl, isobutyl, cyclohexyl, phenyl, etc., $R^e$ represents hydrogen, methyl, ethyl, isopropyl, phenyl, trimethylsilyl, etc., and $R^f$ and $R^g$ represent methyl, ethyl, etc.

The following compounds may be mentioned as specific examples of such organoaluminum compounds:

(i) Compounds represented by $R^a_n Al(OR^b)_{3-n}$, for example dimethylaluminum methoxide, diethylaluminum ethoxide, diisobutylaluminum methoxide, etc.

(ii) Compounds represented by $R^a_n Al(OSiR^c_3)$ 3n, for example $(C_2H_5)_2 Al(OSi(CH_3)_3)$, $(iso\text{-}C_4H_9)_2 Al(OSi (CH_3)_3)$, $(iso\text{-}C_4H_9)_2 Al(OSi(C_2H_5)_3)$, etc.

(iii) Compounds represented by $R^a_n Al(OAlR^d_2)_{3-n}$, for example $(C_2H_5)_2 Al(OAl(C_2H_5)_2)$, $(iso\text{-}C_4H_9)_2 Al(OAl(iso\text{-}C_4H_9)_2)$, etc.

(iv) Compounds represented by $R^a_n Al(NR^e_2)_{3-n}$, for example
$(CH_3)_2 Al(N(C_2H_5)_2)$,
$(C_2H_5)_2 Al(NH(CH_3))$,
$(CH_3)_2 Al(NH(C_2H_5))$,
$(C_2H_5)_2 Al[N(Si(CH_3)_3)_2]$,
(iso-$C_4H_9)_2 Al[N(Si(CH_3)_3)_2]$, etc.

(v) Compounds represented by $R^a_n Al(SiR^f_3)_{3-n}$, for example
(iso-$C_4H_9)_2 Al(Si(CH_3)_3)$, etc.

According to the present invention, organoaluminum compounds represented by $R^a_3 Al$, $R^a_n Al(OR^b)_{3-n}$ and $R^a_n Al(OAlR^d_2)$3-n are preferred among these examples, and particularly preferred are compounds wherein $R^a$ is isoalkyl and n=2. These organoaluminum compounds may be used singly or in combinations of 2 or more.

The olefin polymerization catalyst (1) of the invention is produced from one of the aforementioned transition metal amide compounds (A) and at least one compound selected from among organoaluminum oxy-compounds (B-1), ionizing ionic compounds (B-2) and organometallic compounds (B-3). Among these there are preferred catalysts comprising a transition metal amide compound (A) and an organoaluminum oxy-compound (B-1) and/or an ionizing ionic compound (B-2), and optionally an organoaluminum compound (B-3).

FIG. 1 shows an embodiment of an olefin polymerization step using an olefin polymerization catalyst (1).

The process for producing the olefin polymer of the invention includes homopolymerization of an olefin, or copolymerization of 2 or more α-olefins, or further copolymerization of 2 or more α-olefins with a polyene-based monomer, each in the presence of the olefin polymerization catalyst (1).

Examples of olefins to be used in the production process for olefin polymers using the olefin polymerization catalyst (1) include
linear or branched α-olefins of 2 to 20 carbon atoms, such as ethylene, propylene, 1-butene, 1-pentene, 1-hexene, 4-methyl-1-pentene, 3-methyl-1-pentene, 1-heptene, 1-octene, 1-nonene, 1-decene, 1-undecene, 1-dodecene, 1-tetradecene, 1-hexadecene and 1-octadecene; and
α-olefins of 3 to 20 carbon atoms having an alicyclic or aromatic ring, such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene and vinylcyclohexane.

Typical olefins which may be used in the production process for olefin polymers using the olefin polymerization catalyst (1) include the polar monomers listed below, and typical olefin polymers include polymers of one or more of these and copolymers of the following polar monomers with the above-mentioned α-olefins.

The polar monomers include
α,β-unsaturated carboxylic acids such as acrylic acid, methacrylic acid, fumaric acid, maleic anhydride, itaconic acid, itaconic anhydride, bicyclo[2.2.1]-5-eptene-2,3-dicarboxylic acid and their α,β-unsaturated carboxylic acid metal salts of sodium, potassium, lithium, zinc, magnesium, calcium, etc.;
α,β-unsaturated carboxylic acid esters such as methyl acrylate, ethyl acrylate, n-propyl acrylate, isopropyl acrylate, n-butyl acrylate, isobutyl acrylate, t-butyl acrylate, 2-ethylhexyl acrylate, methyl methacrylate, ethyl methacrylate, n-propyl methacrylate, isopropyl methacrylate, n-butyl methacrylate, isobutyl methacrylate, etc.;
unsaturated dicarboxylic acids and their anhydrides, such as maleic acid, itaconic acid, maleic anhydride, etc.;
vinyl esters such as vinyl acetate, vinyl propionate, vinyl caproate, vinyl caprate, vinyl laurate, vinyl stearate, vinyl trifluoroacetate, etc.; and
unsaturated glycidyl group-containing monomers such as glycidyl acrylate, glycidyl methacrylate, monoglycidyl itaconate, etc.

These polar monomers may be used singly, or they may be used in combinations of 2 or more.

The proportion of the α-olefin among the total monomers for copolymerization of the polar monomer and α-olefin is preferably 0.5 to 99.5% by mole, and more preferably 1 to 99% by mole.

The olefin polymer obtained by the process for producing olefin polymers using the olefin polymerization catalyst (1) includes polyethylene, polypropylene, polybutene, poly(4-methyl-pentene-1), polyhexene, polyoctene, ethylene/propylene copolymer, ethylene/butene copolymer, ethylene/hexene copolymer, ethylene/4-methyl-1-pentene copolymer and propylene/butene copolymer, as well as olefin/polar monomer copolymers, specifically including α-olefin/acrylic acid copolymer, α-olefin/methyl acrylate copolymer, α-olefin/ethyl acrylate copolymer, α-olefin/isopropyl acrylate copolymer, α-olefin/n-butyl acrylate copolymer, α-olefin/isobutyl acrylate copolymer, α-olefin/2-ethylhexyl acrylate copolymer, α-olefin/methacrylic acid copolymer, α-olefin/methyl methacrylate copolymer, α-olefin/ethyl methacrylate copolymer, α-olefin/isopropyl methacrylate copolymer, α-olefin/n-butyl methacrylate copolymer, α-olefin/isobutyl methacrylate copolymer, α-olefin/2-ethylhexyl methacrylate copolymer, α-olefin/vinyl acetate copolymer, α-olefin/vinyl propionate copolymer, α-olefin/ethyl acrylate/maleic anhydride copolymer, α-olefin/ethyl acrylate/glycidyl methacrylate copolymer, α-olefin/vinyl acetate/glycidyl methacrylate copolymer and α-olefin/glycidyl methacrylate copolymer.

These α-olefins may also be copolymerized with polyene-based monomers such as butadiene, isoprene, 1,4-hexadiene, dicyclopentadiene and 5-ethylidene-2-norbornene.

Among these are preferred ethylene, propylene, 1-butene, 1-hexene, 1-octene and combinations thereof, particularly in homopolymerization of ethylene and copolymerization of ethylene and α-olefins of 3 or more carbon atoms.

The olefin (co)polymerization using the olefin polymerization catalyst (1) is preferably carried out in an inert hydrocarbon solvent, and specific examples of such inert hydrocarbon solvents include aliphatic hydrocarbons such as propane, butane, pentane, hexane, heptane, octane, decane, dodecane and kerosene, alicyclic hydrocarbons such as cyclopentane, cyclohexane and methylcyclopentane, aromatic hydrocarbons such as benzene, toluene and xylene as well as mixtures thereof, while the olefin itself may also be used as the solvent. Among these are preferred aliphatic hydrocarbons, alicyclic hydrocarbons and the olefin itself.

For (co)polymerization of the olefin, the transition metal amide compound (A) is usually used at about 0.00005 to 0.1 millimole, and preferably about 0.0001 to 0.05 millimole per liter of polymerization volume, in terms of the transition metal atom.

The organoaluminum oxy-compound (B-1) is normally used in an amount of about 1 to 10,000 moles, and preferably 10 to 5,000 moles of aluminum atoms to one mole of the transition metal atoms in the transition metal amide compound (A).

Also, the ionizing ionic compound (B-2) is normally used in an amount of about 0.5 to 20 moles, and preferably 1 to 10 moles of boron atoms to one mole of the transition metal atoms in the transition metal amide compound (A).

Moreover, the organoaluminum compound (B-3) is optionally used in an amount of, usually, about 0 to 200 moles, and preferably about 0 to 100 moles to one mole of aluminum atoms in the organoaluminum oxy-compound (B-1). It may optioanlly be used in an amount of, usually, 0 to 1000 moles, and preferably about 0 to 500 moles, to one mole of boron atoms in the ionizing ionic compound (B-2).

For production of an olefin-based polymer, such as an ethylene-based polymer, according to the invention, the catalyst-forming transition metal amide compound (A), organoaluminum oxy-compound (B-1) and/or ionizing ionic compound (B-2), along with the organoaluminum compound (B-3), may be separately supplied to a polymerization reactor, or alternatively the transition metal amide compound (A), organoaluminum oxy-compound (B-1) and/or ionizing ionic compound (B-2), and optioanlly the organoaluminum compound (B-3) may be mixed beforehand outside of the polymerization reactor to prepare the catalyst by contacting the components for a predetermined time according to necessity, and then supplied to the polymerization reactor.

The transition metal amide compound (A), organoaluminum oxy-compound (B-1) and/or ionizing ionic compound (B-2) and organoaluminum compound (B-3) are mixed and contacted at, usually, −100 to 200° C., and preferably at −70 to 100° C. A hydrocarbon medium which is inert to the reaction of the catalyst components may be used for preparation of the catalyst, and such inert hydrocarbon mediums include those inert hydrocarbon mediums commonly used for polymerization.

The polymerization temperature is usually −60 to 250° C., among which the preferred ranges are 80 to 250° C., more preferably 100 to 220° C., and especially 120 to 200° C.

When the polymerization temperature is set to 80° C. or higher, heat removal is easier and the heat removal apparatus can be downsized. Productivity can also be improved with a non-downsized heat removal apparatus. Even if the polymer concentration is increased for polymerization at high temperature, since the solution viscosity does not increase too much and the agitation force may therefore be reduced, productivity can thereby be improved.

According to the invention, the polymerization pressure is in the range from atmospheric pressure to 100 kg/cm$^2$, preferably from atmospheric pressure to 50 kg/cm$^2$, and more preferably from atmospheric pressure to 30 kg/cm$^2$. The residence time (polymerization time) is usually 0.1 to 4 hours, and preferably 0.2 to 2 hours. The polymerization may be accomplished by any method such as a batch-wise process, semi-continuous process or continuous process. Preferred is a continuous process. The polymerization may also be divided into 2 steps, each of which has a different reaction condition.

The molecular weight of the olefin polymer may be adjusted by altering the polymerization conditions such as the polymerization temperature, etc., and it may also be adjusted by controlling the amount of hydrogen (molecular weight adjustor) used.

The product obtained immediately after polymerization is recovered from the polymerization solution and dried according to conventionally known separation and recovery methods, to obtain the olefin polymer.

Olefin polymers, for example ethylene-based polymers obtained in this manner include polymers having an ethylene/α-olefin compositional ratio in the range of usually 55/45 to 98/2, and preferably 60/40 to 95/5, a melt flow rate (MFR) in the range of usually 0.01 to 200 g/10 minutes, and preferably 0.03 to 100 g/10 minutes, and a density in the range of usually 0.85 to 0.95 g/cm$^3$, and preferably 0.86 to 0.94 g/cm$^3$.

According to the invention, the olefin is (co)polymerized in the presence of the above-mentioned olefin polymerization catalyst (1), and therefore olefin polymers, particularly ethylene (co)polymers, of high molecular weight are obtained, among which ethylene copolymers with high comonomer contents are obtained. Ethylene copolymers with high comonomer contents can also be obtained even when the comonomer concentration is low.

Furthermore, according to the process described above, it is possible to obtain olefin polymers with narrow molecular weight distributions and composition distributions.

An olefin polymerization catalyst (2) according to the present invention is produced from (A') a transition metal amide compound represented by general formula (II) below and at least one compound selected from among (B)
  (B-1) organoaluminum oxy-compounds,
  (B-2) compounds which react with the transition metal amide compound (A') to form ion pairs, and
  (B-3) organometallic compounds.

Each of the components forming the olefin polymerization catalyst (2) will now be explained.

(A') Transition Metal Amide Compound

The transition metal amide compound (A') used for the invention is a compound represented by the following general formula (II):

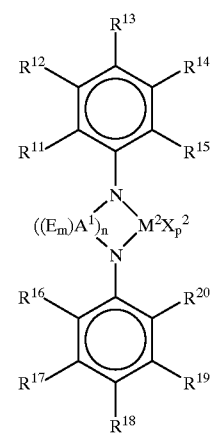

(II)

where M$^2$ represents a transition metal atom of Groups 3 to 6 of the Periodic Table, preferably a transition metal atom of Group 4 of the Periodic Table such as titanium, zirconium or hafnium, especially preferably titanium.

$R^1$ to $R^{20}$ may be the same or different, and each represents a hydrogen atom, a hydrocarbon group which is preferably a hydrocarbon group of 1 to 20 carbon atoms, a halogenated hydrocarbon group, an organosilyl group, an alkoxy group, an aryloxy group, —COOR$^{21}$, —N(R$^{22}$)C(O)R$^{23}$, —OC(O)R$^{24}$, —CN, —NR252 or —N(R$^{26}$)S(O$_2$)R$^{27}$.

Here, at least one of $R^1$ to $R^{15}$ is a group other than a hydrogen atom, and at least one of $R^{16}$ to $R^{20}$ is a group other than a hydrogen atom.

As specific hydrocarbon groups there may be mentioned linear or branched alkyl groups of 1 to 20 carbon atoms such as methyl, ethyl, n-propyl, isopropyl, n-butyl, isobutyl, sec-butyl, tert-butyl, pentyl and hexyl; aryl groups of 6 to 20 carbon atoms such as phenyl, naphthyl and anthryl; substituted aryl groups with 1 to 5 substituents such as the aforementioned alkyl groups of 1 to 20 carbon atoms on these aryl groups; cycloalkyl groups such as cyclopentyl, cyclohexyl, norbornyl and adamantyl; alkenyl groups such as vinyl, propenyl and cyclohexenyl; and arylalkyl groups such as benzyl, phenylethyl and phenylpropyl.

As halogenated hydrocarbon groups there may be mentioned the aforementioned hydrocarbon groups which have been substituted with halogens.

As specific organosilyl groups there may be mentioned methylsilyl, dimethylsilyl, trimethylsilyl, ethylsilyl, diethylsilyl, triethylsilyl, phenylsilyl, diphenylsilyl, triphenylsilyl, dimethylphenylsilyl, methyldiphenylsilyl, etc.

As specific alkoxy groups there may be mentioned methoxy, ethoxy, n-propoxy, isopropoxy, n-butoxy, isobutoxy, tert-butoxy, etc.

As specific aryloxy groups there may be mentioned phenoxy, 2,6-dimethylphenoxy, 2,4,6-trimethylphenoxy, etc.

As groups represented by —COOR$^{21}$, —N(R$^{22}$)C(O)R$^{23}$, —OC(O)R$^{24}$, —CN, —NR$^{25}_2$ or —N(R$^{26}$)S(O$_2$)R$^{27}$ (where $R^{21}$ to $R^{27}$ represent alkyl groups of 1 to 5 carbon atoms) there may be mentioned —COOCH$_3$, —N(CH$_3$)C(O)CH$_3$, —OC(O)CH$_3$, —CN, —N(C$_2$H$_5$)$_2$, —N(CH$_3$) S(O$_2$) CH$_3$, etc.

Two or more of the groups represented by $R^{11}$ to $R^{15}$, preferably adjacent groups, may be linked together to form an aromatic ring, aliphatic ring or other ring together with the carbon atoms to which each is linked, and two or more of the groups represented by $R^{16}$ to $R^{20}$, preferably adjacent groups, may be linked together to form an aromatic ring, aliphatic ring or other ring together with the carbon atoms to which each is linked. In such cases, a ring-containing structure is preferred wherein 3 to 30 of the carbon atoms are in the portion corresponding to the 2 or more groups.

m is 1 or 2.

n is 1 or 2.

The bonding group bonding the 2 nitrogen atoms represented by $((E_m)A^1)_n$ is specifically a bonding group represented by —(E$_m$)A$^1$— or —(E$_m$)A$^1$—(E$_m$)A$^1$—.

$A^1$ represents an atom of Group 14 of the Periodic Table, among which there may be specifically mentioned carbon atoms, silicon atoms, germanium atoms and tin atoms, and preferred are carbon atoms and silicon atoms. When n is 2, the two groups represented by Al may be the same or different.

E may represent the same or different groups and represents at least one atom selected from among carbon, hydrogen, oxygen, halogens, nitrogen, sulfur, phosphorus, boron and silicon or substituents containing these atoms, and preferred are substituents containing one or more atoms selected from among carbon, hydrogen, nitrogen and silicon. Also, any 2 or more groups represented by E may be linked together to form a ring.

As specific bonding groups represented by $((E_m)A^1)_n$ bonding the 2 nitrogen atoms there may be mentioned the following groups:

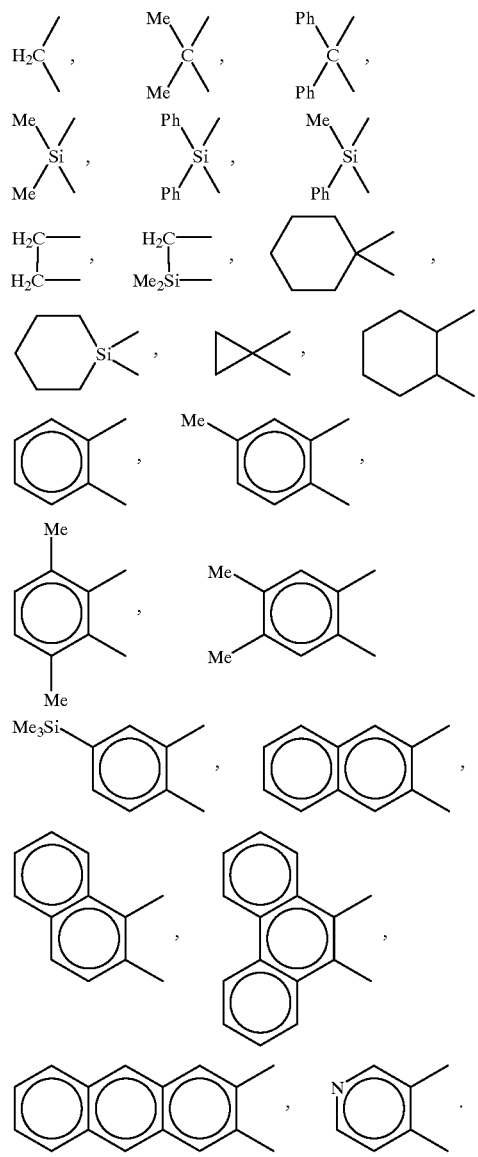

In these examples, Me represents methyl and Ph represents phenyl.

p represents an integer of 0 to 4.

$X^2$ represents a hydrogen or halogen atom, a hydrocarbon group of I to 20 carbon atoms, a halogenated hydrocarbon group of 1 to 20 carbon atoms, or an oxygen-containing group, sulfur-containing group or silicon-containing group. When p is 2 or greater the groups represented by $X^2$ may be the same or different.

As halogen atoms there may be mentioned fluorine, chlorine, bromine and iodine.

As hydrocarbon groups of 1 to 20 carbon atoms there may be mentioned alkyl, cycloalkyl, alkenyl, arylalkyl and aryl groups; and specifically alkyl groups such as methyl, ethyl, propyl, butyl, hexyl, octyl, nonyl, dodecyl and eicosyl; cycloalkyl groups such as cyclopentyl, cyclohexyl, norbornyl and adamantyl; alkenyl groups such as vinyl, propenyl and cyclohexenyl; arylalkyl groups such as benzyl, phenylethyl and phenylpropyl; and aryl groups such as phenyl, tolyl, dimethylphenyl, trimethylphenyl, ethylphenyl, propylphenyl, biphenyl, naphthyl, methylnaphthyl, anthryl and phenanthryl.

As halogenated hydrocarbon groups of 1 to 20 carbon atoms there may be mentioned the aforementioned hydrocarbon groups of 1 to 20 carbon atoms which have been substituted with halogens.

As oxygen-containing groups there may be mentioned: hydroxy groups; alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy. Of these oxygen-containing groups, preferred are those with up to 20 carbon atoms.

As sulfur-containing groups there may be mentioned those oxygen-containing groups mentioned above which have been substituted with sulfur for oxygen, as well as sulfonate groups such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate, and sulfinates such as methyl sulfinate, phenyl sulfinate, benzyl sulfinate, p-toluene sulfinate, trimethylbenzene sulfinate and pentafluorobenzene sulfinate.

As silicon-containing groups there may be mentioned monohydrocarbon-substituted silyls such as methylsilyl and phenylsilyl; dihydrocarbon-substituted silyls such as dimethylsilyl and diphenylsilyl; trihydrocarbon-substituted silyls such as trimethylsilyl, tiethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls such as trimethylsilyl ether; silicon-substituted alkyl groups such as trimethylsilyl methyl; and silicon-substituted aryl groups such as trimethylsilyl phenyl.

Among these are preferred halogen atoms, hydrocarbon groups of 1 to 20 carbon atoms and sulfonate groups.

The following are specific, but not limitative examples of transition metal amide compounds represented by general formula (I) above.

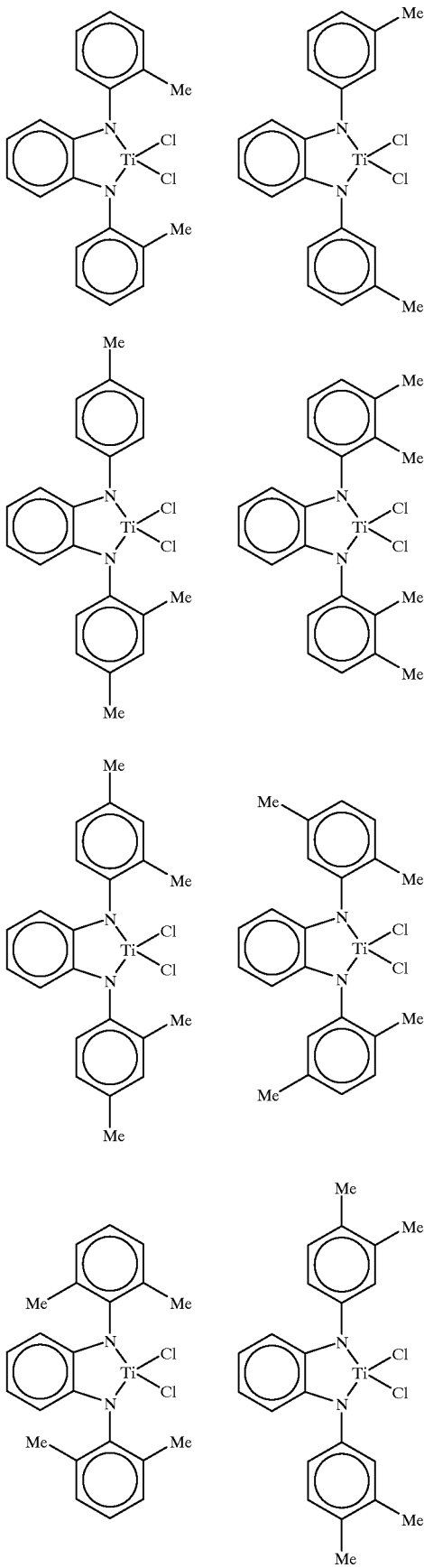

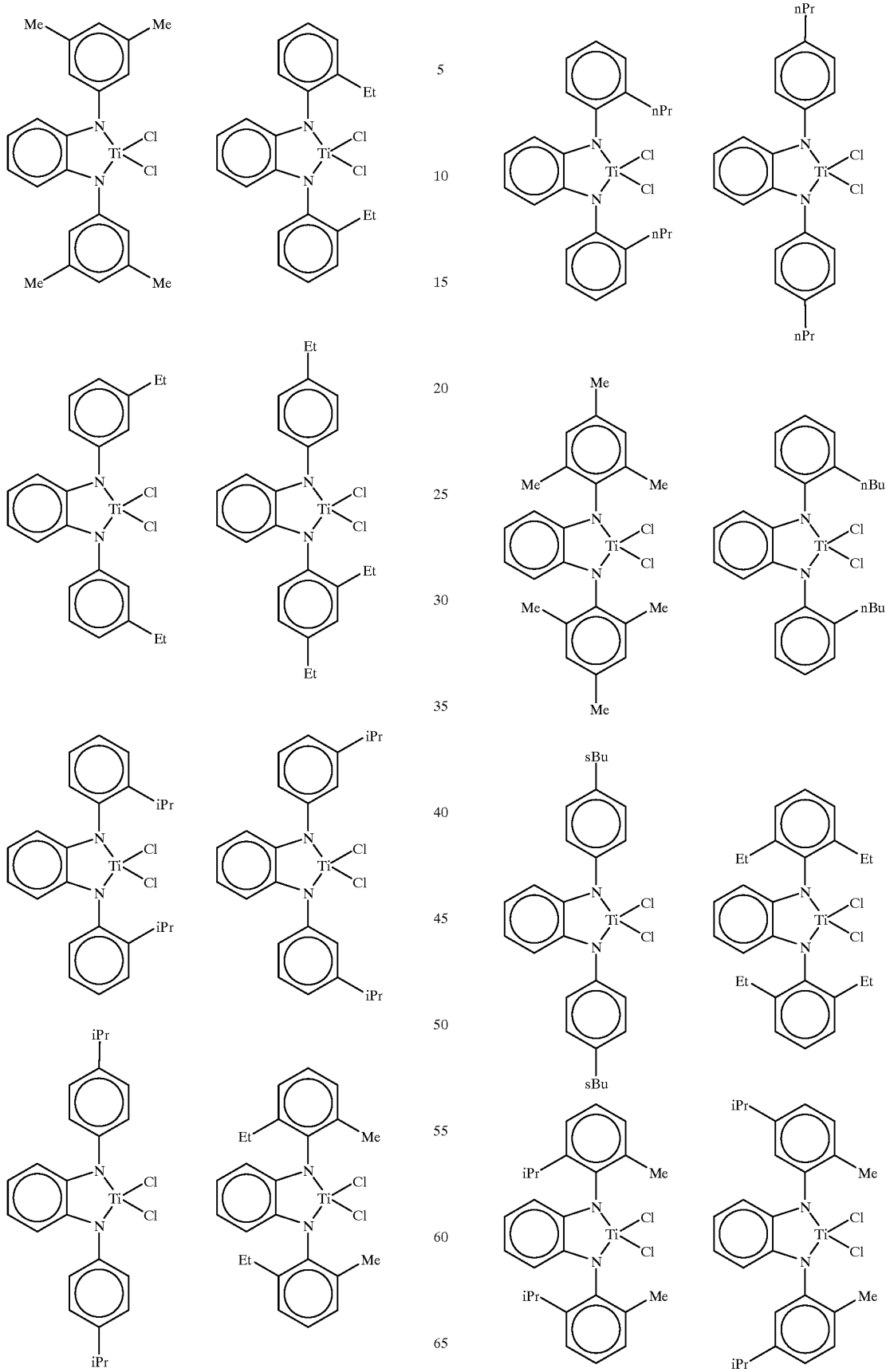

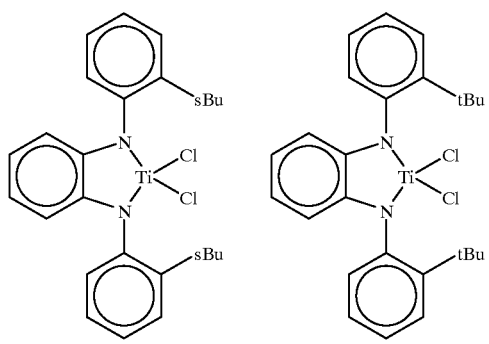
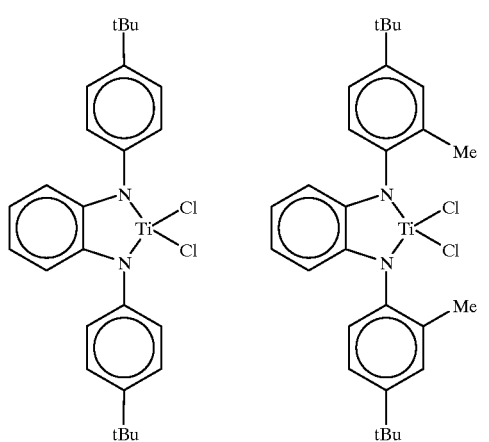
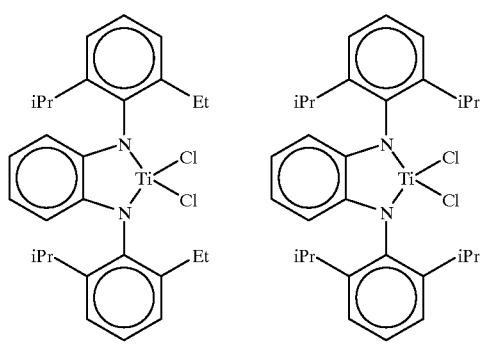
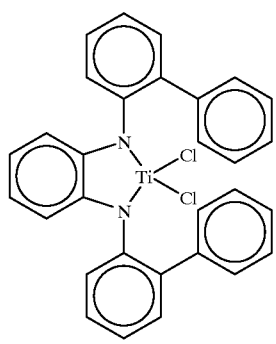
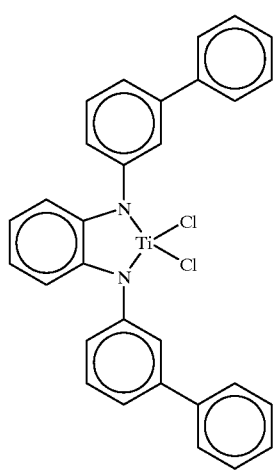
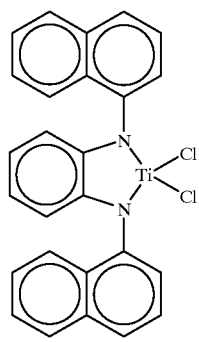
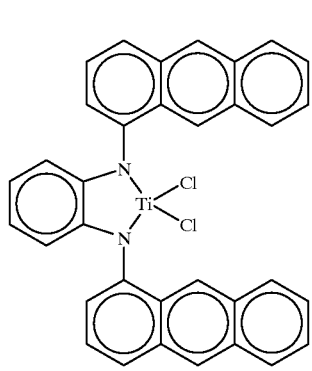

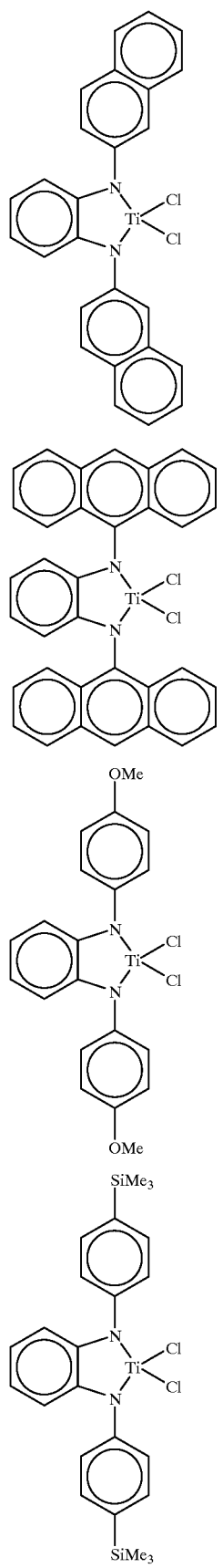
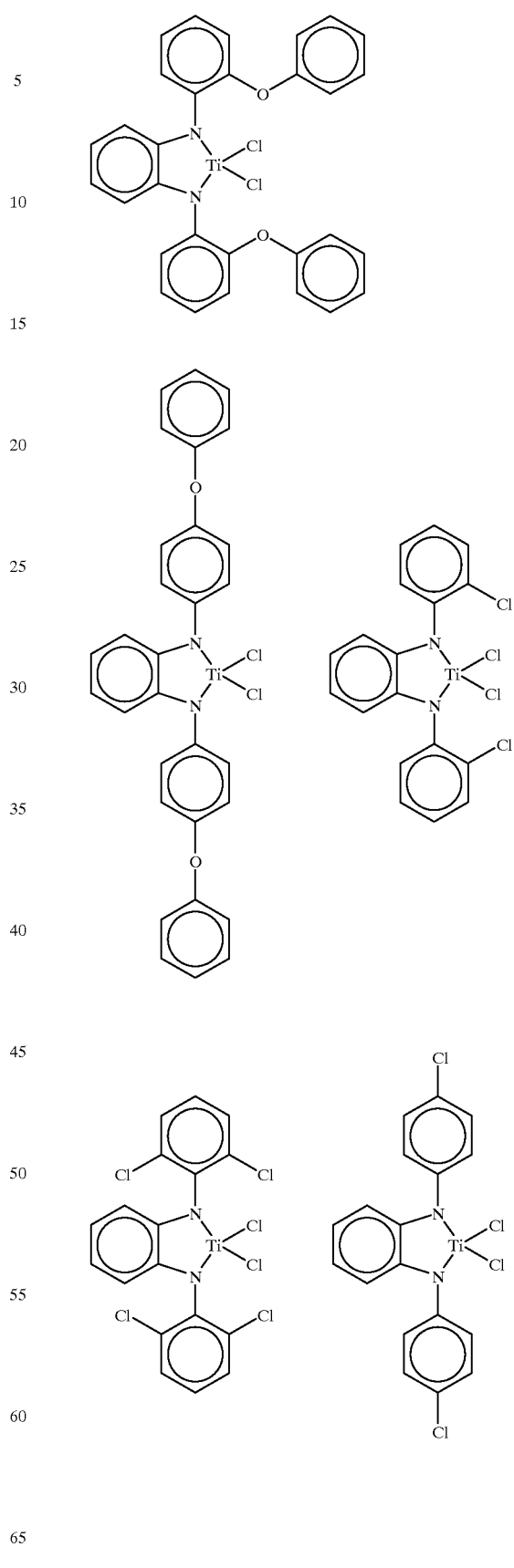

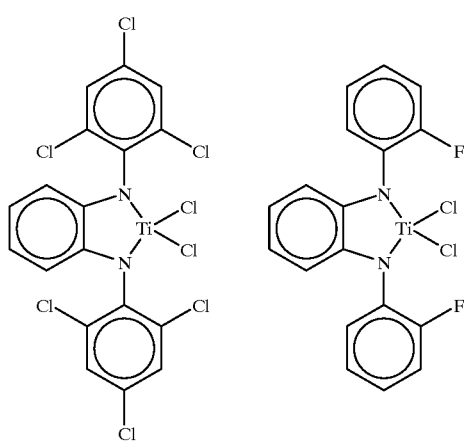
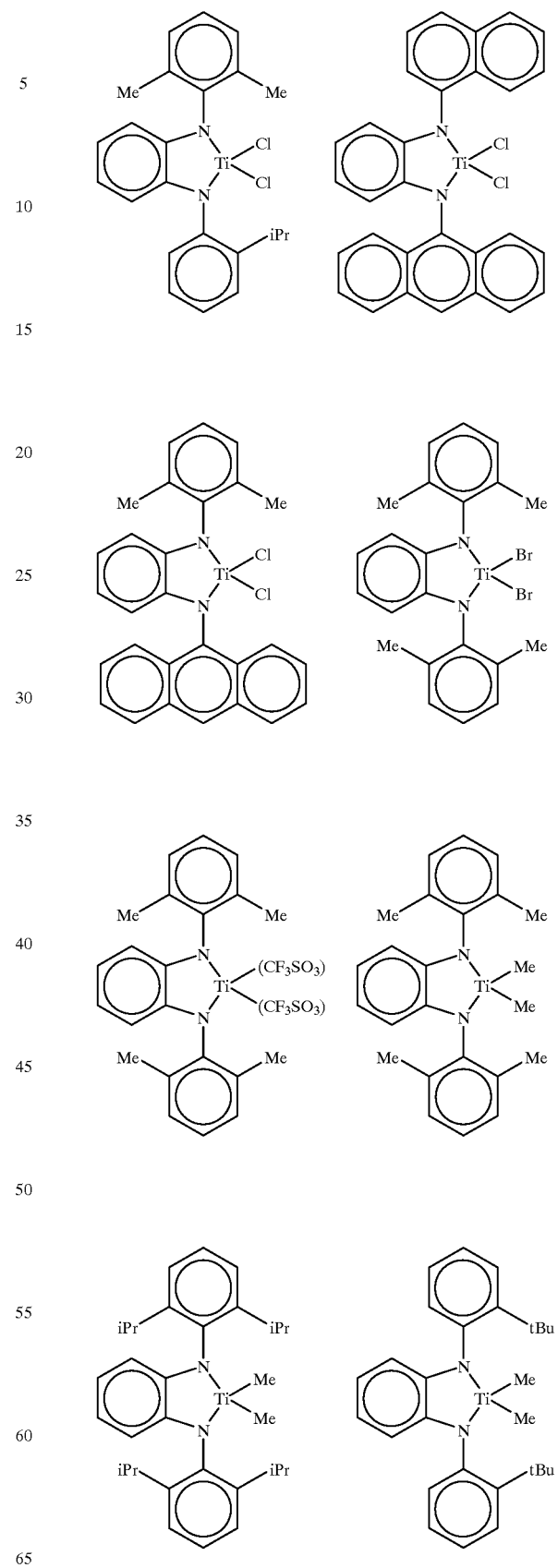

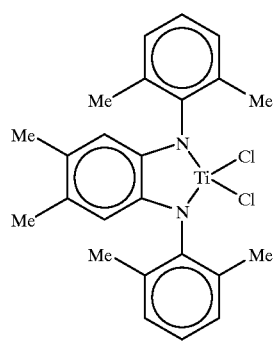
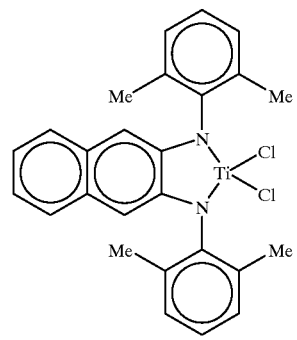
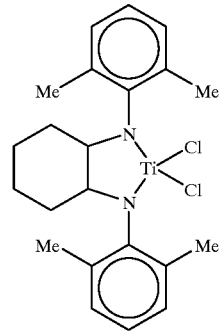
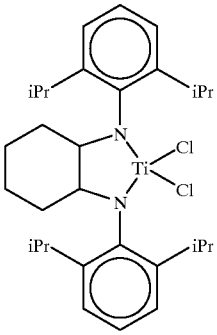
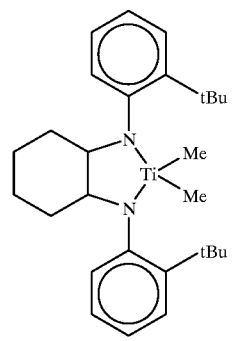
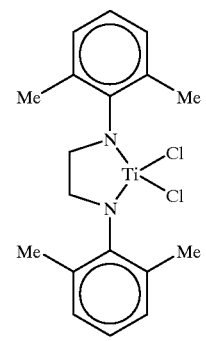
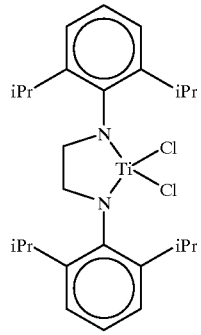
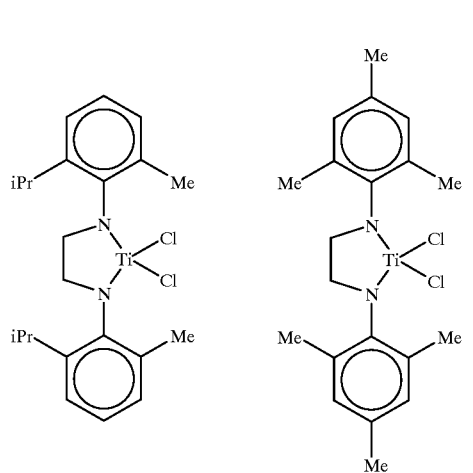
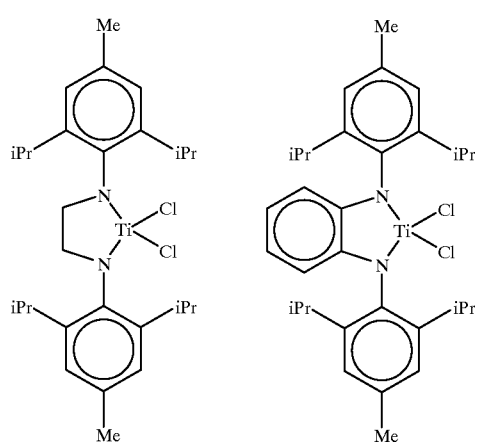
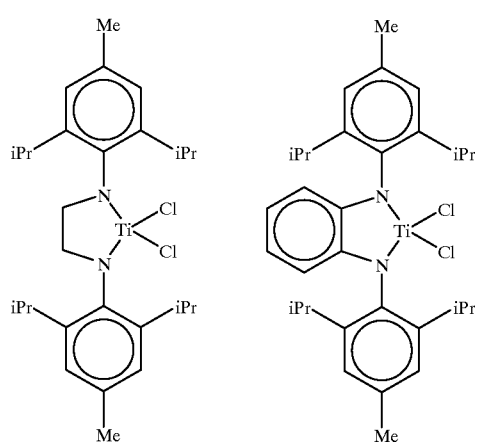
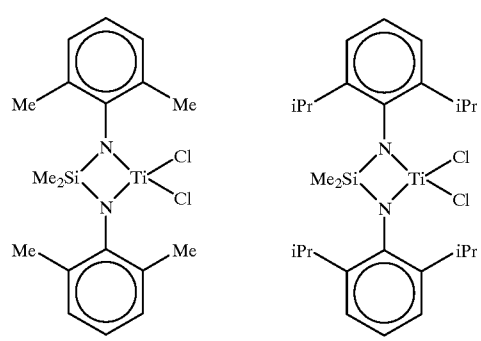

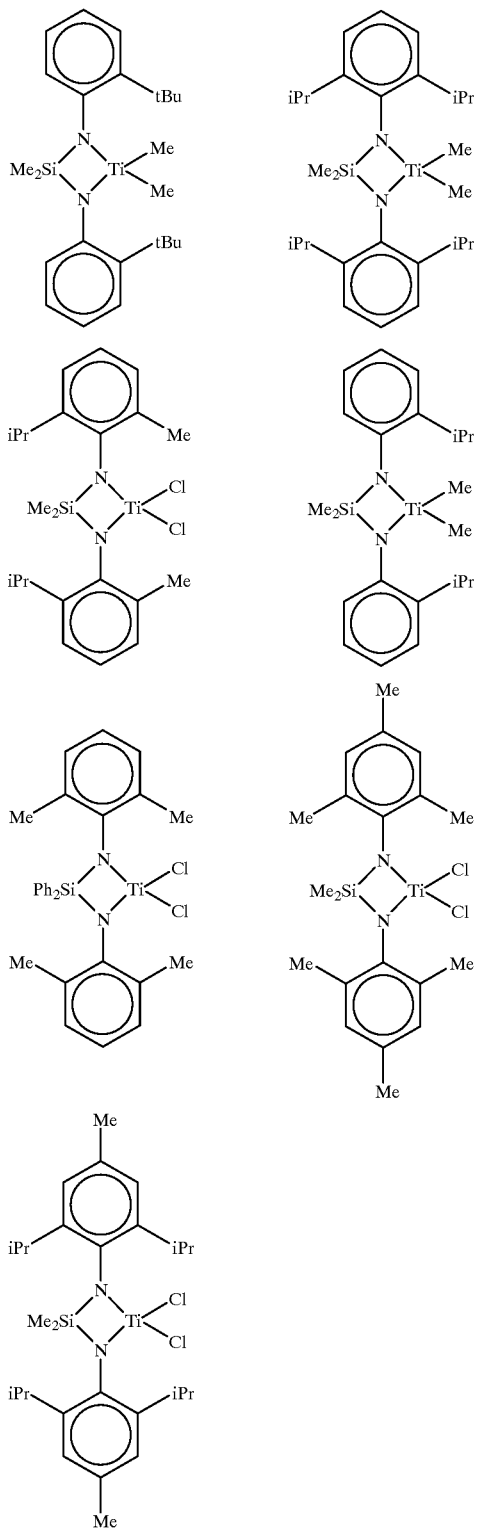

Incidentally, in these examples Me represents methyl, Et represents ethyl, nPr represents n-propyl, iPr represents i-propyl, sBu represents sec-butyl, tBu represents tert-butyl and nOct represents n-octyl.

According to the invention, transition metal amide compounds (A') wherein titanium in these compounds is replaced with zirconium or hafnium may also be used.

Preferred among these transition metal amide compounds (A') are transition metal amide compounds in which $M^2$ is titanium and the group bonding the two nitrogen atoms is a cyclic hydrocarbon compound residue, preferably a cyclic hydrocarbon compound residue of 3 to 30 carbon atoms in the ring-containing structure, and particularly preferred are transition metal amide compounds in which the group bonding the two nitrogen atoms is an aromatic hydrocarbon compound residue such as benzene.

These transition metal amide compounds (A') may be used singly, or used in combinations of 2 or more.

The organoaluminum oxy-compound (B-1) and organometallic compound (B-3) used in the olefin polymerization catalyst (2) of the present invention are from the same compounds mentioned above. The compound (B-2) which reacts with the transition metal amide compound (A') to form an ion pair is from the same compounds given for the above-mentioned ionizing ionic compound.

The olefin polymerization catalyst (2) may contain, in addition to one of the transition metal amide compounds (A') mentioned above and at least one compound (B) selected from among organoaluminum oxy-compounds (B-1), ionizing ionic compounds (B-2) and an organometallic compound (B-3), also optionally a fine particle carrier (C) as described below.

(C) Fine Particle Carrier

The fine particle carrier (C) to be optionally used in the olefin polymerization catalyst (2) is an inorganic or organic compound which is a granular to fine particle solid with a particle size of 10 to 300 μm, and preferably 20 to 200 μm. Preferred as such inorganic compounds are porous oxides, and specifically $SiO_2$, $Al_2O_3$, $MgO$, $ZrO$, $TiO_2$, $B_2O_3$, $CaO$, $ZnO$, $BaO$, $ThO_2$ and mixtures containing them, such as $SiO_2$-$MgO$, $SiO_2$-$Al_2O_3$, $SiO_2$-$TiO_2$, $SiO_2$-$V_2O_5$, $SiO_2$-$Cr_2O_3$ and $SiO_2$-$TiO_2$-$MgO$. Among these are preferred mixtures composed mainly of at least one component selected from the group consisting of $SiO_2$ and $Al_2O_3$.

There is no problem with adding a small amount of a carbonate salt, sulfate salt, nitrate salt or oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$, to the aforementioned inorganic oxides.

The nature of the fine particle carrier (C) will differ depending on its type and the production process, but carriers preferably used for the invention have specific surface areas in the range of 50 to 1000 m²/g, and preferably 100 to 700 m²/g, and pore volumes in the range of 0.3 to 2.5 cm³/g. Such carriers are used by firing, if necessary, at 100 to 1000° C, and preferably 150 to 700° C.

The fine particle carrier (C) to be used according to the invention may also be a granular or fine particle solid of an organic compound of particle size in the range of 10 to 300μm. Examples of such organic compounds include (co) polymers produced with the main component an α-olefin of 2 to 14 carbon atoms such as ethylene, propylene, 1-butene and 4-methyl-1-pentene, and polymers or copolymers produced with the main component vinylcyclohexane or styrene.

The olefin polymerization catalyst (2) of the present invention comprises the aforementioned transition metal amide catalyst (A') and at least one compound (B) selected from among organoaluminum oxy-compounds (B-1), ionizing ionic compounds (B-2) and organometallic compounds (B-3), and optionally a fine particle carrier (C). FIG. 2 shows an embodiment of an olefin polymerization step using an olefin polymerization catalyst (2).

The process for producing the olefin polymer of the invention includes embodiments of homopolymerization of an olefin, or copolymerization of 2 or more α-olefins, each of which is conducted in the presence of the olefin polymerization catalyst (2).

The method of use and order of addition of each of the components for the polymerization may be selected as desired. The following methods may be presented as embodiments:

(1) A method whereby component (A') and component (B) which is at least one selected from among organoaluminum oxy-compounds (B-1), ionizing ionic compounds (B-2) and organometallic compounds (B-3) (referred to as "component (B)" hereinafter) are added to the polymerization reactor in the desired order;

(2) A method whereby a catalyst including the pre-contacted component (A') and component (B) is added to the polymerization reactor;

(3) A method whereby a catalyst component obtainable by pre-contacting component (A') and component (B), and another component (B) are added to the polymerization reactor in the desired order. Here, the two components (B) may be the same or different;

(4) A method whereby a catalyst component including component (A') supported on the fine particle carrier (C) and component (B) are added to the polymerization reactor in the desired order;

(5) A method whereby a catalyst including component (A') and component (B) supported on the fine particle carrier (C) is added to the polymerization reactor;

(6) A method whereby a catalyst component including component (A') and component (B) supported on the fine particle carrier (C) and component (B) are added to the polymerization reactor in the desired order. Here, the two components (B) may be the same or different;

(7) A method whereby a catalyst component including component (B) supported on the fine particle carrier (C) and component (A') are added to the polymerization reactor in the desired order; and (8) A method whereby a catalyst component with component (B) supported on the fine particle carrier (C), component (A') and component (B) are added to the polymerization reactor in the desired order. Here, the two components (B) may be the same or different.

Olefin may be prepolymerized on a solid catalyst component having component (A') and component (B) supported on the fine particle carrier (C).

According to the invention, the polymerization may be accomplished by either a liquid phase polymerization process including solution polymerization and suspension polymerization or gas phase polymerization process.

As inert hydrocarbon mediums used for liquid phase polymerization there may be specifically mentioned the same inert hydrocarbon mediums used for the process for preparing olefin polymers using the olefin polymerization catalyst (1) mentioned above, and the olefin itself may also be used as the solvent. Among these are preferred aliphatic hydrocarbons, alicyclic hydrocarbons and the olefin itself.

For polymerization of olefins using the olefin polymerization catalyst (2), the transition metal amide compound (A') is usually used in an amount of $10^{-8}$ to $10^{-2}$ moles, and preferably $10^{-7}$ to $10^{-3}$ moles, to one liter of the reaction volume.

The organoaluminum oxy-compound (B-1) is usually used in an amount such that the aluminum atoms in (B-1) and the transition metal atoms (M) in the transition metal amide compound (A') are in a molar ratio [(B-1)/M] of 10 to 5000, and preferably 20 to 2000. The ionizing ionic compound (B-2) is usually used in an amount such that (B-2) and the transition metal atoms (M) in the transition metal amide compound (A') are in a molar ratio [(B-2)/M] of 1 to 10, and preferably 1 to 5. The organometallic compound (B-3) is usually used in an amount such that (B-3) and the transition metal atoms (M) in the transition metal amide compound (A') are in a molar ratio [(B-3)/M] of 0.01 to 5000, and preferably 0.05 to 2000.

The polymerization temperature is usually in the range of -50 to 200° C, and preferably 0 to 170° C. The polymerization pressure is usually from normal pressure to 100 $kg/cm^2$, and preferably from normal pressure to 50 $kg/cm^2$, and the polymerization reaction may be carried out by a batch-wise process, semi-continuous process or continuous process. The polymerization may also be divided into 2 steps, each of which has a different reaction condition.

The molecular weight of the resulting olefin polymer may be adjusted by adding hydrogen to the polymerization system, or by changing the polymerization temperature.

Olefins which can be polymerized by the olefin polymerization catalyst (2) include α-olefins of 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-i-pentene, 4-methyl-1-hexene, 4,4-dimethyl-1-hexene, 4,4-dimethyl-1-pentene, 4-ethyl-l-hexene, 3-ethyl-l-hexene, 1-octene, 1-decene, 1-dodecene, 1-tetradecene, 1-hexadecene, 1-octadecene and 1-eicosene;

aromatic vinyl compounds such as styrene, dimethylstyrenes, allylbenzene, allyltoluenes and allylnaphthalenes;

alicyclic vinyl compounds such as vinylcyclohexane, vinylcyclopentane, vinylcycloheptane and allylnorbornane;

cyclic olefins such as cyclopentene, cycloheptene, norbornene, 5-methyl-2-norbornene, tetracyclododecene and 2-methyl-1,4,5,8-dimethano-1,2,3,4, 4a,5,8,8a-octahydronaphthalene; linear polyenes of 4 to 20 carbon atoms such as 1,4-pentadiene and 1,5-hexadiene; and cyclic polyenes such as 5-ethylidenenorbornene and dicyclopentadiene.

An olefin polymerization catalyst (3) for the process of the present invention is produced from (A") a transition metal amide compound represented by general formula (III) below and at least one compound selected from among
(B)
(B-1) organoaluminum oxy-compounds,
(B-2) compounds which react with the mentioned transition metal amide compound (A") to form ion pairs, and
(B-3) organometallic compounds.

Each of the components forming the olefin polymerization catalyst (3) for the production process of the invention will now be explained.

(A") Transition Metal Amide Compound

The transition metal amide compound (A") used for the invention is a compound represented by the following general formula (III):

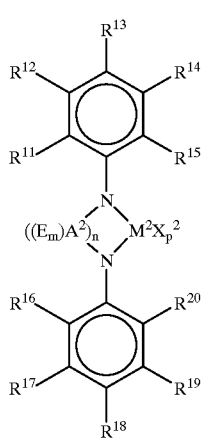

(III)

where $M^2$ represents a transition metal atom of Groups 3 to 6 of the Periodic Table, and preferably a transition metal atom of Group 4 of the Periodic Table such as titanium, zirconium or hafnium, especially preferably titanium.

$R^{11}$ to $R^{20}$ may be the same or different from one another, and have the same definitions as for $R^{11}$ to $R^{20}$ in general formula (II) above.

m is an integer of 0 to 2.

n is an integer of 3 to 5.

Each $A^2$ may be the same or different, and represents an atom of Groups 13 to 16 of the Periodic Table, among which there may be mentioned specifically boron atoms, carbon atoms, nitrogen atoms, oxygen atoms, silicon atoms, phosphorus atoms, sulfur atoms, germanium atoms, selenium atoms and tin atoms. Preferred are carbon atoms or silicon atoms.

E represents at least one atom selected from among carbon, hydrogen, oxygen, halogens, nitrogen, sulfur, phosphorus, boron and silicon or substituents containing these atoms. Preferred are substituents containing one or more atoms selected from among carbon, hydrogen, nitrogen and silicon. Any 2 or more groups represented by E may be linked together to form a ring.

Groups represented by $((E_m)A^2)_n$ bonding two of the nitrogen atoms include the following divalent bonding groups:

—CH$_2$CH$_2$CH$_2$—, —CH$_2$C(Me)$_2$CH$_2$—,
—CH$_2$C(Et)$_2$CH$_2$—, —CH$_2$C(nPr)$_2$CH$_2$—,
—CH$_2$C(iPr)$_2$CH$_2$—, —CH$_2$C(nBu)$_2$CH$_2$—,
—CH$_2$C(iBu)$_2$CH$_2$—, —CH$_2$C(sBu)$_2$CH$_2$—,
—CH$_2$C(cPen)$_2$CH$_2$—, —CH$_2$C(cHex)$_2$CH$_2$—,
—CH$_2$C(Ph)$_2$CH$_2$—, —CH$_2$C(Me)(Et)CH$_2$—,
—CH$_2$C(Me)(iPr)CH$_2$—, —CH$_2$C(Me)(iBu)CH$_2$—,
—CH$_2$C(Me)(tBu)CH$_2$—, —CH$_2$C(Me)(iPen)CH$_2$—,
—CH$_2$C(Me)(Ph)CH$_2$—, —CH$_2$C(Et)(iPr)CH$_2$—,
—CH$_2$C(Et)(iBu)CH$_2$—, —CH$_2$C(Et)(iPen)CH$_2$—,
—CH$_2$C(iPr)(iBu)CH$_2$—, —CH$_2$C(iPr)(iPen)CH$_2$—,
—CH$_2$Si(Me)$_2$CH$_2$—, —CH$_2$Si(Et)$_2$CH$_2$—,
—CH$_2$Si(nBu)$_2$CH$_2$—, —CH$_2$Si(Ph)$_2$CH$_2$—,
—CH(Me)CH$_2$CH(Me)—, —CH(Ph)CH$_2$CH(Ph)—,
—Si(Me)$_2$OSi(Me)$_2$—,

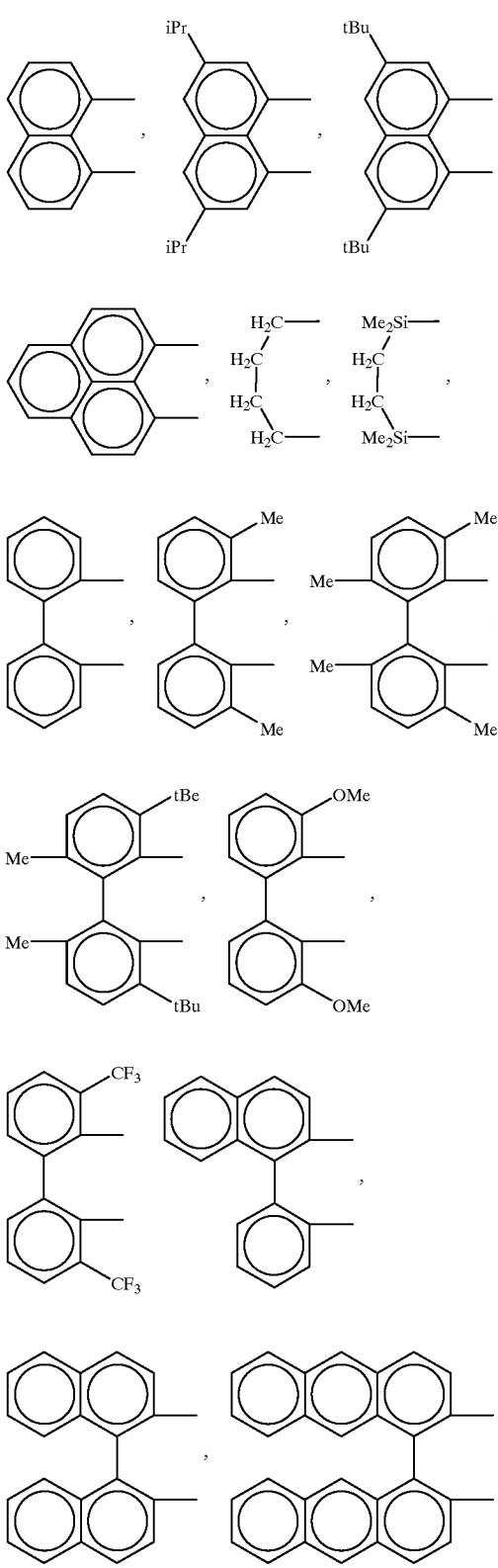

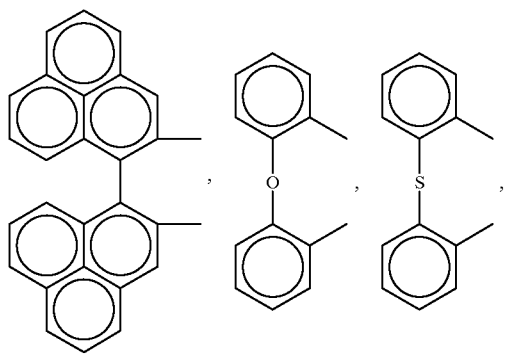

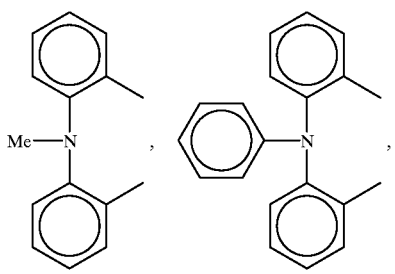

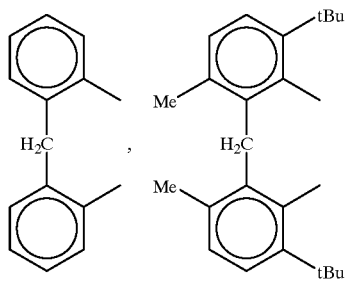

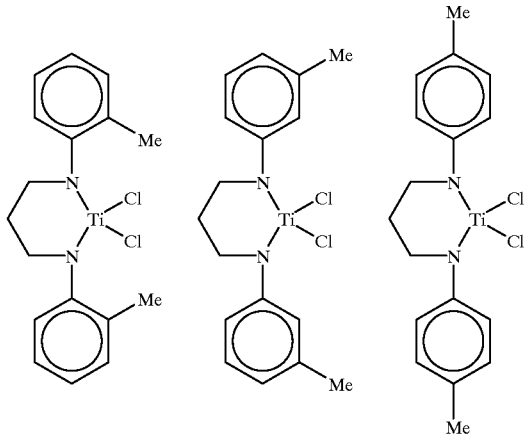

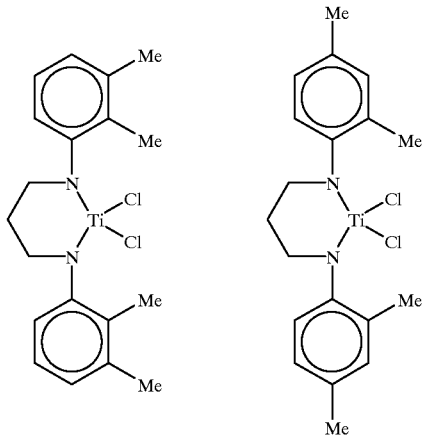

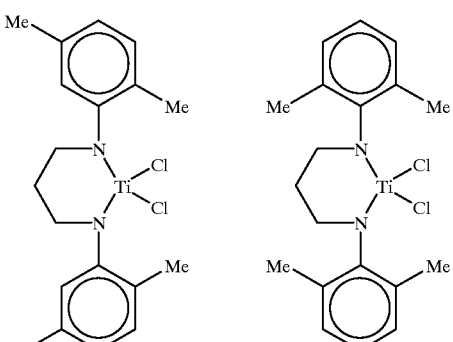

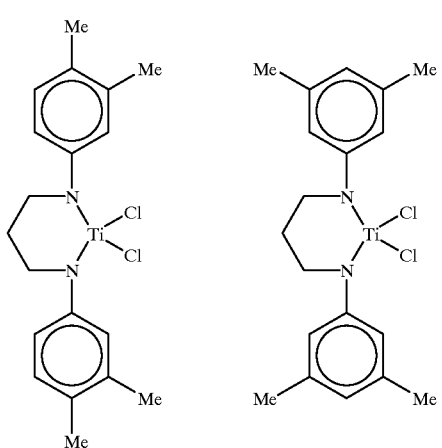

Incidentally, in these examples Me represents methyl, Et represents ethyl, nPr represents n-propyl, iPr represents isopropyl, nBu represents n-butyl, iBu represents isobutyl, sBu represents sec-butyl, tBu represents tert-butyl, iPen represents isopentyl, cPen represents cyclopentyl, cHex represents cyclohexyl and Ph represents phenyl.

p is an integer of 0 to 4.

$X^2$ has the same definition as $X^2$ in general formula (II) above. When p is 2 or greater the groups represented by $x^2$ may be the same or different.

Among these are preferred halogen atoms, hydrocarbon groups of 1 to 20 carbon atoms and sulfonate groups.

The following are specific, but not limitative examples of transition metal amide compounds (A") represented by general formula (III) above.

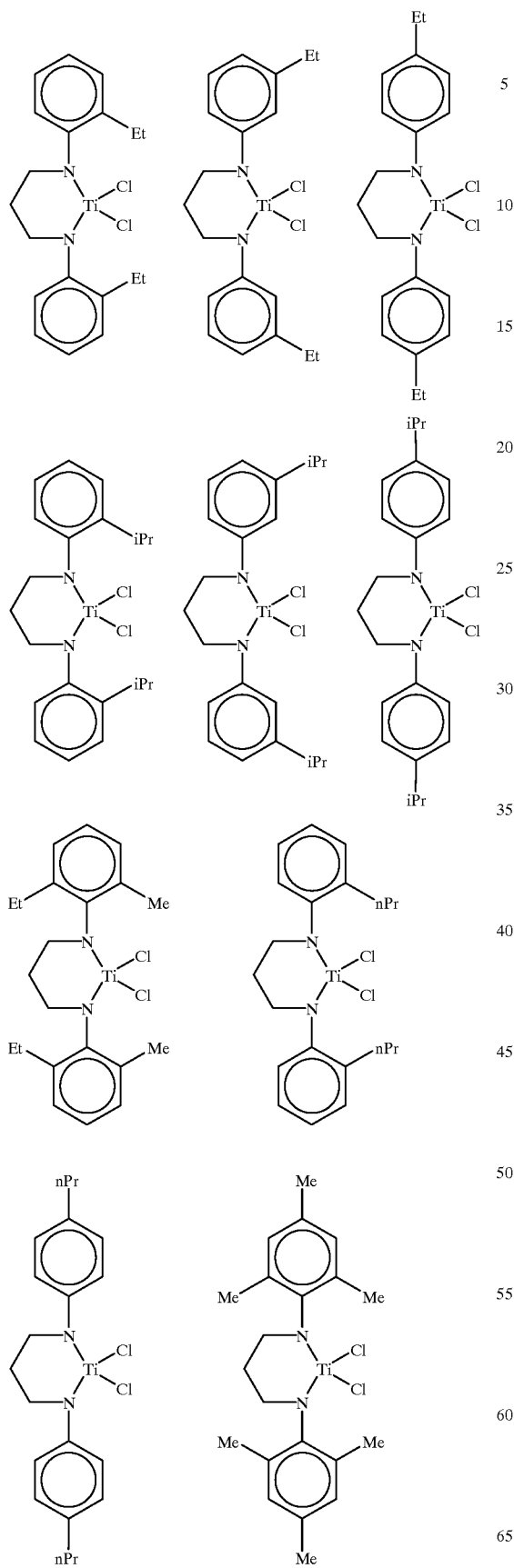
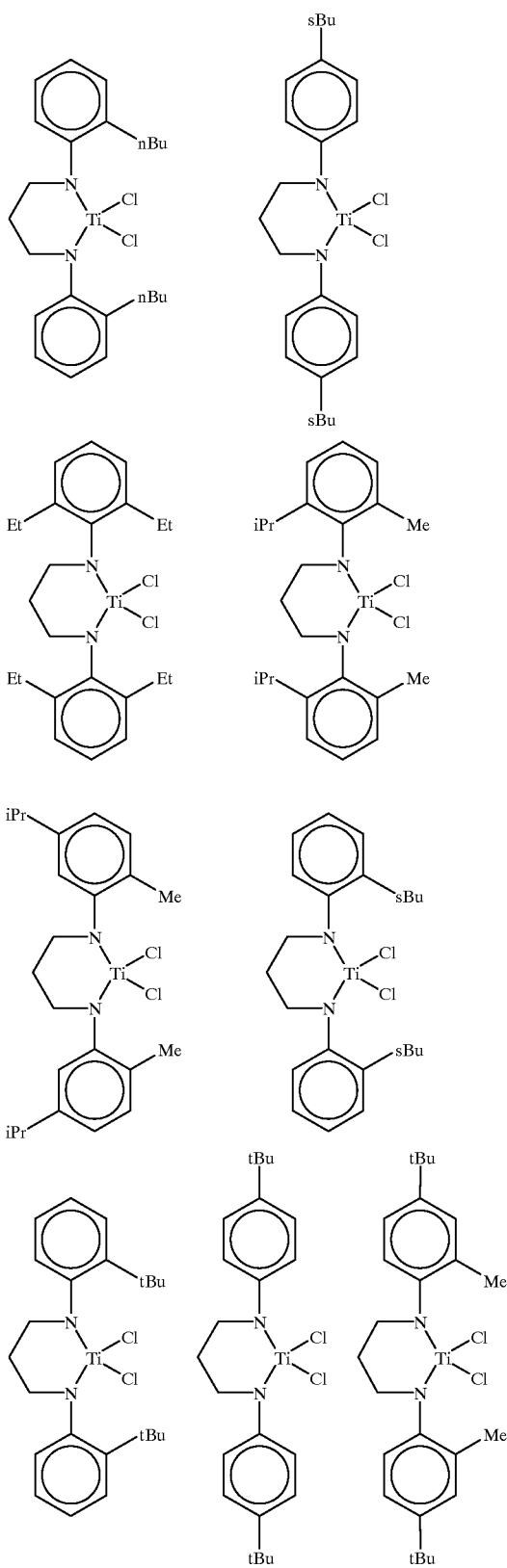

-continued
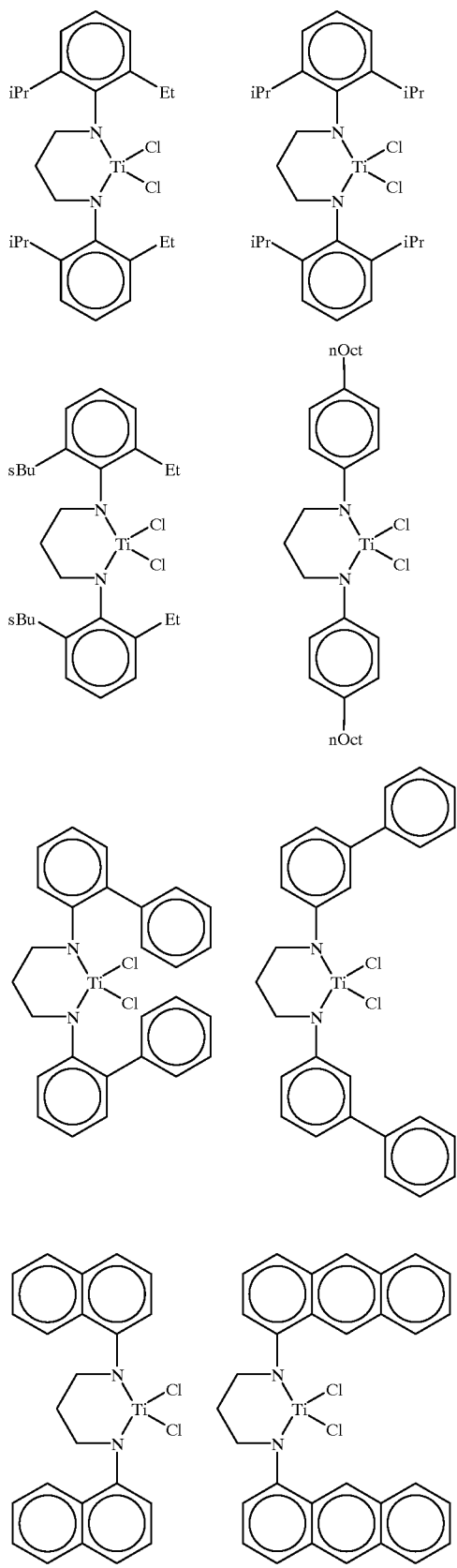
-continued
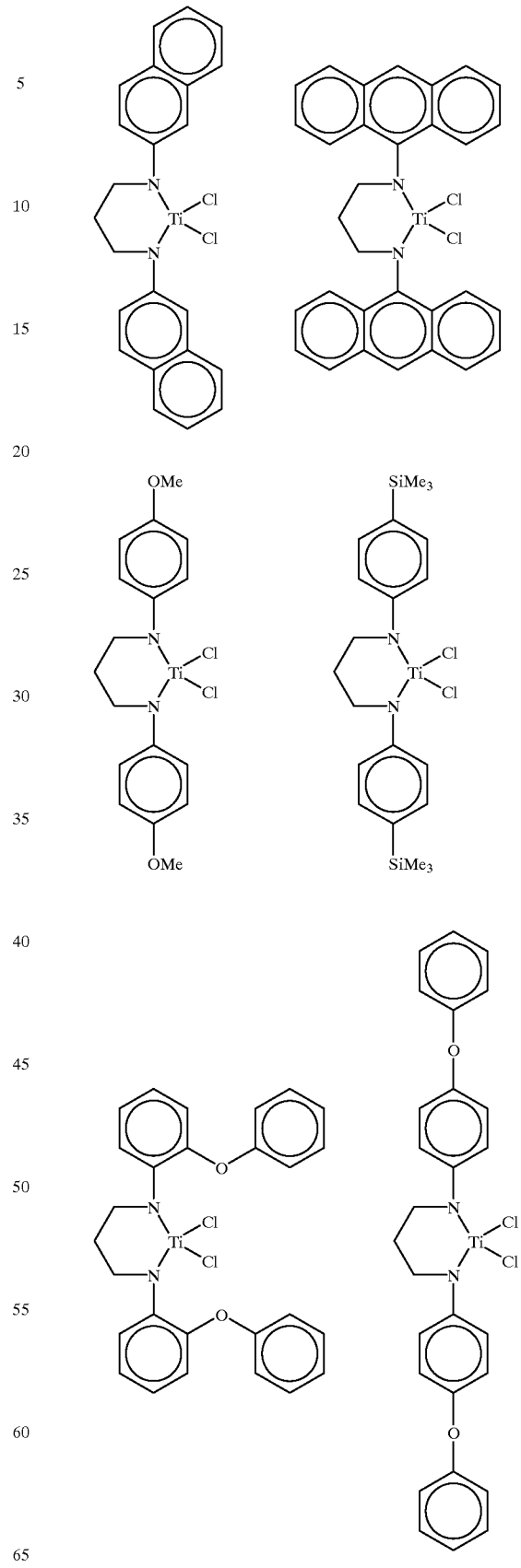

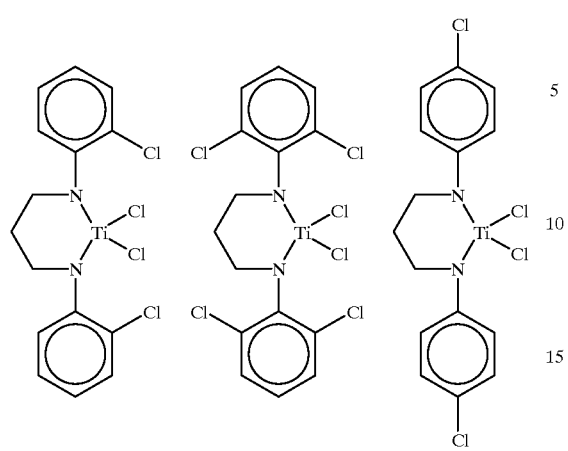
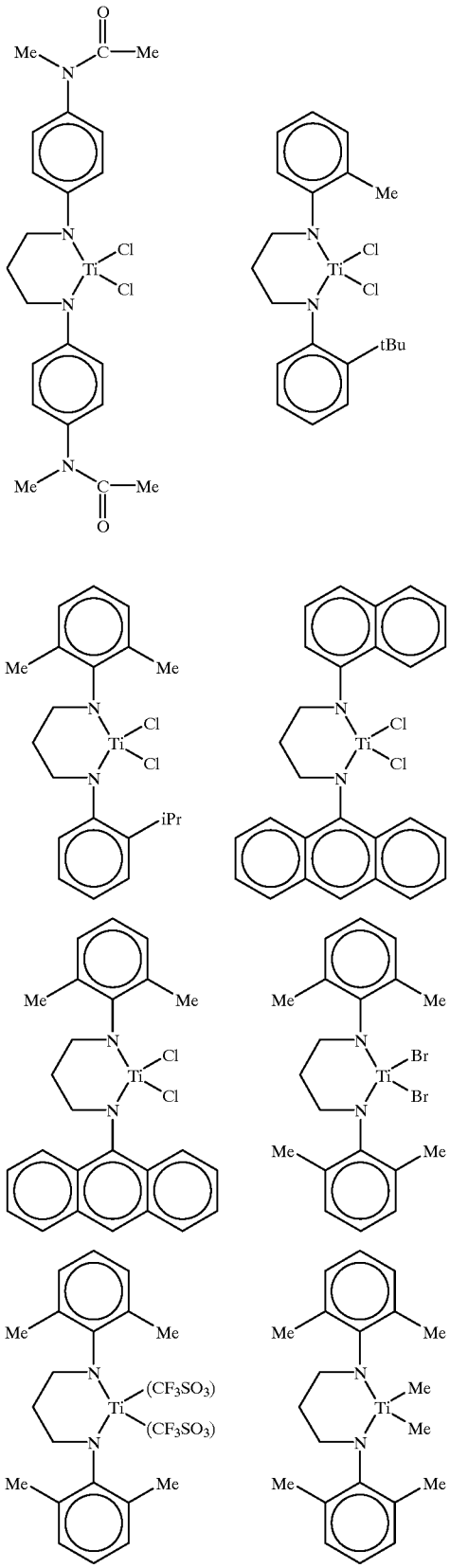

-continued
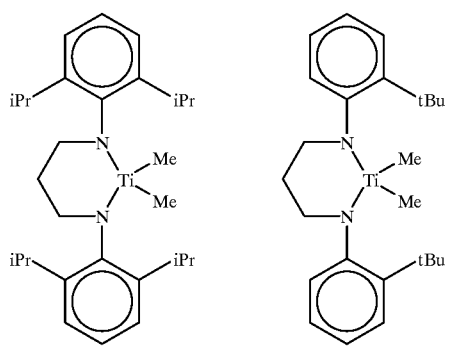
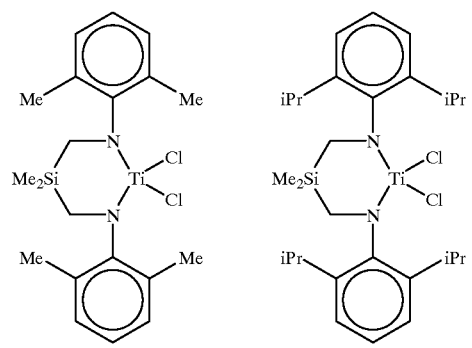
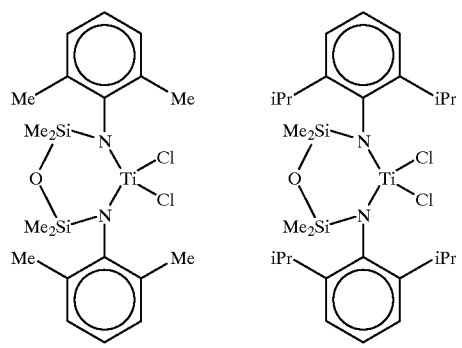
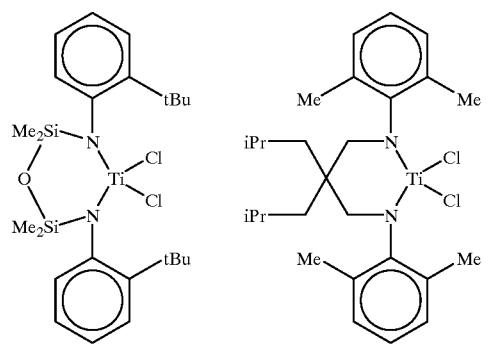
-continued
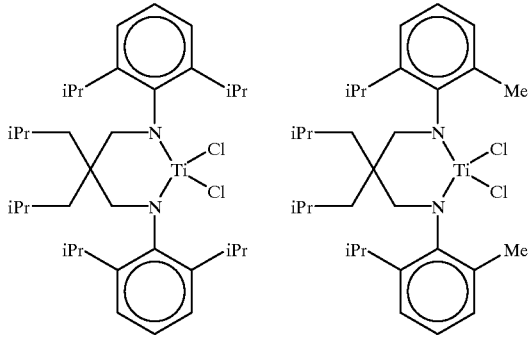
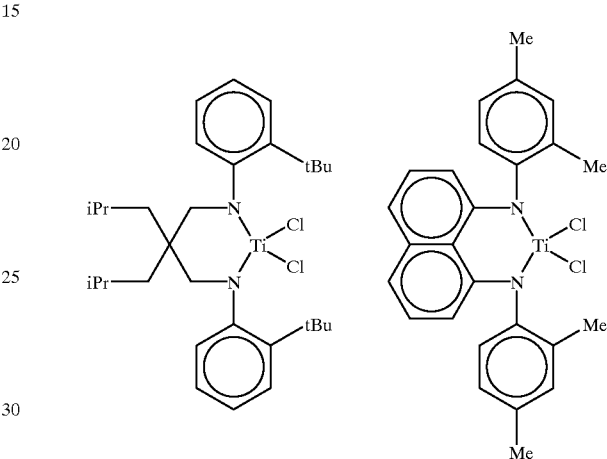
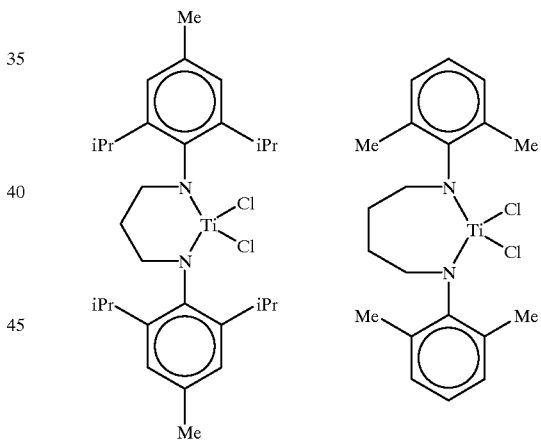
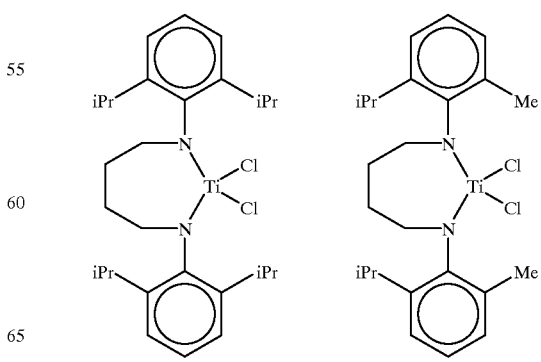

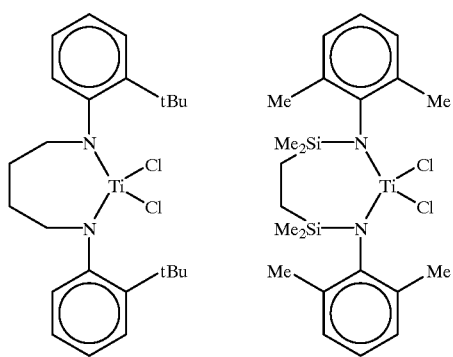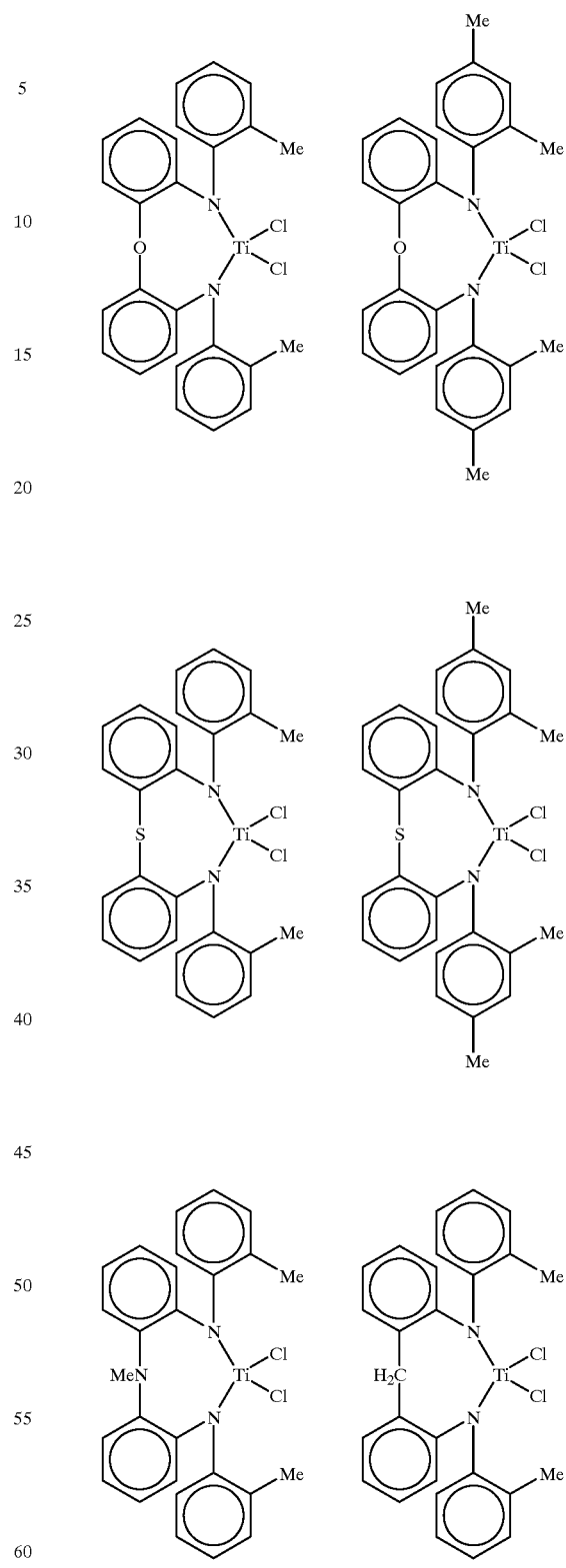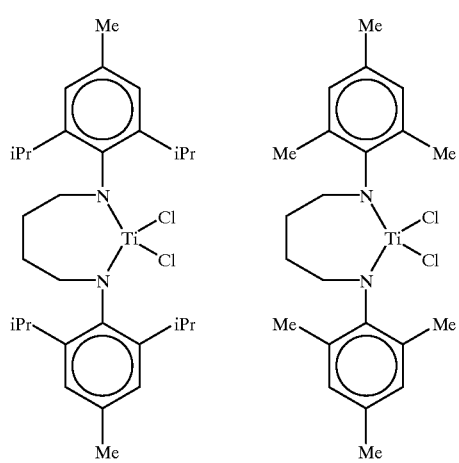

-continued

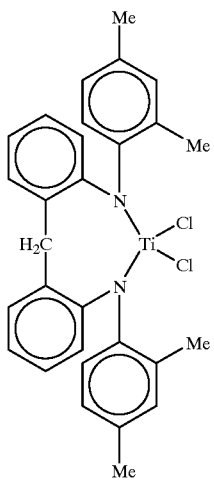

Incidentally, in these examples Me represents methyl, Et represents ethyl, iPr represents iso-propyl, nPr represents n-propyl, nBu represents n-butyl, sBu represents sec-butyl, tBu represents tert-butyl and nOct represents n-octyl.

According to the invention, transition metal amide compounds wherein titanium in these compounds is replaced with zirconium or hafnium may also be used.

Preferred among these transition metal amide compounds (A″) are transition metal amide compounds in which $M^2$ is titanium, $A^2$ in the group bonding two of the nitrogen atoms is carbon or silicon, and n is 3.

These compounds may be used singly, or used in combinations of 2 or more.

The organoaluminum oxy-compound (B-l) and organometallic compound (B-3) used in the olefin polymerization catalyst (3) for the process of the present invention are from the same compounds mentioned above. The compound (B-2) which reacts with the transition metal amide compound (A″) to form an ion pair is selected from the same compounds for the above-mentioned ionizing ionic compound.

The olefin polymerization catalyst (3) for the process of the invention may contain, in addition to the transition metal amide compound(s) (A″) mentioned above and at least one compound (B) selected from among organoaluminum oxy-compounds (B-1) and ionizing ionic compounds (B-2) with an organometallic compound (B-3), and optionally a fine particle carrier (C) as described above. FIG. 3 shows an embodiment of an olefin polymerization step using an olefin polymerization catalyst (3).

The process for producing the olefin polymer of the invention includes such embodiments: i) an aromatic vinyl compound and an α-olefin are copolymerized to produce an aromatic vinyl compound/α-olefin copolymer; ii) an α-olefin of 3 or more carbon atoms and ethylene are copolymerized to produce an ethylene/α-olefin copolymer; iii) at least 2 different α-olefins selected from among α-olefins of at least 3 carbon atoms are copolymerized to produce an α-olefin random copolymer; and iv) a linear or branched olefin and a cyclic olefin are copolymerized to produce a cyclic olefin copolymer, each embodiment being conducted in the presence of the aforementioned olefin polymerization catalyst (3).

For production of aromatic vinyl compound/α-olefin copolymers, ethylene/α-olefin copolymers or α-olefin random copolymers, it is preferred to use an olefin polymerization catalyst (3) comprising a transition metal amide compound (A″), at least one compound (B) selected from among organoaluminum oxy-compounds (B-1), ionizing ionic compounds (B-2) and organometallic compounds (B-3) and optionally a fine particle carrier (C)

Specific α-olefins to be used in the process for preparing aromatic vinyl compound/α-olefin copolymers using the olefin polymerization catalyst (3) according to the process of the invention include linear or branched α-olefins such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. These α-olefins may be used singly or in combinations of 2 or more.

Specific aromatic vinyl compounds to be used in the production process for aromatic vinyl compound/α-olefin copolymers using the olefin polymerization catalyst (3) according to the process of the invention include styrene; mono or polyalkylstyrenes such as o-methylstryene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and 3-phenylpropylene, 4-phenylbutene, α-methylstyrene, etc. These aromatic vinyl compounds may be used singly or in combinations of two or more.

α-olefins of 3 or more carbon atoms to be used in a process for preparing an ethylene/α-olefin copolymer or a process for preparing an α-olefin random copolymer using the olefin polymerization catalyst (3) according to the process of the invention include α-olefins used for the processes for preparing the above-mentioned aromatic vinyl compound/α-olefin copolymers other than ethylene. Preferred among them are α-olefins of 3 to 10 carbon atoms.

In the process for preparing ethylene/α-olefin copolymers or the process for preparing α-olefin random copolymers, a diene such as 1,4-hexadiene or 5-ethylidenenorbornene or a triene such as 1,5,9-decatriene may be copolymerized therewith according to necessity.

The method of use and order of addition of each of the catalytic components may be selected as desired for polymerization in the process for preparing an aromatic vinyl compound/α-olefin copolymer, the process for preparing an ethylene/α-olefin copolymer and the process for preparing an α-olefin random copolymer according to the invention, but the following methods may be presented as embodiments:

(1) A method whereby component (A″) and component (B) which is at least one selected from among organoaluminum oxy-compounds (B-1), ionizing ionic compounds (B-2) and organometallic compounds (B-3) (hereunder referred to as "component (B)") are added to the polymerization reactor in the desired order;

(2) A method whereby a catalyst obtainable by precontacting component (A″) and component (B) is added to the polymerization reactor;

(3) A method whereby a catalyst component obtainable by pre-contacting component (A″) and component (B) is added to the polymerization reactor with component (B) in the desired order. Here, the two components (B) may be the same or different;

(4) A method whereby a catalyst component including component (A") supported on the fine particle carrier (C) and component (B) are added to the polymerization reactor in the desired order;

(5) A method whereby a catalyst including component (A") and component (B) supported on the fine particle carrier (C) is added to the polymerization reactor;

(6) A method whereby a catalyst component including component (A") and component (B) supported on the fine particle carrier (C) and another component (B) are added to the polymerization reactor in the desired order. Here, the two components (B) may be the same or different;

(7) A method whereby a catalyst component including component (B) supported on the fine particle carrier (C) and component (A") are added to the polymerization reactor in the desired order; and (8) A method whereby a catalyst component including component (B) supported on the fine particle carrier (C), component (A") and component (B) are added to the polymerization reactor in the desired order. Here, the two components (B) may be the same or different.

α-olefin may be preppolymerized on a solid catalyst component having component (A") and component (B) supported on the fine particle carrier (C).

According to the invention, the polymerization may be accomplished by either a liquid phase polymerization process including solution polymerization and suspension polymerization, or gas phase polymerization process, but liquid phase polymerization is preferably employed.

As inert hydrocarbon mediums used for liquid phase polymerization there may be specifically mentioned the same inert hydrocarbon mediums used for the process for preparing olefin polymers using the olefin polymerization catalyst (1) mentioned above, and the α-olefin and aromatic vinyl compound themselves, used for the copolymerization, may also be used as the solvents.

Among these inert hydrocarbon mediums are preferred aliphatic hydrocarbons and alicyclic hydrocarbons. The α-olefin itself used for polymerization is also preferred as the solvent.

For the copolymerization, the transition metal amide compound (A") is usually used in an amount of $10^{-8}$ to $10^{-2}$ moles, and preferably $10^{-7}$ to $10^{-3}$ moles, to one liter of the reaction volume.

The organoaluminum oxy-compound (B-1) is usually used in an amount such that the aluminum atoms in (B-1) and the transition metal atoms (M) in the transition metal amide compound (A") are in a molar ratio [(B-1)/M] of 10 to 5000, and preferably 20 to 2000. The ionizing ionic compound (B-2) is usually used in an amount such that (B-2) and the transition metal atoms (M) in the transition metal amide compound (A") are in a molar ratio [(B-2)/M] of 1 to 10, and preferably 1 to 5. The organometallic compound (B-3) is usually used in an amount such that (B-3) and the transition metal atoms (M) in the transition metal amide compound (A") are in a molar ratio [(B-3)/M] of 0.01 to 5000, and preferably 0.05 to 2000.

The polymerization temperature is usually in the range of −50 to 200° C., and preferably 0 to 170° C. The polymerization pressure is usually from normal pressure to 100 kg/cm², and preferably from normal pressure to 50 kg/cm², and the polymerization reaction may be carried out by a batch-wise process, semi-continuous process or continuous process. The polymerization may also be divided into 2 steps, each of which has a different reaction condition.

The molecular weight of the resulting aromatic vinyl compound/α-olefin copolymer, ethylene/α-olefin copolymer or α-olefin random copolymer may be adjusted by adding hydrogen to the polymerization system, or by changing the polymerization temperature.

The aromatic vinyl compound/α-olefin copolymer obtained according to the invention preferably has the structural unit derived from the α-olefin ($U_{O1}$) and the structural unit derived from the aromatic vinyl compound ($U_{Vi}$) in a molar ratio [$(U_{O1}):(U_{Vi})$] of 99:1 to 1:99, and more preferably 98:2 to 2:98. Also, the intrinsic viscosity (η) of the aromatic vinyl compound/α-olefin copolymer obtained according to the invention as measured in a decalin at 135° C. is preferably 0.01 dl/g or greater.

The ethylene/α-olefin random copolymer obtained according to the invention preferably has the structural unit derived from ethylene ($E_{Et}$) and the structural unit derived from the α-olefin of 3 or more carbon atoms ($U_{O1}$) (ii) in a molar ratio [$(E_{Et}):(U_{O1})$] of 99.0:1.0 to 0.1:99.9, and more preferably 98.0:2.0 to 0.1:99.9. Also, the intrinsic viscosity (η) of the ethylene/α-olefin random copolymer obtained according to the invention as measured in a decalin at 135° C. is preferably 0.01 dl/g or greater. Particularly preferred as ethylene/α-olefin random copolymers obtained according to the invention are those having [$(E_{Et}):(U_{O1})$] of 50.0:50.0 to 0.1:99.9 and () of 0.3 dl/g or greater.

The composition of an α-olefin random copolymer obtained according to the invention, having at least 2 different α-olefins, is usually 1 to 99% by mole, and preferably 2 to 98% by mole of one of the α-olefin components, and usually in the range of 1 to 99% by mole, and preferably 2–98% by mole of the other α-olefin. Also, the intrinsic viscosity (η) of the α-olefin random copolymer obtained according to the invention as measured in a decalin at 135° C. is preferably 0.01 to 10 dl/g.

For preparing a cyclic olefin copolymer, it is preferred to use an olefin polymerization catalyst (3) comprising a transition metal amide compound (A") and at least one compound (B) selected from among organoaluminum oxy-compounds (B-1), ionizing ionic compounds (B-2) and organometallic compounds (B-3).

Specific linear or branched olefins to be used in the process for preparing cyclic olefin copolymers using the olefin polymerization catalyst (3) include the aforementioned α-olefins used for the process for preparing aromatic vinyl compound/α-olefin copolymers. These linear or branched olefins may be used singly or in combinations of two or more.

Cyclic olefins to be used in the process for preparing cyclic olefin copolymers using the olefin polymerization catalyst (3) include cyclic olefins represented by the following general formulas (i) and (ii).

(i)

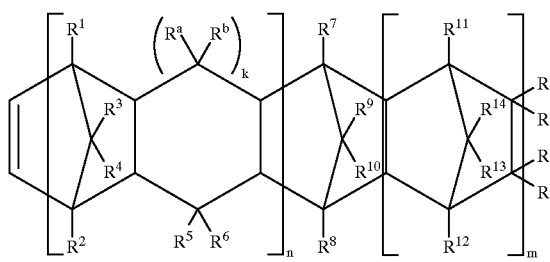

where n is 0 or 1, m is 0 or a positive integer, and k is 0 or 1. When k is 1, the ring represented with k is a 6-membered ring, and when k is 0 the ring is a 5-membered ring.

$R^1$ to $R^{18}$, and $R^a$ and $R^b$ are each independently hydrogen atoms, halogen atoms or hydrocarbon groups.

The halogen atoms are fluorine atoms, chlorine atoms, bromine atoms or iodine atoms.

As hydrocarbon groups there may be mentioned generally alkyl groups of 1 to 20 carbon atoms, halogenated alkyl groups of 1 to 20 carbon atoms, cycloalkyl groups of 3 to 15 carbon atoms and aromatic hydrocarbon groups. More specifically, as alkyl groups there may be mentioned methyl, ethyl, propyl, isopropyl, amyl, hexyl, octyl, decyl, dodecyl and octadecyl. These alkyl groups may also be substituted with halogen atoms.

As cycloalkyl groups there may be mentioned cyclohexyl, and as aromatic hydrocarbon groups there may be mentioned phenyl and naphthyl.

In general formula (i) above, $R^{15}$ and $R^{16}$, $R^{17}$ and $R^{18}$, $R^{15}$ and $R^{17}$, $R^{16}$ and $R^{18}$, $R^{15}$ and $R^{18}$ or $R^{16}$ and $R^{17}$ may each be linked (together) to form a single ring or multiple rings, and the single or multiple rings formed in this manner may include double bonds. As single or multiple rings formed here there may be mentioned the following specific ones.

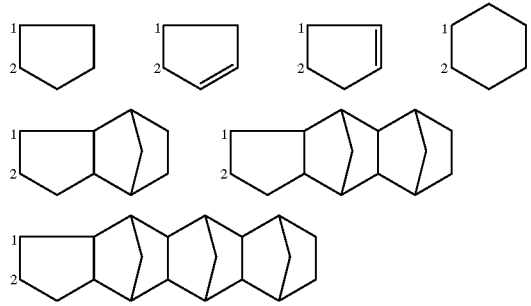

In these examples, the carbon atom as 1 or 2 represents the carbon atom bonded to $R^{15}$ ($R^{16}$) or $R^{17}$ ($R^{18}$), respectively, in general formula (i) above.

In addition, $R^{15}$ and $R^{16}$, or $R^{17}$ and $R^{18}$ may form an alkylidene group. Such alkylidene groups are usually alkylidene groups of 2 to 20 carbon atoms, and as specific examples of such alkylidene groups there may be mentioned ethylidene, propylidene and isopropylidene.

(ii)

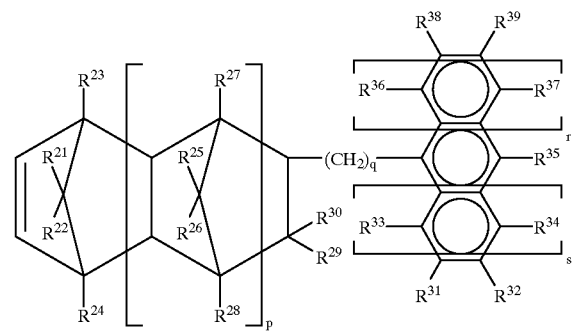

where p and q are each independently 0 or a positive integer, and r and s are each independently 0, 1 or 2.

$R^{21}$ to $R^{39}$ are each independently a hydrogen atom, halogen atom, hydrocarbon group or alkoxy group.

The halogen atoms indicated here are the same halogen atoms in general formula (i) above.

As hydrocarbon groups there may be mentioned generally alkyl groups of 1 to 20 carbon atoms, cycloalkyl groups of 3 to 15 carbon atoms and aromatic hydrocarbon groups. More specifically, as alkyl groups there may be mentioned methyl, ethyl, propyl, isopropyl, amyl, hexyl, octyl, decyl, dodecyl and octadecyl. These alkyl groups may also be substituted with halogen atoms.

As a cycloalkyl group there may be mentioned cyclohexyl.

As aromatic hydrocarbon groups there may be mentioned aryl and aralkyl groups, and specifically phenyl, tolyl, naphthyl, benzyl and phenylethyl.

As alkoxy groups there may be mentioned methoxy, ethoxy and propoxy.

Here, the carbon atom to which $R^{29}$ and $R^{30}$ bond and the carbon atom to which $R^{33}$ bonds or the carbon atom to which $R^{31}$ bonds may be bonded directly or through an alkylene group of 1 to 3 carbon atoms. When these two carbon atoms are bonded through an alkylene group, $R^{29}$ and $R^{33}$ or $R^{30}$ and $R^{31}$ are together to form one alkylene group from among methylene (—$CH_2$—), ethylene (—$CH_2CH_2$—) and propylene (—$CH_2CH_2CH_2$—).

In addition, when r=s=0, $R^{35}$ and $R^{32}$ or $R^{35}$ and $R^{39}$ may be bonded together to form a monocyclic or polycyclic aromatic ring. Specifically, the following aromatic rings formed by $R^{35}$ and $R^{32}$ when r=s=0 may be mentioned.

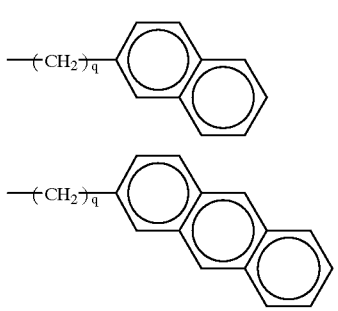

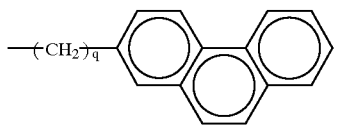

where q is the same q as in general formula (ii).

As specific cyclic olefins represented by the above general formulas (i) and (ii) there may be mentioned, bicyclo-2-heptene derivatives (bicyclohepto-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicosene derivatives, heptacyclo-4-eicosene derivatives, heptacyclo-5-heneicosene derivatives, octacyclo-5-docosene derivatives, nonacyclo-5-pentacosene derivatives, nonacyclo-6-hexacosene derivatives, cyclopentadiene-acenapthalene adducts, 1,4-methano-1,4,4a,9a-tetrahydrofluorene derivatives and 1,4-methano-1,4,4a,5,10,10a-hexahydroanthracene derivatives.

The following are more specific examples of cyclic olefins represented by the above general formulas (i) and (ii).
bicyclo[2.2.1]hepto-2-ene derivatives such as
bicyclo[2.2.1]hepto-2-ene (=norbornene),
5-methylbicyclo[2.2.1]hepto-2-ene,
5,6-dimethylbicyclo[2.2.1]hepto-2-ene,
1-methylbicyclo[2.2.1]hepto-2-ene,
5-ethylbicyclo[2.2.1]hepto-2-ene,
5-n-butylbicyclo[2.2.1]hepto-2-ene,
5-isobutylbicyclo[2.2.1]hepto-2-ene and
7-methylbicyclo[2.2.1]hepto-2-ene;
tricyclo[4.3.0.1$^{2,5}$]-3-decene derivatives such as
tricyclo[4.3.0.1$^{2,5}$]-3-decene,
2-methyltricyclo[4.3.0.1$^{2,5}$]-3-decene and
5-methyltricyclo[4.3.0.1$^{2,5}$]-3-decene;
tricyclo[4.4.0.1$^{2,5}$]-3-undecene derivatives such as
tricyclo[4.4.0.1$^{2,5}$]-3-undecene and
10-methyltricyclo[4.4.0.1$^{2,5}$]-3-undecene;
tetracyclo[4.4.0.1$^{2,5}$.1$^{7,10}$]-3-dodecene derivatives such as
tetracyclo[4.4.0.1$^{2,5}$.1$^{7,10}$]-3-dodecene,
8-methyltetracyclo[4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-butyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-ethyl-9-methyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
2,7-trimethyl-9-ethyltetracyclo[4.4.0.1$^{2,5}$.1$^{7,10}$]-3-dodecene,
9-isobutyl-2,7-dimethyltetracyclo[4.4.0.1$^{2,5}$.1$^{7,10}$]-3-dodecene,
9,11,12-trimethyltetracyclo[4.4.0.1$^{2,5}$.1$^{7,10}$]-3-dodecene,
9-ethyl-11,12-dimethyltetracyclo[4.4.0.1$^{2,5}$.1$^{7,10}$]-3-dodecene,
9-isobutyl-11,12-dimethyltetracyclo[4.4.0.1$^{2,5}$.1$^{7,10}$]-3-dodecene,
5,8,9,10-tetramethyltetracyclo[4.4.0.1$^{2,5}$.1$^{7,10}$]-3-dodecene,
8-ethylidenetetracyclo[4.4.0. 1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyltetracyclo[4.4.0.1$^{2,5}$.1$^{7,10}$]-3-dodecene,
8-ethylidene-9-butyltetracyclo[4.4.0.1$^{2,5}$.1$^{7,10}$]-3-dodecene,
8-n-propylidenetetracyclo[4.4.0.1$^{2,5}$.1$^{7,10}$]-3-dodecene,
8-n-propylidene-9-methyltetracyclo[4.4.0.1$^{2,5}$.1$^{7,10}$]-3dodecene,
8-n-propylidene-9-ethyltetracyclo[4.4.0.1$^{2,5}$.1$^{7,10}$]-3-dodecene,
8-n-propylidene-9-isopropyltetracyclo[4.4.0.1$^{2,5}$.1$^{7,10}$]-3-dodecene,
8-n-propylidene-9-butyltetracyclo[4.4.0.1$^{2,5}$.1$^{7,10}$]-3-dodecene,
8-isopropylidenetetracyclo[4.4.0.1$^{2,5}$.1$^{7,10}$]-3-dodecene,
8-isopropylidene-9-methyltetracyclo[4.4.0.1$^{2,5}$.1$^{7,10}$]-3-dodecene,
8-isopropylidene-9-ethyltetracyclo[4.4.0.1$^{2,5}$.1$^{7,10}$]-3-dodecene,
8-isopropylidene-9-isopropyltetracyclo[4.4.0.1$^{2,5}$.1$^{7,10}$]-3-dodecene,
8-isopropylidene-9-butyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene and
8,9-dichlorotetracyclo[4.4.0.1$^{2,5}$.1$^{7,10}$]-3-dodecene;
pentacyclo[6.5.1.1$^{3,6}$.0$^{2,7}$.0$^{9,13}$]-4-pentadecene derivatives such as
pentacyclo[6.5.1.1$^{3,6}$.0$^{2,7}$.0$^{9,13}$]-4-pentadecene,
1,3-dimethylpentacyclo[6.5.1.1$^{3,6}$.0$^{2,7}$.0$^{9,13}$]-4-pentadecene,
1,6-dimethylpentacyclo[6.5.1.1$^{3,6}$.0$^{2,7}$.0$^{9,13}$]-4-pentadecene and
14,15-dimethylpentacyclo[6.5.1.1$^{3,6}$.0$^{2,7}$.0$^{9,13}$]-4-pentadecene;
pentacyclo[7.4.0.1$^{2,5}$.1$^{9,12}$.0$^{8,13}$]-3-pentadecene derivatives such as
pentacyclo[7.4.0.1$^{2,5}$.1$^{9,12}$.0$^{8,13}$]-3-pentadecene and
methyl-substituted pentacyclo[7.4.0.1$^{2,5}$.1$^{9,12}$.0$^{8,13}$]-3-pentadecene;
pentacyclopentadecadiene compounds such as
pentacyclo[6.5.1.1$^{3,6}$.0$^{2,7}$.0$^{9,13}$]-4,10-pentadecadiene;
pentacyclo[8.4.0.1$^{2,5}$.1$^{9,12}$.0$^{8,13}$]-3-hexadecene derivatives such as
pentacyclo[8.4.0.1$^{2,5}$.1$^{9,12}$.0$^{8,13}$]-3-hexadecene,
11-methyl-pentacyclo[8.4.0.1$^{2,5}$.1$^{9,12}$.0$^{8,13}$]-3-hexadecene,
11-ethyl-pentacyclo[8.4.0.1$^{2,5}$.1$^{9,12}$.0$^{8,13}$]-3-hexadecene and
10,11-dimethyl-pentacyclo[8.4.0.1$^{2,5}$.1$^{9,12}$.0$^{8,13}$]-3-hexadecene;
pentacyclo[6.6.1.1$^{3,6}$.0$^{2,7}$.0$^{9,14}$]-4-hexadecene derivatives such as
pentacyclo[6.6.1.1$^{3,6}$.0$^{2,7}$.0$^{9,14}$]-4-hexadecene,
1,3-dimethylpentacyclo[6.6.1.1$^{3,6}$.0$^{2,7}$.0$^{9,14}$]-4-hexadecene,
1,6-dimethylpentacyclo[6.6.1.1$^{3,6}$.0$^{2,7}$.0$^{9,14}$]-4-hexadecene and
15,16-dimethylpentacyclo[6.6.1.1$^{3,6}$.0$^{2,7}$.0$^{9,14}$]-4-hexadecene;
hexacyclo[6.6.1.1$^{3,6}$.1$^{10,13}$.0$^{2,7}$.0$^{9,14}$]-4-heptadecene derivatives such as
hexacyclo[6.6.1.1$^{3,6}$.1$^{10,13}$.0$^{2,7}$.0$^{9,14}$]-4-heptadecene,
12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene and
1,6,10-trimethyl-12-isobutylhexacyclo[6.6.1.1$^{3,6}$.1$^{10,13}$.0$^{2,7}$.0$^{9,14}$]-4-heptadecene;
heptacyclo-5-eicosene derivatives such as
heptacyclo[8.7.0.1$^{2,9}$.1$^{4,7}$.1$^{11,17}$.0$^{3,8}$.0$^{12,16}$]-5-eicosene;
heptacyclo[8.7.0.1$^{3,6}$.1$^{10,17}$.1$^{12,15}$.0$^{2,7}$.0$^{11,16}$]-4-eicosene derivatives such as
heptacyclo[8.7.0.1$^{3,6}$.1$^{10,17}$.1$^{12,15}$.0$^{2,7}$.0$^{11,16}$]-4-eicosene and
dimethyl-substituted
heptacyclo[8.7.0.1$^{3,6}$.1$^{10,17}$.1$^{12,15}$.0$^{2,7}$.0$^{11,16}$]-4-eicosene;
heptacyclo-5-heneicosene derivatives such as
heptacyclo[8.8.0.1$^{2,9}$.1$^{4,7}$.1$^{11,18}$.0$^{3,8}$.0$^{12,17}$]-5-heneicosene,
heptacyclo[8.8.0.1$^{4,7}$.1$^{11,18}$.1$^{13,16}$.0$^{3,8}$.0$^{12,17}$]-5-heneicosene,
15-methyl-heptacyclo[8.8.0.1$^{4,7}$.1$^{11,18}$.1$^{13,16}$.0$^{3,8}$.0$^{12,17}$]-5-heneicosene and
trimethyl-substituted
heptacyclo[8.8.0 1$^{4,7}$,1$^{11,18}$.1$^{13,16}$.0$^{3,8}$. 0$^{12,17}$]-5-heneicosene;
octacyclo[8.8.0.1$^{4,7}$.1$^{11,18}$.1$^{13,16}$.0$^{3,8}$.0$^{12,17}$]-5-docosene derivatives such as
octacyclo[8.8.0.1$^{2,9}$.1$^{4,7}$.1$^{11,18}$.1$^{13,16}$.0$^{3,8}$ .0$^{12,17}$]-5-docosene,
15-methyloctacyclo[8.8.0.1$^{2,9}$.1$^{4,7}$.1$^{11,18}$.1$^{13,16}$.0$^{3,8}$.0$^{12,17}$]-5-docosene and
15-ethyloctacyclo[8.8.0.1$^{2,9}$.1$^{4,7}$.1$^{11,18}$.1$^{13,16}$.0$^{3,8}$.0$^{12,17}$]-5-docosene;
nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as
nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and
trimethyl-substituted
nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene;
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene;
as well as
5-phenyl-bicyclo[2.2.1]hepto-2-ene,
5-methyl-5-phenyl-[2.2.1]hepto-2-ene,
5-benzyl-bicyclo[2.2.1]hepto-2-ene,
5-tolyl-bicyclo[2.2.1]hepto-2-ene,
5-(ethylphenyl)-bicyclo[2.2.1]hepto-2-ene,
5-(isopropylphenyl)-bicyclo[2.2.1]hepto-2-ene,
5-(biphenyl)-bicyclo[2.2.1]hepto-2-ene,
5-(β-naphthyl)-bicyclo[2.2.1]hepto-2-ene,
5-(α-naphthyl)-bicyclo[2.2.1]hepto-2-ene,
5-(anthracenyl)-bicyclo[2.2.1]hepto-2-ene,
5,6-diphenyl-bicyclo[2.2.1]hepto-2-ene,
cyclopentadiene-acenaphthylene adduct,
1,4-methano-1,4,4a,9a-tetrahydrofluorene,
1,4-methano-1,4,4a,5,10,10a-hexahydroanthracene,
8-phenyl-tetracyclo[4.4.0.1$^{2,5}$.1$^{7,10}$]-3-dodecene,
8-methyl-8-phenyl-tetracyclo[4.4.0.1$^{2,5}$.1$^{7,10}$]-3-dodecene,
8-benzyl-tetracyclo[4.4.0.1$^{2,5}$.1$^{7,10}$]-3-dodecene,
8-tolyl-tetracyclo[4.4.0.1$^{2,5}$.1$^{7,10}$]-3-dodecene,
8-(ethylphenyl)-tetracyclo[4.4.0.1$^{2,5}$.1$^{7,10}$]-3-dodecene,
8-(isopropylphenyl)-tetracyclo[4.4.0.1$^{2,5}$.1$^{7,10}$]-3-dodecene,
8,9-diphenyl-tetracyclo[4.4.0.1$^{2,5}$.1$^{7,10}$]-3-dodecene,
8-(biphenyl)-tetracyclo[4.4.0.1$^{2,5}$.1$^{7,10}$]-3-dodecene,
8-(β-naphthyl)-tetracyclo[4.4.0.1$^{2,5}$.1$^{7,10}$]-3-dodecene,
8-(α-naphthyl)-tetracyclo[4.4.0.1$^{2,5}$.1$^{7,10}$]-3-dodecene,
8-(anthracenyl)-tetracyclo[4.4.0.1$^{2,5}$.1$^{7,10}$]-3-dodecene,
adduct of cyclopentadiene to (cyclopentadiene-acenaphthylene adduct),
11,12-benzo-pentacyclo[6.5.1.1$^{3,6}$.0$^{2,7}$.0$^{9,13}$]-4-pentadecene,
11,12-benzo-pentacyclo[6.6.1.1$^{3,6}$.0$^{2,7}$.0$^{9,14}$]-4-hexadecene,
11-phenyl-hexacyclo[6 6.1.1$^{3,6}$.1$^{10,13}$.0$^{2,7}$.0$^{9,14}$]-4-heptadecene,
14,15-benzo-heptacyclo[8.7.0.1$^{2,9}$.1$^{4,7}$.1$^{11,17}$.0$^{3,8}$.0$^{12,16}$]-5-eicosene, etc.

The method of use and order of addition of each of the components may be selected as desired for copolymerization of a linear or branched olefin and cyclic olefin in the process for preparing a cyclic olefin copolymer according to the invention, but the following methods may be presented as embodiments:

(1) A method whereby component (A") and component (B) which is at least one selected from among organoaluminum oxy-compounds (B-1), ionizing ionic compounds (B-2) and organometallic compounds (B-3) (hereunder referred to as "component (B)") are added to the polymerization reactor in the desired order;

(2) A method whereby a catalyst obtainable by pre-contacting component (A") and component (B) is added to the polymerization reactor; and (3) A method whereby a catalyst component obtainable by pre-contacting component (A") and component (B) and another component (B) are added to the polymerization reactor in the desired order. Here, the two components (B) may be the same or different.

Copolymerization of linear or branched olefins and cyclic olefins is usually carried out by a liquid phase polymerization method such as solution polymerization or suspension polymerization.

As inert hydrocarbon mediums used for liquid phase polymerization there may be specifically mentioned the same inert hydrocarbon mediums used for the process for preparing olefin polymers using the olefin polymerization catalyst (1) mentioned above, and the linear or branched olefins themselves used for the copolymerization may also be used as solvents.

Among these inert hydrocarbon mediums are preferred aliphatic hydrocarbons and alicyclic hydrocarbons. The linear or branched olefin itself used for polymerization is also preferred as the solvent.

For the copolymerization of the linear or branched olefin and the cyclic olefin using the olefin polymerization catalyst (3), the transition metal amide compound (A") is usually used in an amount of $10^{-8}$ to $10^{-2}$ moles, and preferably $10^{-7}$ to $10^{-3}$ moles, to one liter of the reaction volume.

The organoaluminum oxy-compound (B-1) is usually used in an amount such that the aluminum atoms in (B-1) and the transition metal atoms (M) in the transition metal amide compound (A") are in a molar ratio [(B-1)/M] of 10 to 5000, and preferably 20 to 2000. The ionizing ionic compound (B-2) is usually used in an amount such that (B-2) and the transition metal atoms (M) in the transition metal amide compound (A") are in a molar ratio [(B-2)/M] of 1 to 10, and preferably 1 to 5. The organometallic compound (B-3) is usually used in an amount such that (B-3) and the transition metal atoms (M) in the transition metal amide compound (AN) are in a molar ratio [(B-3)/M] of 0.01 to 5000, and preferably 0.05 to 2000.

The polymerization temperature is usually in the range of −50 to 200° C., and preferably 0 to 170° C. The polymerization pressure is usually from normal pressure to 100 kg/cm², and preferably from normal pressure to 50 kg/cm², and the polymerization reaction may be carried out by a batch-wise process, semi-continuous process or continuous process. The polymerization may also be divided into 2 steps, each of which has a different reaction condition.

The molecular weight of the resulting cyclic olefin copolymer may be adjusted by adding hydrogen to the polymerization system, or by changing the polymerization temperature.

The cyclic olefin copolymer obtained according to the invention preferably has the structural unit derived from the linear or branched olefin ($U_{Ch}$) and the structural unit derived from the cyclic olefin ($U_{Cy}$) in a molar ratio [($U_{Ch}$):($U_{Cy}$)] of 95:5 to 5:95, and more preferably 90:10 to 10:90. The intrinsic viscosity (η) of the cyclic olefin copolymer obtained according to the invention is preferably 0.01 to 10 dl/g.

The process for preparing an olefin polymer according to the invention may be polymerization or copolymerization of olefins in the presence of an olefin polymerization catalyst (olefin polymerization catalyst (4)) comprising:

(A''') a transition metal amide compound represented by general formula (IV) below and (B-1) an organoaluminum oxy-compound, wherein the organoaluminum oxy-compound (B-1) is added to the polymerization system as an aliphatic hydrocarbon or alicyclic hydrocarbon slurry.

Each of the components forming this olefin polymerization catalyst used for the invention will now be explained.

(A''') Transition Metal Amide Compound

The transition metal amide compound (A''') used according to the invention is a transition metal amide compound represented by general formula (IV) below

$(R_2N)_k M^2 X^2_{j-k}$ (IV)

where $M^2$ represents a transition metal atom of Groups 3 to 6 of the Periodic Table, and is preferably a transition metal atom of Group 4 of the Periodic Table, such as titanium, zirconium or hafnium.

j represents the valency of the transition metal atom $M^2$.

k represents an integer of 1 to j.

Each R may be the same or different and represents a hydrogen atom, a hydrocarbon group, a halogenated hydrocarbon group, an organosilyl group or a substituent having at least one element selected from among nitrogen, oxygen, phosphorus, sulfur and silicon.

As specific hydrocarbon groups there may be mentioned linear or branched alkyl groups of 1 to 20 carbon atoms such as methyl, ethyl, n-propyl, isopropyl, n-butyl, isobutyl, sec-butyl, tert-butyl, pentyl, hexyl, octyl, decyl and octadecyl; aryl groups of 6 to 20 carbon atoms such as phenyl and naphthyl; substituted aryl groups with 1 to 5 substituents such as the aforementioned alkyl groups of 1 to 20 carbon atoms on these aryl groups; cycloalkyl groups such as cyclopentyl, cyclohexyl, norbornyl and adamantyl; alkenyl groups such as vinyl, propenyl and cyclohexenyl; and arylalkyl groups such as benzyl, phenylethyl and phenylpropyl.

As halogenated hydrocarbon groups there may be mentioned the aforementioned hydrocarbon groups which have been substituted with halogens.

As specific organosilyl groups there may be mentioned methylsilyl, dimethylsilyl, trimethylsilyl, ethylsilyl, diethylsilyl, triethylsilyl, triphenylsilyl, etc.

As substituents with at least one element selected from among nitrogen, oxygen, phosphorus, sulfur and silicon there may be mentioned the hydrocarbon groups mentioned above substituted with —COOCH₃, —N(CH₃)C(O)CH₃, —OC(O)CH₃, —CN, —N(C₂H₅)₂, —N(CH₃)S(O₂)CH₃, —P(C₆H₅)₂, etc.

The groups represented by R which are bonded to the same nitrogen atom may be linked together to form an aliphatic or other type of ring, and preferably the portions corresponding to these groups form a ring-containing structure of 3 to 30 carbon atoms.

When k is 2 or greater, the groups represented by R which are bonded to different nitrogen atoms may be the same or different and may be linked together to form an aliphatic or aromatic ring, and preferably the portions corresponding to these groups form a ring-containing structure of 3 to 30 carbon atoms.

$X^2$ has the same definition as $X^2$ in general formula (II) above, and when j–k is 2 or greater, each $X^2$ may be the same or different.

Among these are preferred halogen atoms, hydrocarbon groups of 1 to 20 carbon atoms and sulfonate groups.

The following are specific, but not limitative examples of transition metal amide compounds represented by general formula (IV) above.

bis(dimethylamide) titanium dichloride,
bis(diethylamide) titanium dichloride,
bis(dipropylamide) titanium dichloride,
diisopropylamide titanium trichloride,
bis(diisopropylamide) titanium dichloride,
tris(diisopropylamide) titanium chloride,
tetrakis(diisopropylamide) titanium,
dibutylamide titanium trichloride,
bis(dibutylamide) titanium dichloride,
tris(dibutylamide) titanium chloride,
tetrakis(dibutylamide) titanium,
bis(diisobutylamide) titanium dichloride,
bis(dihexylamide)titanium dichloride,
dioctylamide titanium trichloride,
bis(dioctylamide) titanium dichloride,
tris(dioctylamide) titanium chloride,
tetrakis(dioctylamide) titanium,
bis(didecylamide) titanium dichloride,
bis(dioctadecylamide) titanium dichloride,
bis(diethylamide) bis[bis(trimethylsilyl)amide] titanium,
bis[bis(trimethylsilyl)amide] titanium dichloride,
tris[bis(trimethylsilyl)amide] titanium chloride,
tetrakis[bis(trimethylsilyl)amide] titanium, etc.

As additional transition metal amide compounds represented by general formula (IV) above there may be mentioned the aforementioned compounds wherein titanium has been replaced with zirconium or hafnium.

As transition metal amide compounds represented by general formula (IV) above wherein two R groups attached to different nitrogen atoms are linked together to form a bonding group bonding the two nitrogen atoms, there may be mentioned compounds represented by the following general formula (IV-1).

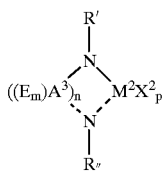

(IV-1)

where $M^2$ has the same definition as $M^2$ in general formula (IV) above, and is preferably a transition metal atom of Group 4 of the Periodic Table such as titanium, zirconium or hafnium, especially preferred is titanium.

R' and R" may be the same or different, and have the same definition as R in general formula (IV) above.

m is in integer of 0 to 2.

n is an integer of 1 to 5.

$A^3$ represents an atom of Groups 13 to 16 of the Periodic Table, among which there may be mentioned specifically boron atoms, carbon atoms, nitrogen atoms, oxygen atoms, silicon atoms, phosphorus atoms, sulfur atoms, germanium atoms, selenium atoms and tin atoms. Preferred are carbon atoms and silicon atoms. When n is 2 or greater, the groups represented by $A^3$ may be the same or different.

E represents at least one atom selected from among carbon, hydrogen, oxygen, halogens, nitrogen, sulfur, phosphorus, boron and silicon or substituents containing these atoms. When multiple groups are represented by E, the groups represented by E may be the same or different and two or more of the groups represented by E may be linked together to form a ring, preferably with the portion corresponding to these groups forming a ring-containing structure of 3 to 30 carbon atoms.

As bonding groups represented by $((E_m)A^3)_n$ bonding the 2 nitrogen atoms there may be specifically mentioned the following groups:

—CH$_2$—, —C(Me)$_2$—, —C(Ph)$_2$—, —Si(Me)$_2$—, —Si(Ph)$_2$—, —Si(Me)(Ph)—,
—CH$_2$CH$_2$—, —CH$_2$Si(Me)$_2$—, —CH$_2$CH$_2$CH$_2$—, —CH$_2$C(Me)$_2$CH$_2$—,
—CH$_2$C(Et)$_2$CH$_2$—, —CH$_2$C(nPr)$_2$CH$_2$—, —CH$_2$C(iPr)$_2$CH$_2$—,
—CH$_2$C(nBu)$_2$CH$_2$—, —CH$_2$C(iBu)$_2$CH$_2$—, —CH$_2$C(sBu)$_2$CH$_2$—,
—CH$_2$C(cPen)$_2$CH$_2$—, —CH$_2$C(cHex)$_2$CH$_2$—, —CH$_2$C(Ph)$_2$CH$_2$—,
—CH$_2$C(Me)(Et)CH$_2$—, —CH$_2$C(Me)(iPr)CH$_2$—, —CH$_2$C(Me)(iBu)CH$_2$—, —CH$_2$C(Me)(tBu)CH$_2$—, —CH$_2$C(Me)(iPen)CH$_2$—,
—CH$_2$C(Me)(Ph) CH$_2$—,
—CH$_2$C(Et)(iPr)CH$_2$—, —CH$_2$C(Et)(iBu)CH$_2$—,
—CH$_2$C(Et)(iPen)CH$_2$—,
—CH$_2$C(iPr)(iBu)CH$_2$—, —CH$_2$C(iPr)(iPen)CH$_2$—,
—CH$_2$Si(Me)$_2$CH$_2$—,
—CH$_2$Si(Et)$_2$CH$_2$—, —CH$_2$Si(nBu)$_2$CH$_2$—, —CH$_2$Si(Ph)$_2$CH$_2$—,
—CH(Me)CH$_2$CH(Me)—, —CH(Ph)CH$_2$CH(Ph)—, —Si(Me)$_2$OSi(Me)$_2$—,
—CH$_2$CH$_2$CH$_2$CH$_2$—, —Si(Me)$_2$CH$_2$CH$_2$Si(Me)$_2$—,

-continued

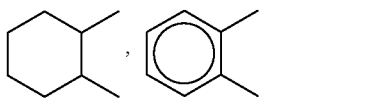

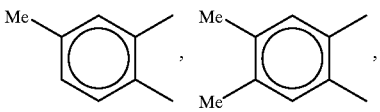

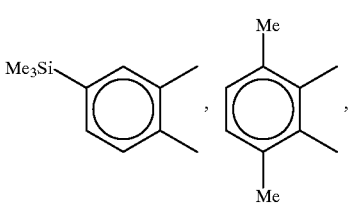

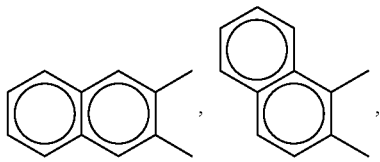

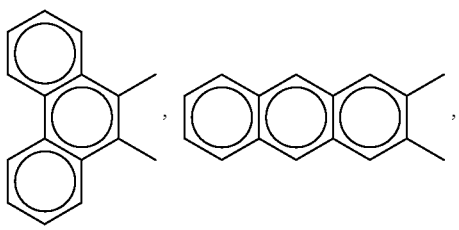

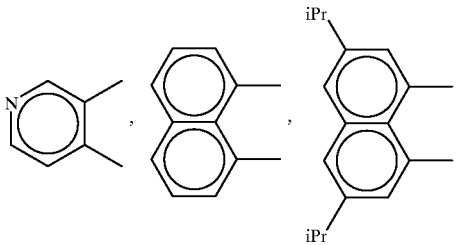

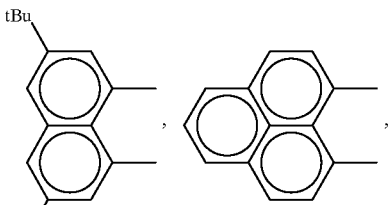

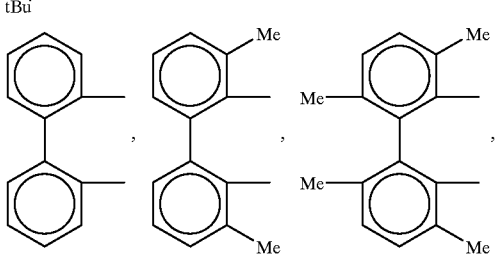

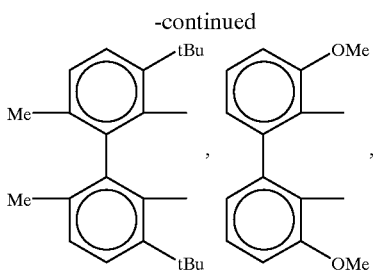

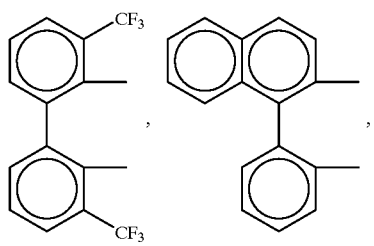

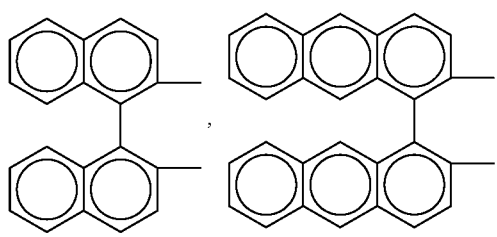

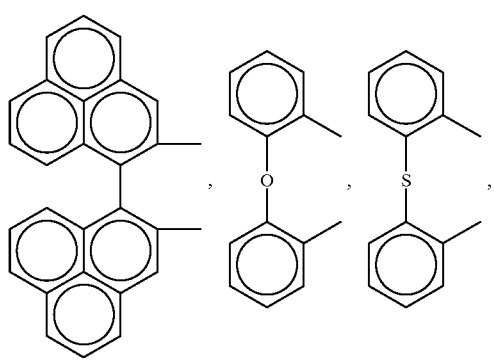

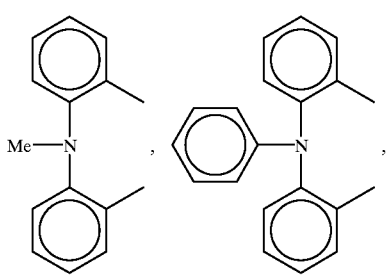

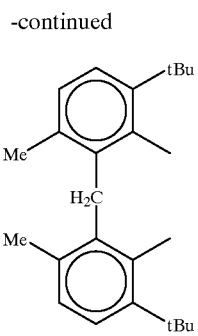

Incidentally, in these examples Me represents methyl, Et represents ethyl, nPr represents n-propyl, iPr represents isopropyl, nBu represents n-butyl, iBu represents isobutyl, sBu represents sec-butyl, tBu represents tert-butyl, iPen represents isopentyl, cPen represents cyclopentyl, cHex represents cyclohexyl and Ph represents phenyl.

p is an integer of 0 to 4.

$X^2$ has the same definition as $X^2$ in general formula (IV) above. When p is 2 or greater the groups represented by $X^2$ may be the same or different.

Among these are preferred halogen atoms, hydrocarbon groups of 1 to 20 carbon atoms and sulfonate groups.

The following are specific, but not limitative examples of transition metal amide compounds represented by general formula (IV-1) above.

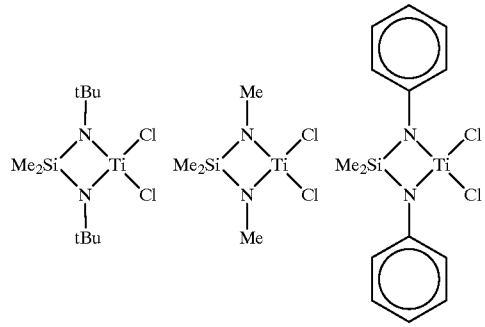

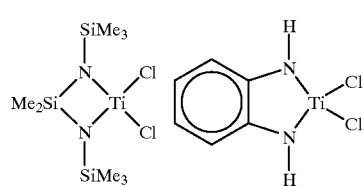

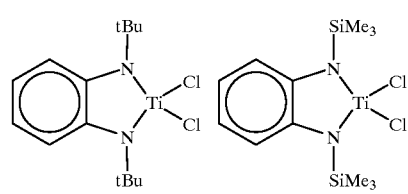

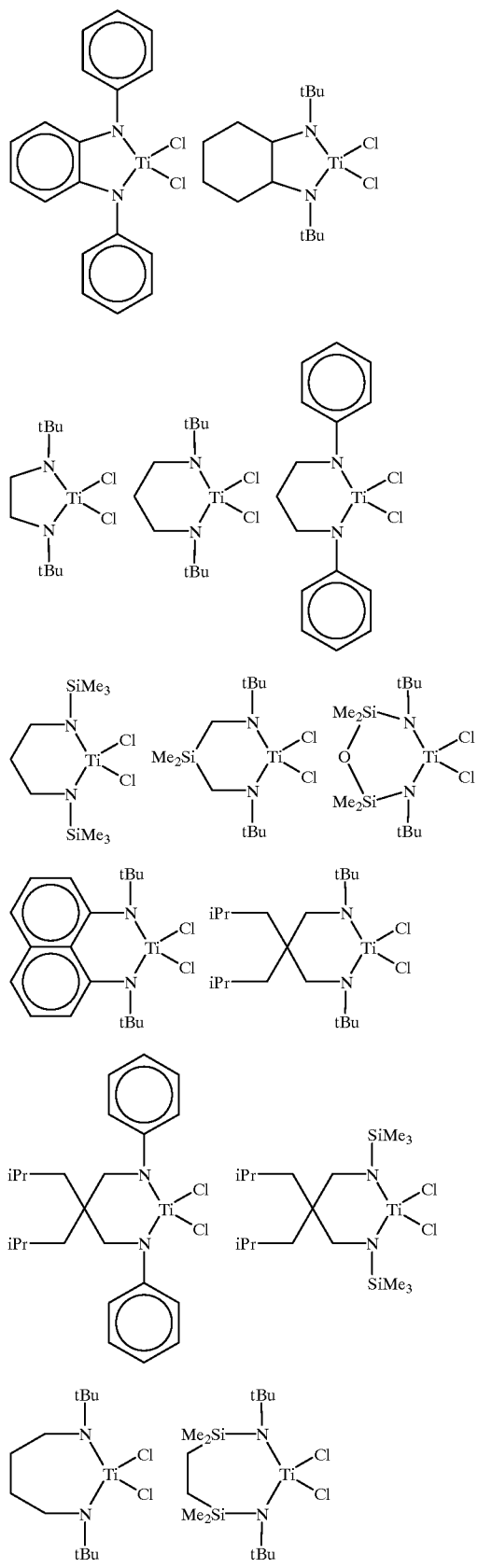
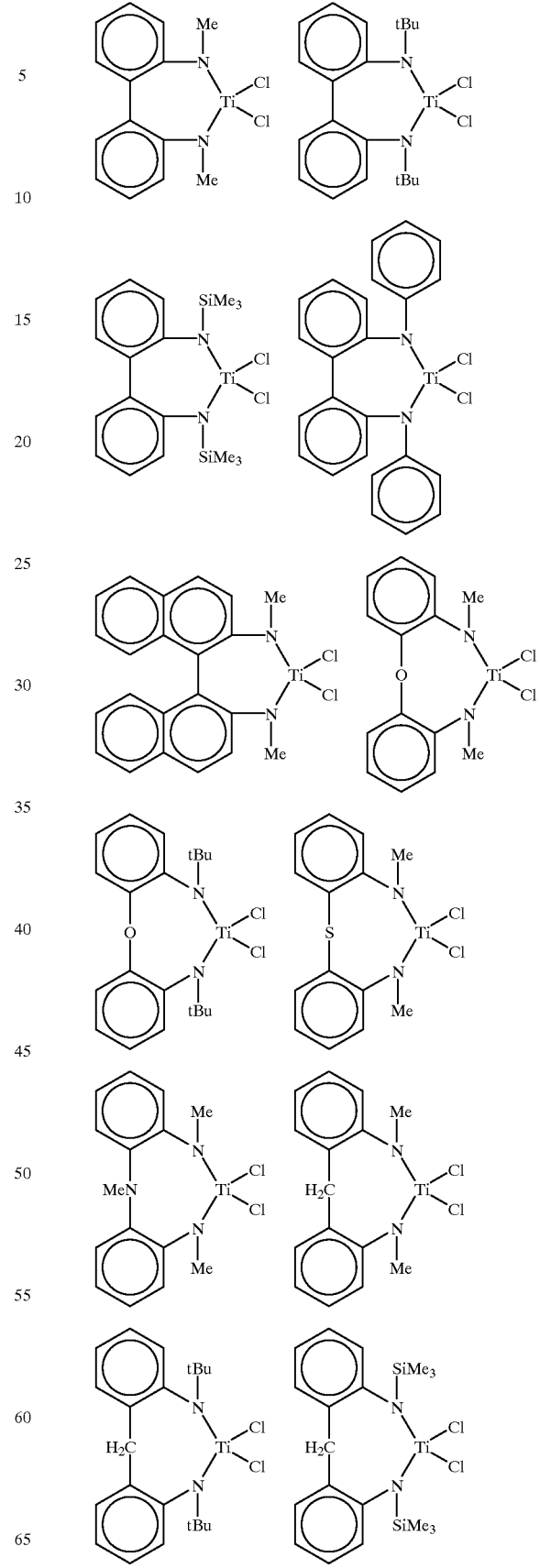

-continued

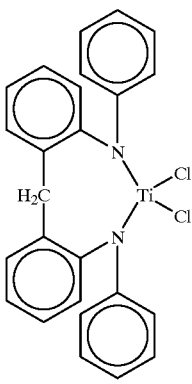

In these examples, Me represents methyl, Et represents ethyl, iPr represents isopropyl and tBu represents tert-butyl.

According to the invention, transition metal amide compounds wherein titanium in these compounds is replaced with zirconium or hafnium may also be used.

Of the transition metal amide compounds represented by general formula (IV-1) according to the invention. Preferred are transition metal amide compounds represented by the following general formula (IV-2), wherein R' and R" are each a substituted aryl group with 1 to 5 substituents such as alkyl.

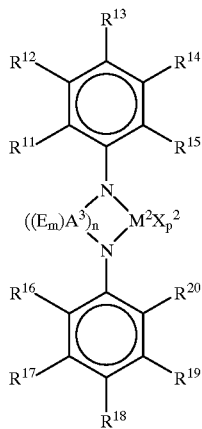

(IV-2)

where $M^2$ has the same definition as $M^2$ in general formula (IV) above, and is preferably a transition metal atom of Group 4 of the Periodic Table such as titanium, zirconium or hafnium, especially preferred is titanium.

$R^{11}$ to $R^{20}$ may be the same or different, and have the same definitions as for $R^{11}$ to $R^{20}$ in general formula (II) above.

m is an integer of 0 to 2.

n is an integer of 1 to 5.

$A^3$ has the same definition as $A^3$ in general formula (IV-1) above, and is preferably a carbon atom or silicon atom. When n is 2 or greater, the groups represented by $A^3$ may be the same or different.

E has the same definition as E in general formula (IV-1) above, and is preferably a substituent containing one or more atoms selected from among carbon, hydrogen, nitrogen and silicon. When multiple groups are represented by E, the groups represented by E may be the same or different and two or more of the groups represented by E may be linked together to form a ring, preferably with the portion corresponding to these groups forming a ring-containing structure of 3 to 30 carbon atoms.

As bonding groups represented by $((E_m)A^3)_n$ bonding the 2 nitrogen atoms there may be specifically mentioned the same groups given as examples for general formula (IV).

p is an integer of 0 to 4.

$X^2$ has the same definition as $X^2$ in general formula (IV) above, and is preferably a halogen atom, a hydrocarbon group of 1 to 20 carbon atom or a sulfonate group.

When p is 2 or greater the groups represented by $X^2$ may be the same or different.

As specific examples of transition metal amide compounds represented by general formula (IV-2) above there may be mentioned the same compounds given as examples of compounds represented by general formulas (II) and (III), but there is no limitation to these.

Preferred among these transition metal amide compounds are transition metal amide compounds in which $M^2$ is titanium, $A^3$ in the group bonding the two nitrogen atoms is carbon or silicon, and n is 2 or 3.

These compounds may be used singly, or used in combinations of 2 or more. They may also be used in diluted form with a hydrocarbon or halogenated hydrocarbon. According to the invention, the transition metal amide compound (A''') is most preferably used in a form diluted in an aliphatic hydrocarbon or alicyclic hydrocarbon (b) as described below.

(B-1) Organoaluminum Oxy-Compound

According to the invention, the organoaluminum oxy-compound (B-1) is used as a slurry with the aliphatic hydrocarbon or alicyclic hydrocarbon (b) mentioned below.

As specific examples of the aliphatic hydrocarbon or alicyclic hydrocarbon (b) to be used according to the He invention there may be mentioned aliphatic hydrocarbons such as octane, decane, 2,2-dimethylpropane, 2-methylbutane, 2,2-dimethylbutane, 2,3-dimethylbutane, 2,2,3-trimethylbutane, n-pentane, 2-methylpentane, 3-methylpentane, 2,2-dimethylpentane, 3,3-dimethylpentane, 2,3-dimethylpentane, 2,4-dimethylpentane, n-hexane, 2-methylhexane, 3-methylhexane and n-pentane; and alicyclic hydrocarbons such as cyclohexane, methylcyclopentane and dimethylcyclopentane. These may also be used in a mixture.

The aliphatic hydrocarbon or alicyclic hydrocarbon (b) used according to the invention preferably has a boiling point of not higher than 100° C., more preferably not higher than 90° C. and most preferably not higher than 75° C.

The slurry of the organoaluminum oxy-compound (B-1) may be appropriately prepared by dispersing the organoaluminum oxy-compound (B-1) in the aliphatic hydrocarbon or alicyclic hydrocarbon (b), and specifically it may be prepared by one of the following methods:

(1) A method whereby the toluene is distilled off from a toluene solution of the organoaluminum oxy-compound (B-1), and the resulting powdered organoaluminum oxy-compound (B-1) is ground and suspended in the aliphatic hydrocarbon or alicyclic hydrocarbon (b);

(2) a method whereby the toluene is distilled off from a toluene solution of the organoaluminum oxy-compound (B-1), and the aliphatic hydrocarbon or alicyclic hydrocarbon (b) is added to the resulting powdered organoaluminum oxy-compound (B-1), thereafter the organoaluminum oxy-compound (B-1) is ground; and (3) a method whereby a toluene solution of the organoaluminum oxy-compound (B-1) is contacted with the aliphatic hydrocarbon or alicyclic hydrocarbon (b) to precipitate the organoaluminum oxy-compound (B-1), and then the medium is exchanged.

The toluene solution used here for the organoaluminum oxy-compound (B-1) is usually at a concentration of 0.1 to 10 moles/liter, preferably 0.5 to 7 moles/liter and more preferably 0.5 to 5 moles/liter, in terms of aluminum atoms.

For preparation of the slurry, the aliphatic hydrocarbon or alicyclic hydrocarbon (b) is used at 0.3 to 10, and preferably 0.5 to 5 volumes with respect to the volume of the toluene solution containing the organoaluminum oxy-compound (B-1).

The above explanation has been given for preparation of an aliphatic hydrocarbon or alicyclic hydrocarbon slurry of the organoaluminum oxy-compound (B-1) using a toluene solution of the organoaluminum oxy-compound (B-1), but a benzene solution of the organoaluminum oxy-compound (B-1) may also be used instead of a toluene solution of the organoaluminum oxy-compound (B-1).

The solid organoaluminum oxy-compound (B-1) in the slurry prepared in this manner according to the invention preferably has an area to weight ratio of 10 m$^2$/g or greater, and more preferably 100 m$^2$/g or greater.

According to the invention, the area to weight ratio may generally be measured by the BET method using a MONOSORB-MS-12 by Guantachrome Co. For measurement of the area to weight ratio, the organoaluminum oxy-compound (B-1) is preferably dried under reduced pressure and taken up in a nitrogen atmosphere for the measurement procedure.

Supplying the organoaluminum oxy-compound (B-1) to the polymerization reactor as a slurry with the aliphatic hydrocarbon or alicyclic hydrocarbon (b) allows polymerization or copolymerization of olefins to be accomplished with a high polymerization activity.

The olefin polymerization catalyst (4) used according to the invention is prepared from the aforementioned transition metal amide compound (A''') and organoaluminum oxy-compound (B-1), but it may also contain optionally any of the aforementioned organometallic compounds (B-3). According to the invention, the organometallic compound (B-3) may be used in a form diluted with a hydrocarbon, and preferably in a form diluted with the aliphatic hydrocarbon or alicyclic hydrocarbon (b) mentioned above.

The olefin polymerization catalyst (4) used for the olefin polymerization process of the present invention comprises the aforementioned component (A'''), component (B-1) and optionally, component (B-3). FIG. 4 shows an embodiment of an olefin polymerization step using the olefin polymerization catalyst (4).

The method of use and order of addition of each of the components may be selected as desired for the polymerization, but the following methods may be presented as embodiments:

(1) A method whereby component (A''') and a slurry of the aliphatic hydrocarbon or alicyclic hydrocarbon of component (B-1) [hereunder referred to as "component (B-1) slurry"] are added to the polymerization reactor in the desired order;

(2) A method whereby component (A''') and the component (B-1) slurry and component (B-3) are added to the polymerization reactor in the desired order;

(3) A method whereby a catalyst obtainable by pre-contacting component (A''') and the component (B-1) slurry are added to the polymerization reactor;

(4) A method whereby a catalytic component obtainable by pre-contacting component (A''') and the component (B-1) slurry, and component (B-3) are added to the polymerization reactor in the desired order;

(5) A method whereby a catalyst obtainable by pre-contacting component (A'''), the component (B-1) slurry and component (B-3) is added to the polymerization reactor; and (6) A method whereby a catalytic component obtainable by pre-contacting component (A'''), the component (B-1) slurry and component (B-3), and another component (B-3) are added to the polymerization reactor in the desired order. Here, the two components (B-3) may be the same or different.

According to the invention, the polymerization may be accomplished by either a liquid phase polymerization process including solution polymerization and suspension polymerization, or gas phase polymerization process, but liquid phase polymerization is preferably employed.

As inert hydrocarbon mediums used for liquid phase polymerization there may be specifically mentioned the same inert hydrocarbon mediums used for the process for preparing olefin polymers using the olefin polymerization catalyst (1) mentioned above, and the olefin compound itself used for the polymerization may also be used as the solvent. Among these inert hydrocarbon mediums are preferred aliphatic hydrocarbons and alicyclic hydrocarbons. The α-olefin, alicyclic vinyl compound or cyclic olefin themselves used for the polymerization is preferably used as the solvent.

For liquid phase polymerization, the concentration of component (A''') in the reaction system is usually $10^{-8}$ to $10^{-2}$ moles, and preferably $10^{-7}$ to $10^{-3}$ moles, to one liter of the polymerization volume.

Component (B-1) is usually used in an amount such that the aluminum atoms in component (B-1) and the transition metal atoms (M) in component (A''') are in a molar ratio [(B-1)/M] of 10 to 5000, and preferably 20 to 2000.

Component (B-3) optionally used is usually used in an amount such that component (B-3) and the transition metal atoms (M) in the component (A''') are in a molar ratio [(B-3)/M] of 0.01 to 5000, and preferably 0.05 to 2000.

The polymerization temperature is usually in the range of −50 to 200° C., and preferably 0 to 170° C. The polymerization pressure is usually from normal pressure to 100 kg/cm$^2$, and preferably from normal pressure to 50 kg/cm$^2$, and the polymerization reaction may be carried out by a batch-wise process, semi-continuous process or continuous process. The polymerization may also be divided into 2 steps, each of which has a different reaction condition.

The molecular weight of the resulting olefin polymer may be adjusted by adding hydrogen to the polymerization system, or by changing the polymerization temperature.

As olefins which can be polymerized with such olefin polymerization catalysts (4) there may be mentioned the same α-olefins of 2 to 20 carbon atoms, aromatic vinyl compounds, alicyclic vinyl compounds, cyclic olefins, linear polyenes of 4 to 20 carbon atoms and cyclic polyenes which were mentioned as olefins which can be polymerized with the olefin polymerization catalyst (2).

These olefins may be used singly or in combinations of 2 or more.

EFFECT OF THE INVENTION

By using the olefin polymerization catalyst (1) it is possible to produce olefin polymers with excellent polymerization activity.

By using the olefin polymerization catalyst (2) it is possible to produce olefin polymers with excellent polymerization activity and narrow molecular weight distributions. It is also possible to obtain olefin copolymers with narrow composition distributions when 2 or more olefins are copolymerized.

By using the olefin polymerization catalyst (3) it is possible to produce aromatic vinyl compounds/α-olefin copolymers, ethylene/α-olefin copolymers, α-olefin random copolymers and cyclic olefin-based copolymers, with excellent polymerization activity.

According to the process for preparing olefin polymers according to the invention whereby an organoaluminum oxy-compound is added to the polymerization system as a slurry of an aliphatic hydrocarbon or alicyclic hydrocarbon, it is possible to produce olefin polymers with higher polymerization activity than by addition of an organoaluminum oxy-compound to the polymerization system as a solution in an aromatic hydrocarbon. In addition, there is no problem of residual odor in the polymer and no problems with respect to working environment conditions.

EXAMPLES

The present invention will now be explained in greater detail in reference to examples, and it is construed that the invention is in no way limited to these examples.

Synthesis Example 1

Synthesis of 1,8-bis(phenylamide)naphthalene titanium dichloride

To a 100 ml-glass container thoroughly purged with nitrogen was fed 0.4320 g (1.392 millimoles) of 1,8-bis(phenylamide)naphthalene, and it was dissolved in 10 ml of xylene. Titanium tetrachloride was then added and the mixture was heated at 160° C. for 9 hours. The impurities of the reaction solution were removed with a glass filter. The solution was distilled off from the filtrate to obtain 0.6 g of a crystalline violet solid. Recrystallization from a toluene-hexane mixed solution and purification yielded the target substance. The resulting target substance was confirmed by NMR analysis to be the target substance represented by formula (a) below.

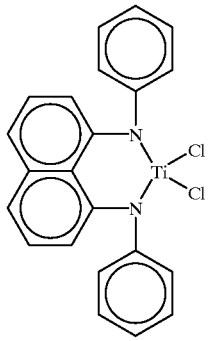

(a)

1H-NMR(CDCl$_3$): 6.10 (d,2H), 7.54 (t,2H), 7.58 (d,4H), 7.65 (t,2H), 7.70 (d,2H), 7.71 (t,4H).

Example 1

Preparation of Catalyst Solution

To a glass container thoroughly purged with nitrogen was fed 2.14 mg of 1,8-bis(phenylamide)naphthalene titanium dichloride. To the container was then added 0.78 ml of a toluene solution of methylaluminoxane (Al: 1.60 moles/ liter) to obtain a catalyst solution.

Polymerization

To a 300 ml-glass flask thoroughly purged with nitrogen was introduced 30 ml of 1-hexene, and the system temperature was raised to 60° C. Then, 1.25 millimoles of methylaluminoxane and 0.78 ml (0.005 millimoles in terms of Ti) of the catalyst solution prepared above were added, to initiate polymerization. Thereafter, a system temperature of 60° C. was then maintained for 6 minutes of polymerization. The polymerization was terminated by addition of a small amount of isobutyl alcohol to the system. The resulting polymer solution was dried under reduced pressure to remove the unreacted 1-hexene, and then dried overnight under reduced pressure at 80° C. As a result there was obtained 4.9 g of a 1-hexene polymer (polymerization activity: 9.8 kg/mmol Tixhr).

Example 2

Polymerization

To a 300 ml-glass flask thoroughly purged with nitrogen was introduced 30 ml of 1-hexene, and the system temperature was raised to 60° C. Then, 0.02 millimole of triisobutylaluminum and 1.0 ml (0.005 millimole in terms of Ti) of a toluene solution of 1,8-bis(phenylamide)naphthalene titanium dichloride were added, and further 0.01 millimole of triphenylcarbenium tetrakis(pentafluorophenyl) borate was introduced, to initiate polymerization. Thereafter, a system temperature of 60° C. was maintained for 6 minutes of polymerization. The polymerization was terminated by addition of a small amount of isobutyl alcohol to the system. The resulting polymer solution was dried under reduced pressure to remove the unreacted 1-hexene, and then dried overnight under reduced pressure at 80° C. As a result there was obtained 9.1 g of a 1-hexene polymer (polymerization activity: 18.2 kg/mmol Tixhr).

Synthesis Example 2

Synthesis of Bis(Phenylamidomethyl) Dimethylsilylene Titanium Dichloride

In a 300 ml-glass flask thoroughly purged with nitrogen was dissolved 8.5886 g (0.0867 millimole) of a lithium salt of aniline in 100 ml of tetrahydrofuran, there were further added 6.3 ml (0.0431 millimole) of bis(chloromethyl) dimethylsilane and 13.4 ml (0.0888 millimole) of N,N,N', N'-tetramethylethylenediamine. The solution was then reacted in tetrahydrofuran for 6 hours under reflux conditions. After the reaction, 50 ml of water was added and the organic phase was recovered with a separatory funnel. After adding 14 ml of hydrochloric acid to the extract, washing the precipitated hydrochloride with ether and drying, extraction was performed with methylene chloride. After adding an aqueous solution of sodium hydrogen carbonate to the extract, the organic phase was recovered with a separatory funnel. The organic phase was purified with a silica gel column to give 0.76 g of compound (b').

$^1$H-NMR(CDCl$_3$): 0.22 (s), 2.55 (s), 6.61 (d), 6.68 (t), 7.13 (t).

To a 100 ml-glass container thoroughly purged with nitrogen were fed 0.4148 g (1.534 millimoles) of the compound (b') and 10 ml of ether. The obtained mixture was cooled to −78° C., then, 1.92 (3.072 millimoles) of a hexane solution of butyllithium was added dropwise. After raising the temperature to room temperature with stirring, it was cooled to −78° C. and 0.17 ml (1.550 millimoles) of titanium tetrachloride was added. After again raising the temperature to room temperature with stirring, ether extraction was performed and the solvent was distilled off from the extract under reduced pressure to give 0.51 g of the target substance represented by formula (b) below.

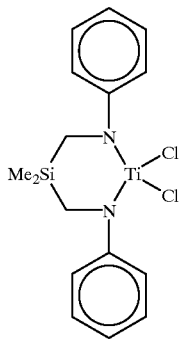

(b)

Example 3

Preparation of Catalyst Solution

To a glass container thoroughly purged with nitrogen was fed 1.94 mg of bis(phenylamidomethyl) dimethylsilylene titanium dichloride. To the container was added 0.78 ml of a toluene solution of methylaluminoxane (Al: 1.60 moles/liter) to obtain a catalyst solution.

Polymerization

To a 300 ml-glass flask thoroughly purged with nitrogen was fed 30 ml of 1-hexene, and the system temperature was raised to 60° C. Then, 1.25 millimoles of methylaluminoxane and 0.78 ml (0.005 millimole in terms of Ti) of the catalyst solution prepared above were introduced, to initiate polymerization. Thereafter, a system temperature of 60° C. was then maintained for 6 minutes of polymerization. The polymerization was terminated by addition of a small amount of isobutyl alcohol to the system. The resulting polymer solution was dried under reduced pressure to remove the unreacted 1-hexene, and then dried overnight under reduced pressure at 80° C. As a result there was obtained 0.8 g of a 1-hexene polymer (polymerization activity: 1.6 kg/mmol Tixhr).

Example 4

To a 500 ml-glass autoclave thoroughly purged with nitrogen was indroduced 250 ml of toluene, and after passing through an ethylene flow at 100 liters/hour, it was allowed to stand at 25° C. for 10 minutes. Then, 1.25 millimoles of methylaluminoxane in terms of aluminum atoms was added, followed by addition of 0.005 millimole of the titanium amide compound (A-1) represented by formula (c) below, to initiate polymerization. Ethylene gas was continuously fed at rate of 100 liters/hour, and polymerization was performed under normal pressure at 25° C. for one hour. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 1.9 g of polymer.

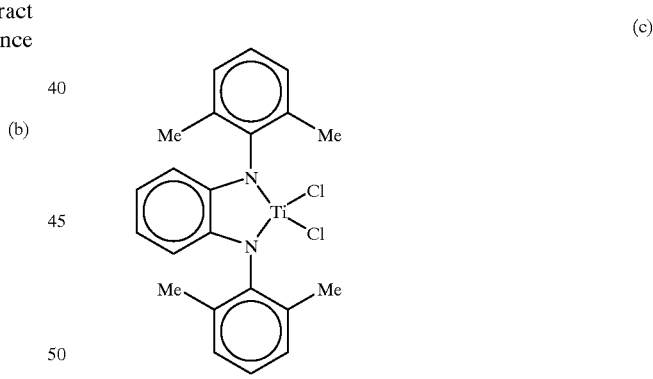

(c)

Example 5

To a 500 ml-glass autoclave thoroughly purged with nitrogen was introduced 250 ml of toluene, and after passing through an ethylene flow at 100 liters/hour, it was allowed to stand at 25° C. for 10 minutes. Then, 0.5 millimole of triisobutylammonium, 0.005 millimole of the titanium amide compound (A-1) represented by formula (c) above, and 0.006 millimole of triphenylcarbenium tetrakis pentafluorophenyl borate were added in that order, to initiate polymerization. Ethylene gas was continuously fed at rate of 100 liters/hour, and polymerization was performed under normal pressure at 25° C. for one hour. The polymerization was terminated by addition of a small amount of methanol.

The polymerization reaction solution was added to a large excess of methanol/hydrochloric acid solution, and the resulting polymer was dried under reduced pressure at 130° C. for 12 hours. This resulted in 1.7 g of polymer.

Comparative Example 1

Ethylene was polymerized in the same manner as Example 4, except that the titanium amide compound (A-2) represented by formula (d) below was used instead of the titanium amide compound (A-1) in the polymerization of Example 4. This resulted in 0.2 g of polymer.

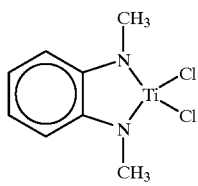

(d)

Example 6

To a 500 ml-glass thoroughly purged with nitrogen was introduced 250 ml of toluene, and after passing through an ethylene/propylene mixed gas flow (70 liters/hr, 30 liters/hr, respectively), it was allowed to stand at 25° C. for 10 minutes. Then, 1.25 millimoles of methylaluminoxane in terms of aluminum atoms was added, followed by addition of 0.005 millimole of the titanium amide compound (A-1) represented by formula (c) above, to initiate polymerization. The ethylene/propylene mixed gas was continuously fed, and polymerization was performed under normal pressure at 25° C. for one hour. The polymerization was terminated by addition of a small amount of methanol. The polymerization reaction solution was added to a large excess of methanol/ hydrochloric acid solution, and the resulting polymer was dried under reduced pressure at 130° C. for 12 hours. This resulted in 2.3 g of polymer having an ethylene content of 84% by mole.

Example 7

To a 500 ml-glass autoclave thoroughly purged with nitrogen was introduced 250 ml of toluene, followed by 5 ml of 1-octene and passing through an ethylene gas flow at 100 liters/hour, it was allowed to stand at 25° C. for 10 minutes. Then, 1.25 millimoles of methylaluminoxane in terms of aluminum atoms was added, followed by addition of 0.005 millimole of the titanium amide compound (A-1) represented by formula (c) above, to initiate polymerization. The ethylene gas was continuously fed at rate of 100 liters/hour, and polymerization was performed under normal pressure at 25° C. for one hour. The polymerization was terminated by addition of a small amount of methanol. The polymerization reaction solution was added to a large excess of methanol/ hydrochloric acid solution, and the resulting polymer was dried under reduced pressure at 130° C. for 12 hours. This resulted in 2.1 g of polymer having an ethylene content of 95% by mole.

Example 8

To a 100 ml-glass autoclave thoroughly purged with nitrogen was introduced 20 ml of heptane, followed by 20 ml of styrene, and the liquid phase and gas phase were saturated with ethylene. To the autoclave was added 1 millimole of methylaluminoxane in terms of aluminum atoms, followed by addition of 2 micromoles of the titanium amide compound (A-3) represented by formula (e) below, to initiate polymerization. Polymerization was conducted at 25° C. for one hour under a normal pressure ethylene gas atmosphere. Then, the polymerization was terminated by addition of a small amount of methanol. The polymerization reaction solution was added to a large excess of methanol/ hydrochloric acid solution to precipitate the polymer. The resulting polymer was extracted with chloroform at room temperature and then the chloroform-soluble portion was extracted with acetone at room temperature. This resulted in 0.93 g of ethylene/styrene copolymer with a styrene content of 7% by mole, as the acetone-insoluble portion.

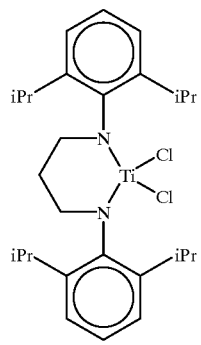

(e)

Example 9

Ethylene and styrene were copolymerized in the same manner as Example 8, except that the amount of heptane was changed from 20 ml to 30 ml and the amount of styrene was changed from 20 ml to 10 ml in the polymerization of Example 8. The extraction of the produced polymer was also carried out as in Example 8. This resulted in 1.27 g of ethylene/styrene copolymer with a styrene content of 5% by mole.

Example 10

Ethylene and styrene were copolymerized in the same manner as Example 8, except that 2 micromoles of the titanium amide compound (A-4) represented by formula (f) below was used instead of the titanium amide compound (A-3) in the polymerization of Example 8. The extraction of the produced polymer was also carried out as in Example 8. This resulted in 1.18 g of ethylene/styrene copolymer with a styrene content of 8% by mole.

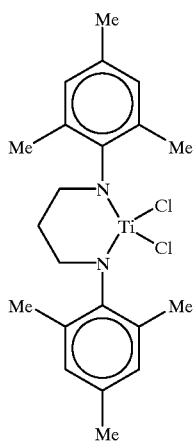

(f)

Example 11

To a 200 ml-glass autoclave thoroughly purged with nitrogen was introduced 60 ml of heptane, followed by 40 ml of 1-hexene, and passing through an ethylene gas flow at 10 liters/hour, it was allowed to stand at 25° C. for 20 minutes. To the autoclave was added 1 millimole of methylaluminoxane in terms of aluminum atoms, followed by addition of 2 micromoles of the titanium amide compound (A-3) represented by formula (e) above, to initiate polymerization. The ethylene gas was continuously fed at rate of 10 liters/hour, and polymerization was performed under normal pressure at 25° C. for 2 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 3.3 g of polymer having a ($\eta$) of 0.58 dl/g and an ethylene content of 12% by mole.

Example 12

To a 200 ml-glass autoclave thoroughly purged with nitrogen was introduced 60 ml of heptane, followed by 40 ml of 1-hexene and passing through an ethylene gas flow at 10 liters/hour, it was allowed to stand at 25° C. for 20 minutes. To the autoclave were added 0.5 millimole of triisobutylaluminum, 2 micromoles of the titanium amide compound (A-3) represented by formula (e) above, and 3 micromoles of triphenylcarbenium tetrakispentafluorophenyl borate in that order, to initiate polymerization. The ethylene gas was continuously fed at rate of 10 liters/hour, and polymerization was performed under normal pressure at 25° C. for 2 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 3.5 g of polymer having a ($\eta$) of 1.48 dl/g and an ethylene content of 10% by mole.

Example 13

Ethylene and 1-octene were copolymerized in the same manner as Example 11, except that 40 ml of 1-octene was used instead of the 1-hexene in the polymerization of Example 11. This resulted in 2.8 g of polymer having a ($\eta$) of 0.48 dl/g and an ethylene content of 14% by mole.

Example 14

Ethylene and 1-octene were copolymerized in the same manner as Example 12, except that 40 ml of 1-octene was used instead of the 1-hexene in the polymerization of Example 12. This resulted in 3.1 g of polymer having a ($\eta$) of 1.29 dl/g and an ethylene content of 11% by mole.

Example 15

Ethylene and 1-hexene were copolymerized in the same manner as Example 11, except that 2 micromoles of the titanium amide compound (A-5) represented by formula (g) below was used instead of the titanium amide compound (A-3), and the polymerization time was 5 minutes, in the polymerization of Example 11. This resulted in 2.9 g of polymer having a ($\eta$) of 0.37 dl/g and an ethylene content of 10% by mole.

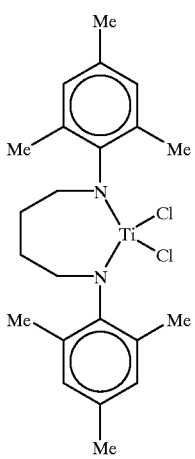

(g)

Example 16

Ethylene and 1-hexene were copolymerized in the same manner as Example 12, except that 2 micromoles of the titanium amide compound (A-5) represented by formula (g) above was used instead of the titanium amide compound (A-3), and the polymerization time was 5 minutes, in the polymerization of Example 12. This resulted in 3.1 g of polymer having a (i) of 1.24 dl/g and an ethylene content of 10% by mole.

Example 17

Ethylene and 1-hexene were copolymerized in the same manner as Example 11, except that 2 micromoles of the titanium compound (A-4) represented by formula (f) above was used instead of the titanium amide compound (A-3) in the polymerization of Example 11. This resulted in 3.1 g of polymer having a ($\eta$) of 0.51 dl/g and an ethylene content of 10% by mole.

Example 18

Ethylene and 1-hexene were copolymerized in the same manner as Example 12, except that 2 micromoles of the titanium amide compound (A-4) represented by formula (f)

above was used instead of the titanium amide compound (A-3) in the polymerization of Example 12. This resulted in 3.8 g of polymer having a ($\eta$) of 1.39 dl/g and an ethylene content of 9% by mole.

Example 19

To a 2 liter-stainless steel autoclave thorougly purged with nitrogen was introduced 800 ml of hexane, followed by 200 ml of 1-hexene, the system temperature was raised to 40° C. Then, 1 millimole of methylaluminoxane in terms of aluminum atoms and 0.2 micromole of the titanium amide compound (A-3) represented by formula (e) above were injected into the autoclave together with ethylene, to initiate polymerization. Thereafter, ethylene was continuously fed to keep the total pressure at 8 kg/cm$^2$-G, and polymerization was performed at 50° C. for 30 minutes. The polymerization was terminated by injection of a small amount of methanol. The polymerization reaction solution was added to a large excess of methanol/hydrochloric acid solution, and the resulting polymer was dried under reduced pressure at 130° C. for 12 hours. This resulted in 16.8 g of polymer having a ($\eta$) of 1.82 dl/g and an ethylene content of 84% by mole.

Example 20

To a 200 ml-glass autoclave thoroughly purged with nitrogen was intoduced 60 ml of heptane, followed by 40 ml of 1-hexene and passing through a propylene gas flow at 10 liters/hour, it was allowed to stand at 25° C. for 20 minutes. To the autoclavae was added 1 millimole of methylaluminoxane in terms of aluminum atoms, followed by addition of 2 micromoles of the titanium amide compound (A-3) represented by formula (e) above, to initiate polymerization. The propylene gas was continuously fed at rate of 10 liters/hour, and polymerization was performed under normal pressure at 25° C. for 2 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 1.9 g of polymer having a ($\eta$) of 0.39 dl/g and a propylene content of 9% by mole.

Example 21

To a 200 ml-glass autoclave thoroughly purged with nitrogen was introduced 60 ml of heptane, followed by 40 ml of 1-hexene and passing through a propylene gas flow at 10 liters/hour, it was allowed to stand at 25° C. for 20 minutes. To the autoclave were added 0.5 millimole of triisobutylaluminum, 2 micromoles of the titanium amide compound (A-3) represented by formula (e) above, and 3 micromoles of triphenylcarbenium tetrakispentafluorophenyl borate in that order, to initiate polymerization. The propylene gas was continuously fed at rate of 10 liters/hour, and polymerization was performed under normal pressure at 25° C. for 2 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 2.3 g of polymer having a ($\eta$) of 1.16 dl/g and a propylene content of 8% by mole.

Example 22

Propylene and 1-hexene were copolymerized in the same manner as Example 20, except that 2 micromoles of the titanium amide compound (A-5) represented by formula (g) above was used instead of the titanium amide compound (A-3), and the polymerization time was 5 minutes, in the polymerization of Example 20. This resulted in 1.7 g of polymer having a ($\eta$) of 0.31 dl/g and a propylene content of 8% by mole.

Example 23

Propylene and 1-hexene were copolymerized in the same manner as Example 21, except that 2 micromoles of the titanium amide compound (A-5) represented by formula (g) above was used instead of the titanium amide compound (A-3), and the polymerization time was 5 minutes, in the polymerization of Example 21. This resulted in 1.8 g of polymer having a ($\eta$) of 0.98 dl/g and a propylene content of 8% by mole.

Example 24

Propylene and 1-octene were copolymerized in the same manner as Example 20, except that 40 ml of 1-octene was used instead of 1-hexene, and 2 micromoles of the titanium amid compound (A-4) represented by formula (f) above was used instead of the titanium amide compound (A-3) in the polymerization of Example 20. This resulted in 1.9 g of polymer having a ($\eta$) of 0.36 dl/g and a propylene content of 10% by mole.

Example 25

Propylene and 1-octene were copolymerized in the same manner as Example 21, except that 40 ml of 1-octene was used instead of 1-hexene, and 2 micromoles of the titanium amide compound (A-4) represented by formula (f) above was used instead of the titanium amide compound (A-3) in the polymerization of Example 21. This resulted in 2.7 g of polymer having a ($\eta$) of 1.07 dl/g and a propylene content of 10% by mole.

Example 26

1-butene and 1-hexene were copolymerized in the same manner as Example 20, except that a 1-butene flow of 10 liters/hour was passed through instead of propylene gas, and 2 micromoles of the titanium amide compound (A-4) represented by formula (f) above was used instead of the titanium amide compound (A-3), in the polymerization of Example 20. This resulted in 1.7 g of polymer having a ($\eta$) of 0.28 dl/g and a 1-butene content of 14% by mole.

Example 27

To a 100 ml-glass autoclave thoroughly purged with nitrogen was intoduced 20 ml of a cyclohexane solution containing a 0.43 g/ml concentration of norbornene, and the liquid phase and gas phase were saturated with ethylene. To the autoclave was added 1 millimole of methylaluminoxane in terms of aluminum atoms, followed by addition of 2 micromoles of the titanium amide compound (A-3) represented by formula (e) above, to initiate polymerization. Polymerization was performed at 25° C. for 1 hour under a normal pressure ethylene gas atmosphere. Then, the polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 1.5 g of polymer having a norbornene content of 47% by mole.

Comparative Example 2

Ethylene and norbornene were copolymerized in the same manner as Example 27, except that 2 micromoles of bis(n-octyl)amide titanium trichloride was used instead of the titanium amide compound (A-3) in the polymerization of Example 27. This resulted in 0.16 g of polymer having a norbornene content of 36% by mole.

Example 28

To a 100 ml-glass autoclave thoroughly purged with nitrogen was introduced 10 ml of cyclohexane, followed by 10.5 g of tetracyclo[4.4.0.1$^{2,5}$.1$^{7,10}$]-3-dodecene (hereunder abbreviated as "TCD"), and the liquid phase and gas phase were saturated with ethylene. To the autoclave was added 1 millimole of methylaluminoxane in terms of aluminum atoms, followed by addition of 2 micromoles of the titanium amide compound (A-3) represented by formula (e) above, to initiate polymerization. Polymerization was performed at 25° C. for 1 hour under a normal pressure ethylene gas atmosphere. Then, the polymerization was termianted by addition of a small amount of methanol. The polymerization reaction solution was added to a large excess of methanol/hydrochloric acid solution, and the resulting polymer was dried under reduced pressure at 130° C. for 12 hours. This resulted in 1.1 g of polymer having a TCD content of 44% by mole.

Example 29

Ethylene and norbornene were copolymerized in the same manner as Example 27, except that 2 micromoles of the titanium amide compound (A-4) represented by formula (f) above was used instead of the titanium amide compound (A-3) in the polymerization of Example 27. This resulted in 1.6 g of polymer having a norbornene content of 48% by mole.

Example 30

Preparation of Hexane Slurry of Methylaluminoxane (b-1)

To a 500 ml-glass reactor equipped with a stirrer blade was introduced 100 ml of a toluene solution of methylaluminoxane (1.5 moles/liter in terms of aluminum atoms) under a nitrogen atmosphere, and then 100 ml of nitrogen-replaced hexane was added dropwise over one hour at room temperature while stirring. After filtering the resulting solid methylaluminoxane, it was washed with hexane and dried under reduced pressure, and all except a portion to be used for analysis was suspended in hexane to prepare a hexane slurry of methylaluminoxane (b-1) (1.0 mole/liter in terms of aluminum atoms). The area to weight ratio of the methylaluminoxane was 180 m$^2$/g.

Polymerization

To a 200 ml-glass autoclave thoroughly purged with nitrogen was introduced 75 ml of heptane, followed by 25 ml of 1-octene, and passing through an ethylene gas flow at 10 liters/hour and it was kept at 50° C. for 20 minutes. To the autoclave was added 1 ml of the hexane slurry of methylaluminoxane (b-1) obtained above, followed by addition of 2 ml of a heptane solution of the titanium amide compound (A-6) represented by formula (h) below (1 millimole/liter), to initiate polymerization. The ethylene gas was continuously fed at rate of 10 liters/hour, and polymerization was performed under normal pressure at 50° C. for 2 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 3.4 g of polymer having a (η) of 0.39 dl/g and an ethylene content of 13% by mole.

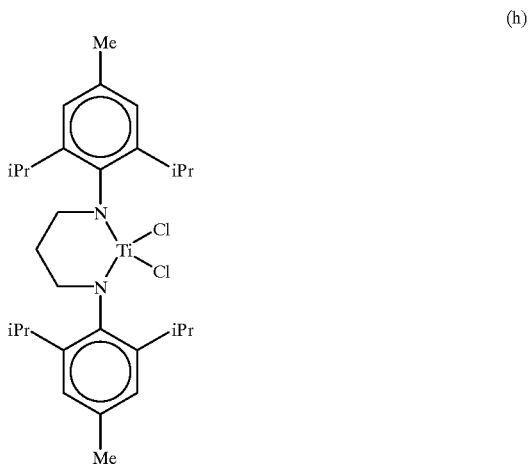

(h)

Example 31

To a 20 ml-glass container thoroughly purged with nitrogen was introduced 2.5 ml of the hexane slurry of methylaluminoxane (b-1) obtained in Example 30, and then 1 micromole of bis[bis(trimethylsilyl)amide] zirconium dichloride ([Me$_3$Si)$_2$N]$_2$ZrCl$_2$) was added thereto and the mixture was stirred for 5 minutes to obtain a precontacted catalyst (a-1).

Separately, to a 1 liter-stainless steel autoclave thoroughly purged with nitrogen was introduced 300 ml of heptane, followed by 100 ml of 1-hexene, and the system temperature was raised to 40° C. The total amount of the aforementioned precontacted catalyst (a-1) was then injected with ethylene to initiate polymerization. Ethylene wss continuously fed to keep the total pressure at 5 kg/cm$^2$-G, and polymerization ws performed at 70° C. for 30 minutes. The polymerization was terminated by addition of a small amount of methanol by injection. The polymerization reaction solution was added to a large excess of methanol/hydrochloric acid solution, and the resulting polymer was dried under reduced pressure at 130° C. for 12 hours. This resulted in 4.8 g of an ethylene/1-hexene copolymer having a (η) of 2.7 dl/g.

Example 32

To a 500 ml-glass autoclave thoroughly purged with nitrogen was introduced 250 ml of heptane, and passing through an ethylene gas flow at 100 liters/hour, it was allowed to stand at 25° C. for 10 minutes. Then, to the autoclave was added 2.5 ml of the hexane slurry of methylaluminoxane (b-1) obtained in Example 30, followed by addition of 5 ml of a heptane solution of the titanium amide compound (A-7) represented by formula (i) below (1 millimole/liter), to initiate polymerization. The ethylene gas was continuously fed at rate of 100 liters/hour, and polymerization was performed under normal pressure at 25° C. for 30 minutes. The polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 3.8 g of polymer.

(i)

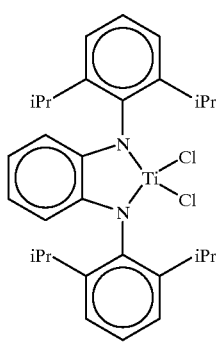

Example 33

To a 200 ml-glass autoclave thoroughly purged with nitrogen was introduced 75 ml of heptane, followed by 25 ml of 1-octene. This was allowed to stand at 50° C. Then, to the autoclave was added 1 ml of the hexane slurry of methylaluminoxane (b-1) obtained in Example 30, followed by addition of 2 ml of a heptane solution of the titanium amide compound (A-4) represented by formula (f) above (1 millimole/liter), to initiate polymerization. Polymerization was performed under a normal pressure nitrogen atmosphere at 50° C. for 2 minutes. Then, the polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 2.8 g of polymer having a ($\eta$) of 0.36 dl/g.

Example 34

To a 200 ml-glass autoclave thoroughly purged with nitrogen was introduced 75 ml of heptane, followed by 25 ml of 1-octene. This was allowed to stand at 50° C. Then, to the autoclave was added 1 ml of the hexane slurry of methylaluminoxane (b-1) obtained in Example 30, followed by addition of 2 ml of a heptane solution of the titanium compound (A-3) represented by formula (e) above (1 millimole/liter), to initiate polymerization. Polymerization was performed under a normal pressure nitrogen atmosphere at 50° C. for 2 minutes. Then, the polymerization was terminated by addition of a small amount of methanol. The polymerization reaction solution was added to a large excess of methanol/hydrochloric acid solution, and the resulting polymer was dried under reduced pressure at 130° C. for 12 hours. This resulted in 2.4 g of polymer having a ($\eta$) of 0.44 dl/g.

Example 35

Preparation of Decane Slurry of Methylaluminoxane (b-2)

To a 500 ml-glass reactor equipped with a stirrer blade was introduced 100 ml of a toluene solution of methylaluminoxane (1.5 moles/liter in terms of aluminum atoms) under a nitrogen atmosphere, and then 100 ml of nitrogen-replaced decane was added dropwise over one hour at room temperature while stirring. The toluene was distilled off from the resulting solid methylaluminoxane slurry under reduced pressure (45° C., 10 mmg). Decane was added thereto to prepare a decane slurry of methylaluminoxane (b-2) (0.9 mole/liter in terms of aluminum atoms). The area to weight ratio of the methylaluminoxane was 180 m$^2$/g.

Polymerization 1-octene was polymerized in the same manner as Example 34, except that 1.1 ml of the decane slurry of methylaluminoxane (b-2) obtained above was used instead of the hexane slurry of methylaluminoxane (b-1) in the polymerization of Example 34. This resulted in 2.3 g of polymer having a ($\eta$) of 0.42 dl/g.

Example 36

1-octene was polymerized in the same manner as Example 34, except that no heptane was used, and 100 ml of the 1-octene monomer was used as the polymerization solvent in Example 34. This resulted in 2.6 g of polymer having a ($\eta$) of 0.49 dl/g.

What is claimed is:

1. A process for polymerizing an olefin, comprising polymerization or copolymerization of olefins in the presence of an olefin polymerization catalyst comprising:

(A''') a transition metal amide compound represented by general formula (IV) below $$(R_2N)_k M^2 X^2_{j-k} \tag{IV}$$

where M$^2$ represents a transition metal atom of Groups 3 to 6 of the Periodic Table, j is the valency of the transition metal atom M$^2$, k is an integer of 1 to j, each R may be the same or different and represents a hydrogen atom, a hydrocarbon group, a halogenated hydrocarbon group, an organosilyl group or a substituent with at least one element selected from the group consisting of nitrogen, oxygen, phosphorus, sulfur and silicon, the groups represented by R may be linked together to form a ring, when k is 2 or greater, two R groups bonded to different nitrogen atoms may be bonded together to form a bonding group which bonds the 2 nitrogen atoms, X$^2$ represents a hydrogen or halogen atom, a hydrocarbon group of 1 to 20 carbon atoms, a halogenated hydrocarbon group of 1 to 20 carbon atoms or an oxygen-containing group, sulfur-containing group or silicon-containing group, and when j–k is 2 or greater, each X$^2$ may be the same or different; and (B-1) an organoaluminum oxy-compound, wherein said organoaluminum oxy-compound (B-1) is added to the polymerization system in a form of an aliphatic hydrocarbon or alicyclic hydrocarbon slurry.

2. A process for producing an olefin polymer comprising homopolymerizing an olefin, or copolymerizing 2 or more olefins, in the presence of an olefin polymerization catalyst, wherein the olefin polymerization catalyst comprises:

(A) a metal amide compound represented by formula (I) below and at least one co-catalyst selected from the group consisting of (B)

(B-1) organoaluminum oxy-compounds (B-2) compounds which react with said metal amide compound (A) to form ion pairs, and (B-3) organometallic compounds,

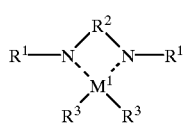

(I)

wherein $M^1$ represents a transition metal of Group 4 or Groups 8 to 10 of the Periodic Table, $R^1$ represents a hydrocarbon group of 1 to 15 carbon atoms, the two $R^1$ groups being the same or different; and $R^2$ represents a divalent bonding group selected from the group consisting of formulas (a) and (b) below:

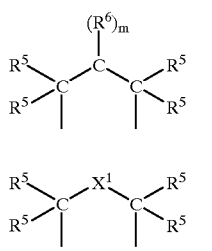

wherein $X^1$ represents a silicon-containing divalent group, a germanium-containing divalent group, a tin-containing divalent group, —O—, —CO—, —S—, —SO—, —SO$_2$—, —C(R$^{31}$)$_p$—S—C(R$^{32}$)$_q$— (wherein R$^{31}$ and R$^{32}$ are each hydrogen atoms, the same or different alkyl groups or are linked together to form a ring of 3 to 30 carbon atoms, and p and q are 1 or 2), —N(R$^5$)—, —C(R$^{33}$)$_r$—N—C(R$^{34}$)$_s$— (wherein R$^{33}$ and R$^{34}$ are each hydrogen atoms, the same or different alkyl groups or are linked together to form a ring of 3 to 30 carbon atoms, and r and s are 1 or 2), —P(R$^5$)—, P(O)(R$^5$)—, —B(R$^5$)—, or Al(R$^5$); R$^5$ and R$^6$ may be the same or different and each represents a hydrocarbon group of 1 to 20 carbon atoms, a halogenated hydrocarbon group of 1 to 20 carbon atoms, a hydrogen atom or a halogen atom; and when R$^1$ is a (substituted) phenyl group, at least one of the groups represented by R$^5$ or R$^6$ is not a hydrogen atom; m is 1 or 2, the multiple R$^5$ groups and R$^6$ groups each may be the same or different, 2 or more of the groups R$^5$ and R$^6$ may be linked to form a ring; and when m is 1, R$^5$ is linked to its adjacent R$^5$ to form a mononuclear or polynuclear aromatic ring); and each R$^3$ may be the same or different, with each representing a hydrocarbon group of 1 to 15 carbon atoms, a hydrogen, atom or a halogen atom, and the multiple R$^3$ groups being the same or different.

3. A process for producing an olefin polymer, comprising homopolymerizing an olefin, or copolymerizing 2 or more olefins, in the presence of an olefin polymerization catalyst, wherein the olefin polymerization catalyst comprises:

(A) a metal amide compound represented by the formula (I) below, (B)

(B-1) an organoaluminum oxy-compound and/or (B-2) a compound which reacts with said metal amide compound (A) to form an ion pair, and optionally, (B-4) an organoaluminum compound,

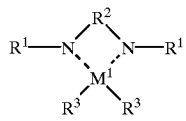

(I)

wherein $M^1$ represents a transition metal of Group 4 or Groups 8 to 10 of the Periodic Table, $R^1$ represents a hydrocarbon group of 1 to 15 carbon atoms, the two $R^1$ groups being the same or different; and $R^2$ represents a divalent bonding group selected from the group consisting of formulas (a) and (b) below:

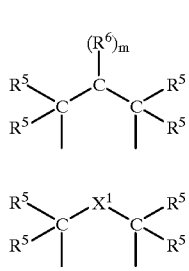

wherein $X^1$ represents a silicon-containing divalent group, a germanium-containing divalent group, a tin-containing divalent group, —O—, —CO—, —S—, —SO—, —SO$_2$—, —C(R$^{31}$)$_p$—S—C(R$^{32}$)$_q$— (wherein R$^{31}$ and R$^{32}$ are each hydrogen atoms, the same or different alkyl groups or are linked together to form a ring of 3 to 30 carbon atoms, and p and q are 1 or 2), —N(R$^5$)—, —C(R$^{33}$)$_r$—N—C(R$^{34}$)$_s$— (wherein R$^{33}$ and R$^{34}$ are each hydrogen atoms, the same or different alkyl groups or are linked together to form a ring of 3 to 30 carbon atoms, and r and s are 1 or 2), —P(R$^5$)—, P(O)(R$^5$)—, —B(R$^5$)—, or Al(R$^5$); R$^5$ and R$^6$ may be the same or different and each represents a hydrocarbon group of 1 to 20 carbon atoms, a halogenated hydrocarbon group of 1 to 20 carbon atoms, a hydrogen atom or a halogen atom; and when R$^1$ is a (substituted) phenyl group, at least one of the groups represented by R$^5$ or R$^6$ is not a hydrogen atom; m is 1 or 2, the multiple R$^5$ groups and R$^6$ groups each may be the same or different, 2 or more of the groups R$^5$ and R$^6$ may be linked to form a ring; and when m is 1, R$^6$ is linked to its adjacent R$^5$ to form a mononuclear or polynuclear aromatic ring); and each R$^3$ may be the same or different, with each representing a hydrocarbon group of 1 to 15 carbon atoms, a hydrogen atom or a halogen atom, and the multiple $R^3$ groups being the same or different.

4. The process according to claim 2, wherein $R^1$ of formula (I) is a hydrocarbon group with an aromatic ring.

5. The process according to claim 3, wherein $R^1$ of formula (I) is a hydrocarbon group with an aromatic ring.

6. A process for polymerizing an olefin polymer, comprising polymerizing or copolymerizing olefins in the presence of an olefin polymerization catalyst, wherein the olefin polymerization catalyst comprises:

(A') a transition metal amide compound represented by formula (II) below, and at least one compound selected from the group consisting of (B)

(B-1) organoaluminum oxy-compounds, (B-2) compounds which react with the transition metal amide compound (A') to form ion pairs, and (B-3) organometallic compounds,

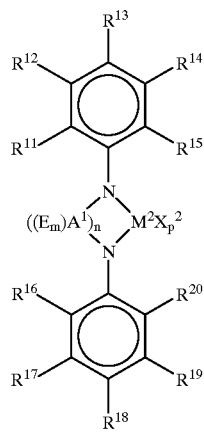

(II)

wherein $M^2$ represents a transition metal atom of Groups 3 to 6 of the Periodic Table;

$R^{11}$ to $R^{20}$ may be the same or different, and each represents a hydrogen atom or a halogen atom, a hydrocarbon group, a halogenated hydrocarbon group, an organosilyl group, an alkoxy group or an aryloxy group, —COOR$^{21}$, —N(R$^{22}$)C(O)R$^{23}$, —OC(O)R$^{24}$, —CN, —N(R$^{25}$)$_2$, or —N(R$^{26}$)S(O$_2$)R$^{27}$ (wherein $R^{21}$ to $R^{27}$ represent alkyl groups of 1 to 5 carbon atoms), at least one of $R^{11}$ to $R^{15}$ is a group other than a hydrogen atom, at least one of $R^{16}$ to $R^{20}$ is a group other than a hydrogen atom, at least 2 of the groups represented by $R^{11}$ to $R^{15}$ may be linked together to form a ring, and at least 2 of the groups represented by $R^{16}$ to $R^{20}$ may be linked together to form a ring;

m is 1 or 2, n is 1 or 2, $A^1$ represents an atom of Group 14 of the Periodic Table, and when n is 2, the two groups represented by $A^1$ may be the same or different;

E may represent the same or different groups and represents at least one atom selected from the group consisting of carbon, hydrogen, oxygen, halogen, nitrogen, sulfur, phosphorus, boron and silicon, or substituents containing these atoms, and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group, or silicon-containing group, and when p is 2 or greater, the groups represented by $X^2$ may be the same or different.

7. A process for producing an aromatic vinyl compound/α-olefin copolymer, comprising copolymerizing an aromatic vinyl compound and an α-olefin in the presence of an olefin polymerization catalyst, wherein the olefin polymerization catalyst comprises:

(A") a transition metal amide compound represented by formula (III) below, and at least one compound selected from the group consisting of (B)

(B-1) organoaluminum oxy-compounds (B-2) compounds which react with the transition metal amide compound (A") to form ion pairs, and (B-3) organometallic compounds,

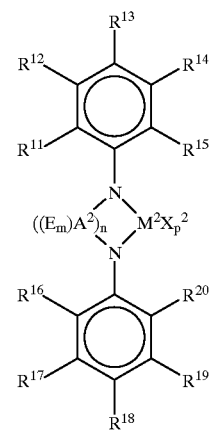

(III)

wherein $M^2$ represents a transition metal atom of Groups 3 to 6 of the Periodic Table;

$R^{11}$ to $R^{20}$ may be the same or different, and each represents a hydrogen atom or a halogen atom, a hydrocarbon group, a halogenated hydrocarbon group, an organosilyl group, an alkoxy group or an aryloxy group, —COOR$^{21}$, —N(R$^{22}$)C(O)R$^{23}$, —OC(O)R$^{24}$, —CN, —N(R$^{25}$)$_2$, or —N(R$^{26}$)S(O$_2$)R$^{27}$ (wherein $R^{21}$ to $R^{27}$ represent alkyl groups of 1 to 5 carbon atoms), at least one of $R^{11}$ to $R^{15}$ is a group other than a hydrogen atom, at least one of $R^{16}$ to $R^{20}$ is a group other than a hydrogen atom, at least 2 of the groups represented by $R^{11}$ to $R^{15}$ may be linked together to form a ring, and at least 2 of the groups represented by $R^{16}$ to $R^{20}$ may be linked together to form a ring;

m is an integer of 0 to 2, n is an integer of 3 to 5, each $A^2$ may be the same or different, and represents an atom of Groups 13 to 16 of the Periodic Table;

E represents at least one atom selected from the group consisting of carbon, hydrogen, oxygen, halogen, nitrogen, sulfur, phosphorus, boron and silicon, or substituents containing these atoms, and when more than one E group is present, the E groups may be the same or different and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group, or silicon-containing group, and when p is 2 or greater, the groups represented by $X^2$ may be the same or different.

8. A process for producing an ethylene/α-olefin copolymer, comprising copolymerizing an α-olefin of 3 or more carbon atoms and ethylene in the presence of an olefin polymerization catalyst, wherein the olefin polymerization catalyst comprises:

(A') a transition metal amide compound represented by formula (III) below, and at least one compound selected from the group consisting of (B)

(B-1) organoaluminum oxy-compounds (B-2) compounds which react with the transition metal amide compound (A") to form ion pairs, and (B-3) organometallic compounds,

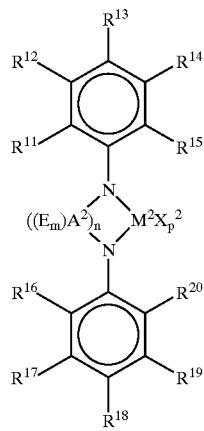

(III)

wherein $M^2$ represents a transition metal atom of Groups 3 to 6 of the Periodic Table;

$R^{11}$ to $R^{20}$ may be the same or different, and each represents a hydrogen atom or a halogen atom, a hydrocarbon group, a halogenated hydrocarbon group, an organosilyl group, an alkoxy group or an aryloxy group, —$COOR^{21}$, —$N(R^{22})C(O)R^{23}$, —$OC(O)R^{24}$, —CN, —$N(R^{25})_2$, or —$N(R^{26})S(O_2)R^{27}$ (wherein $R^{21}$ to $R^{27}$ represent alkyl groups of 1 to 5 carbon atoms), at least one of $R^{11}$ to $R^{15}$ is a group other than a hydrogen atom, at least one of $R^{16}$ to $R^{20}$ is a group other than a hydrogen atom, at least 2 of the groups represented by $R^{11}$ to $R^{15}$ may be linked together to form a ring, and at least 2 of the groups represented by $R^{16}$ to $R^{20}$ may be linked together to form a ring;

m is an integer of 0 to 2, n is an integer of 3 to 5, each $A^2$ may be the same or different, and represents an atom of Groups 13 to 16 of the Periodic Table;

E represents at least one atom selected from the group consisting of carbon, hydrogen, oxygen, halogen, nitrogen, sulfur, phosphorus, boron and silicon, or substituents containing these atoms, and when more than one E group is present, the E groups may be the same or different and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group, or silicon-containing group, and when p is 2 or greater, the groups represented by $X^2$ may be the same or different.

9. A process for producing an α-olefin random copolymer, comprising copolymerizing at least two α-olefins selected from the group consisting of α-olefins of 3 or more carbon atoms, in the presence of an olefin polymerization catalyst, wherein the olefin polymerization catalyst comprises:

(A") a transition metal amide compound represented by formula (III) below, and at least one compound selected from the group consisting of (B)

(B-1) organoaluminum oxy-compounds (B-2) compounds which react with the transition metal amide compound (A") to form ion pairs, and (B-3) organometallic compounds,

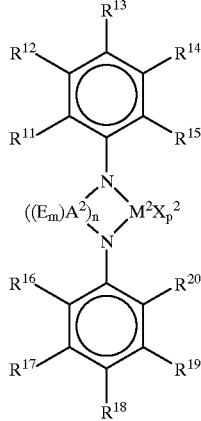

(III)

wherein $M^2$ represents a transition metal atom of Groups 3 to 6 of the Periodic Table;

$R^{11}$ to $R^{20}$ may be the same or different, and each represents a hydrogen atom or a halogen atom, a hydrocarbon group, a halogenated hydrocarbon group, an organosilyl group, an alkoxy group or an aryloxy group, —$COOR^{21}$, —$N(R^{22})C(O)R^{23}$, —$OC(O)R^{24}$, —CN, —$N(R^{25})_2$, or —$N(R^{26})S(O_2)R^{27}$ (wherein $R^{21}$ to $R^{27}$ represent alkyl groups of 1 to 5 carbon atoms), at least one of $R^{11}$ to $R^{15}$ is a group other than a hydrogen atom, at least one of $R^{16}$ to $R^{20}$ is a group other than a hydrogen atom, at least 2 of the groups represented by $R^{11}$ to $R^{15}$ may be linked together to form a ring, and at least 2 of the groups represented by $R^{16}$ to $R^{20}$ may be linked together to form a ring;

m is an integer of 0 to 2, n is an integer of 3 to 5, each $A^2$ may be the same or different, and represents an atom of Groups 13 to 16 of the Periodic Table;

E represents at least one atom selected from the group consisting of carbon, hydrogen, oxygen, halogen, nitrogen, sulfur, phosphorus, boron and silicon, or substituents containing these atoms, and when more than one E group is present, the E groups may be the same or different and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group, or silicon-containing group, and when p is 2 or greater, the groups represented by $X^2$ may be the same or different.

10. A process for producing a cyclic olefin copolymer, comprising copolymerizing a linear or branched olefin and a cyclic olefin in the presence of an olefin polymerization catalyst, wherein the olefin polymerization catalyst comprises:

(A") a transition metal amide compound represented by formula (III) below, and at least one compound selected from the group consisting of (B)

(B-1) organoaluminum oxy-compounds (B-2) compounds which react with the transition metal amide compound (A") to form ion pairs, and (B-3) organometallic compounds,

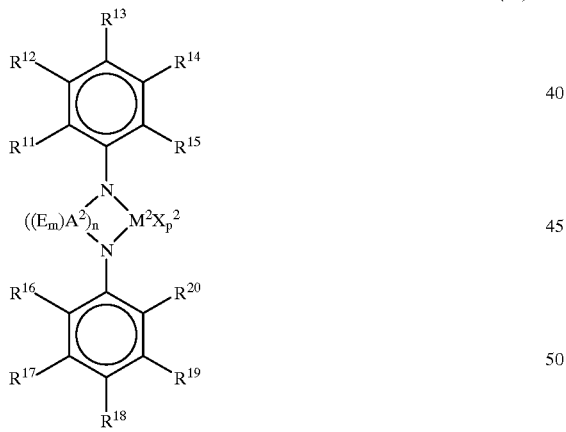

(III)

wherein $M^2$ represents a transition metal atom of Groups 3 to 6 of the Periodic Table;

$R^{11}$ to $R^{20}$ may be the same or different, and each represents a hydrogen atom or a halogen atom, a hydrocarbon group, a halogenated hydrocarbon group, an organosilyl group, an alkoxy group or an aryloxy group, —COOR$^{21}$, —N(R$^{22}$)C(O)R$^{23}$, —OC(O)R$^{24}$, —CN, —N(R$^{25}$)$_2$, or —N(R$^{26}$)S(O$_2$)R$^{27}$ (wherein R$^{21}$ to R$^{27}$ represent alkyl groups of 1 to 5 carbon atoms), at least one of R$^{11}$ to R$^{15}$ is a group other than a hydrogen atom, at least one of R$^{16}$ to R$^{20}$ is a group other than a hydrogen atom, at least 2 of the groups represented by R$^{11}$ to R$^{15}$ may be linked together to form a ring, and at least 2 of the groups represented by R$^{16}$ to R$^{20}$ may be linked together to form a ring;

m is an integer of 0 to 2, n is an integer of 3 to 5, each $A^2$ may be the same or different, and represents an atom of Groups 13 to 16 of the Periodic Table;

E represents at least one atom selected from the group consisting of carbon, hydrogen, oxygen, halogen, nitrogen, sulfur, phosphorus, boron and silicon, or substituents containing these atoms, and when more than one E group is present, the E groups may be the same or different and any 2 or more groups represented by E may be linked together to form a ring;

p represents an integer of 0 to 4; and $X^2$ represents a hydrogen or halogen atom, a hydrocarbon group of 1 to 20 carbon atoms, a halogenated hydrocarbon group of 1 to 20 carbon atoms, or an oxygen-containing group, sulfur-containing group, or silicon-containing group, and when p is 2 or greater, the groups represented by $X^2$ may be the same or different.

* * * * *